United States Patent
Horiike et al.

(10) Patent No.: US 7,327,789 B2
(45) Date of Patent: Feb. 5, 2008

(54) DECODING APPARATUS, DECODING METHOD, DECODING PROGRAM, AND DECODING PROGRAM STORAGE MEDIUM

(75) Inventors: Kazuyoshi Horiike, Kyoto (JP); Shigeki Fujii, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 725 days.

(21) Appl. No.: 10/212,070

(22) Filed: Aug. 6, 2002

(65) Prior Publication Data
US 2003/0026342 A1  Feb. 6, 2003

(30) Foreign Application Priority Data
Aug. 6, 2001  (JP) .............................. 2001-238244

(51) Int. Cl.
*H04B 1/66* (2006.01)
(52) U.S. Cl. ..................... 375/240.25; 375/240.26; 375/240.28; 375/240.27; 382/233; 382/235
(58) Field of Classification Search ........... 375/240.25, 375/240.26, 240.28, 240.27; 382/233, 235; 341/67, 63
See application file for complete search history.

(56) References Cited
U.S. PATENT DOCUMENTS 5,537,148 A * 7/1996 Fujinami .................... 348/473
5,583,500 A * 12/1996 Allen et al. ................. 341/107
5,751,377 A * 5/1998 Kadono et al. ............. 348/586
5,848,046 A * 12/1998 Sawada .................... 369/47.35
6,175,595 B1 * 1/2001 Keesman ................ 375/240.25
6,377,309 B1 * 4/2002 Ito et al. .................... 348/554
6,633,339 B1 * 10/2003 Goto et al. ............... 348/425.4
2004/0047614 A1 * 3/2004 Green ........................ 386/111

FOREIGN PATENT DOCUMENTS

| JP | 2000-165816 | | 6/2000 |
| JP | 2000165816 A | * | 6/2000 |
| JP | 2001-024958 | | 1/2001 |

* cited by examiner

Primary Examiner—Shawn S. An
(74) Attorney, Agent, or Firm—Wenderoth, Lind & Ponack, L.L.P.

(57) ABSTRACT

A decoding apparatus is provided with a decoder for receiving plural bit streams and decoding the respective bit streams to output decoded bit streams, and a decoding state holder for saving and restoring plural states of the decoder. The decoder selects a bit stream to be a target of decoding, from among the plural bit streams to be decoded, decodes the selected bit stream, performs saving and restoration of its state into/from the decoding state holder, outputs plural decoding results to the corresponding destinations, and completes a series of the processes mentioned above within a predetermined period of time corresponding to each bit stream. Therefore, the plural bit streams can be decoded apparently at the same time, by using a single decoder.

9 Claims, 57 Drawing Sheets

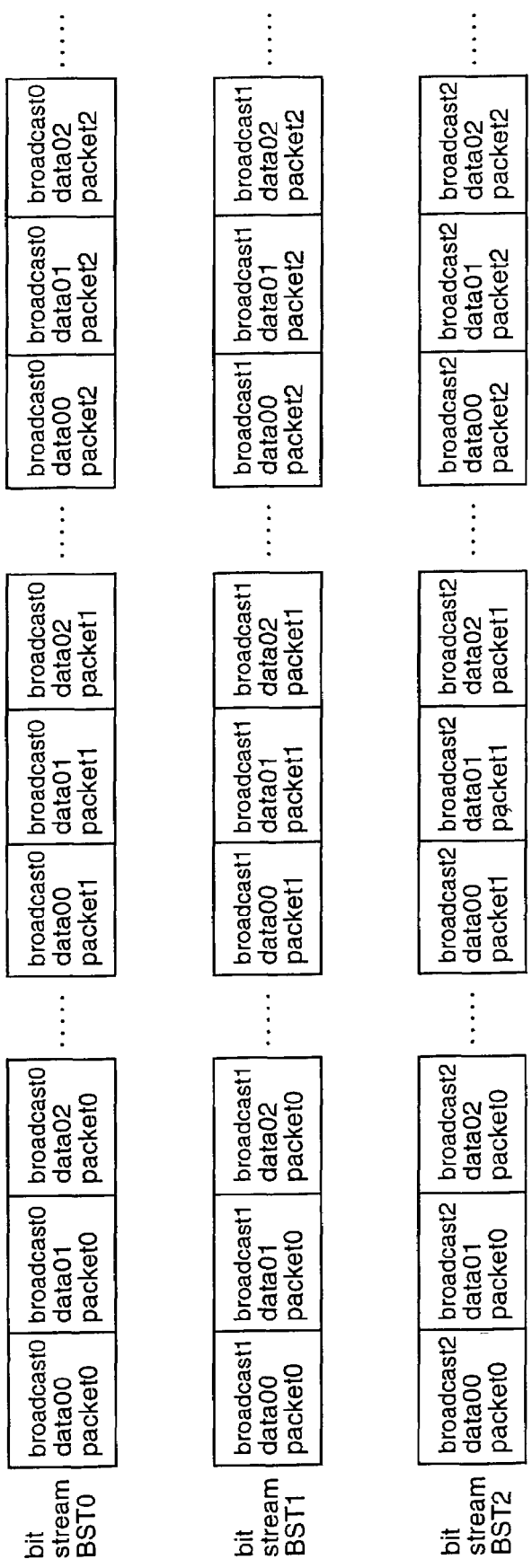

Fig.4

| audio bit stream AST0 | broadcast0 data00 packet0 | broadcast0 data00 packet1 | broadcast0 data00 packet2 | ······ |

| video bit stream VST0 | broadcast0 data01 packet0 | broadcast0 data01 packet1 | broadcast0 data01 packet2 | ······ |

| audio bit stream AST1 | broadcast1 data01 packet0 | broadcast1 data01 packet1 | broadcast1 data01 packet2 | ······ |

| video bit stream VST1 | broadcast1 data02 packet0 | broadcast1 data02 packet1 | broadcast1 data02 packet2 | ······ |

| audio bit stream AST2 | broadcast2 data00 packet0 | broadcast2 data00 packet1 | broadcast2 data00 packet2 | ······ |

| video bit stream VST2 | broadcast2 data02 packet0 | broadcast2 data02 packet1 | broadcast2 data02 packet2 | ······ |

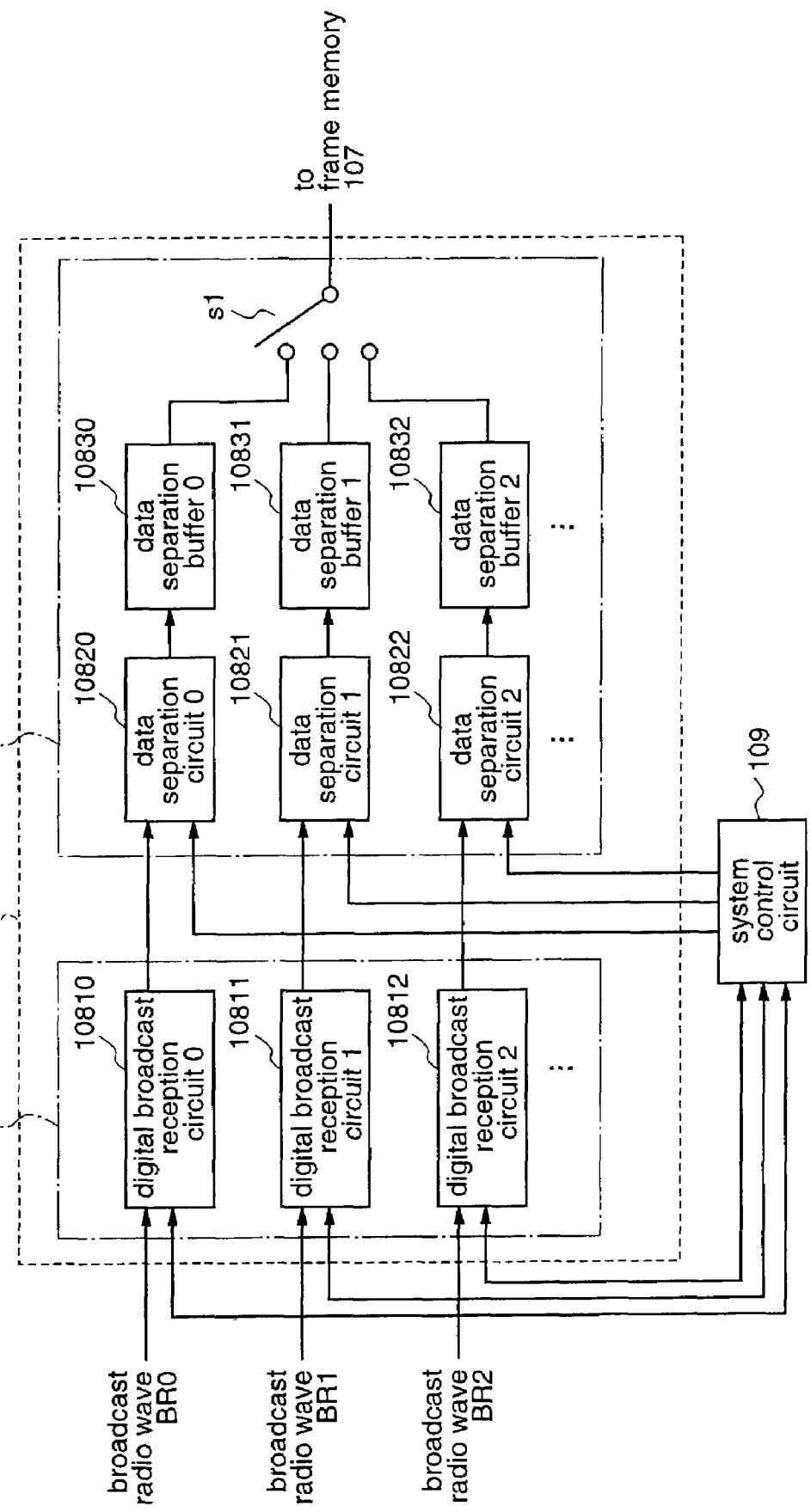

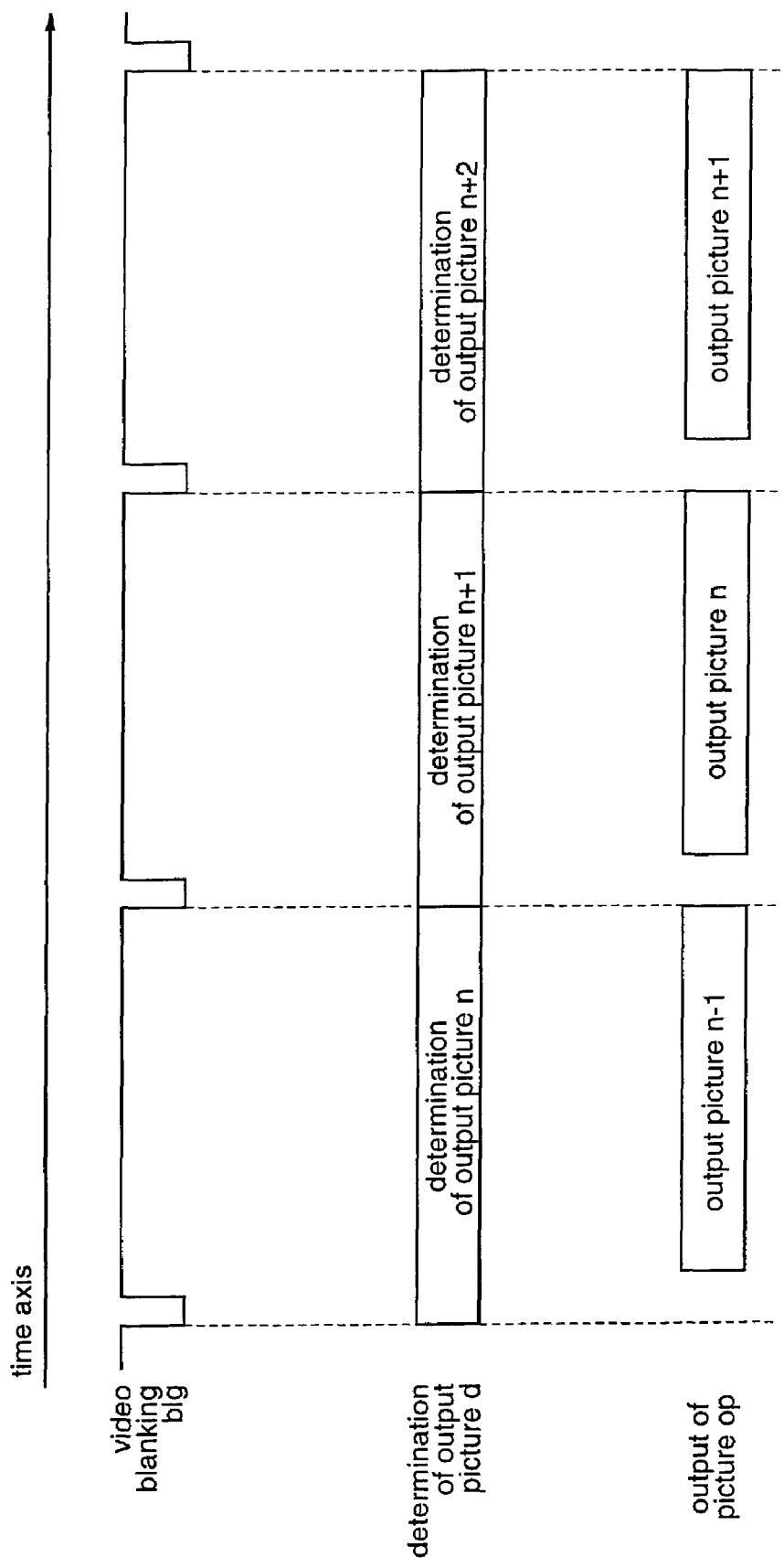

DECODING APPARATUS, DECODING METHOD, DECODING PROGRAM, AND DECODING PROGRAM STORAGE MEDIUM

FIELD OF THE INVENTION

The present invention relates to a decoding apparatus, a decoding method, a decoding program, and a decoding program storage medium. More particularly, the present invention relates to a decoding apparatus which can decode a plurality of compressed data apparently at the same time by using a single decoder, with respect to bit streams that are generated by compressing digital data of pictures, sounds, and the like. Further, the present invention relates to a decoding method, decoding program, and decoding program storage medium for realizing a function corresponding to the decoding apparatus.

BACKGROUND OF THE INVENTION

Conventionally, decoding of bit streams which are generated by compressing digital data of pictures, sounds, and the like, has been carried out by using a decoding apparatus as shown in FIG. 56.

FIG. 56 is a block diagram illustrating a conventional decoding apparatus, and FIG. 57 is a block diagram illustrating a more specific construction for implementing the block diagram shown in FIG. 56.

In the decoding apparatus shown in FIG. 56, a system control circuit 1090 instructs a bit stream output circuit 108 to receive any broadcast, and output any bit stream in the broadcast, on the basis of a channel ID that is instructed from a user information setting circuit 1110 to the system control circuit 1090, or a channel ID that is stored in the system control circuit 1090.

In the bit stream output circuit 108, an audio bit stream and a video bit stream to be decoded by a decoding circuit 101 are output from the received broadcast, by a digital broadcast reception circuit 1081 and a data separation circuit 1082 which are shown in FIG. 57.

Initially, the digital broadcast reception circuit 1081 shown in FIG. 57 receives a broadcast to be decoded, according to an instruction from the system control circuit 1090, and performs channel decoding to output a bit stream BST. The data separation circuit 1082 separates an audio bit stream AST and a video bit stream VST to be decoded, from the bit stream BST, according to an instruction from the system control circuit 1090, and outputs the separated bit streams AST and VST.

An audio bit stream buffer 1042 and a video bit stream buffer 1041 for holding the audio bit stream AST and the video bit stream VST, respectively, which are output from the bit stream output circuit 108 are secured in a frame memory 104, and the respective stream buffers 1042 and 1041 function as FIFO memories to output the audio and video bit streams to the decoding circuit 101. In order to make the stream buffers 1042 and 1041 function as FIFO memories, management of the remaining capacities of buffers as well as input/output of streams are controlled by the bit stream output circuit 108, the frame memory 104, the decoding circuit 101, and the like.

In the decoding circuit 101, the audio bit stream and the video bit stream, which are supplied from the frame memory 104, are decoded by an audio decoding circuit 1012 and a video decoding circuit 1011, respectively, and the decoding results are output to an audio data buffer 1044 and a video data buffer 1043 which are secured in the frame memory 104, respectively. In order to assure real-time processing in the decoding circuit 101, it is necessary to complete the processing within a processing time corresponding to a unit of coded data. This will be described by taking a video decoding process as an example, with reference to FIGS. 58 and 59.

It is assumed that, in FIGS. 58 and 59, video data are coded in units of frames. Assuming that a picture of 480i, i.e., an interlaced picture of 480 scanning lines, is coded, a video decoding process VDP at this time should be completed within a frame time F (one-half of the frame time is a field time, and the frame time corresponds to twice a V period that is an interval from a video blanking to a next video blanking), and FIG. 58 shows this conception. Conversely, FIG. 59 shows a case where the video decoding process VDP is not completed within the frame time, resulting in defective pictures being outputted, such as a picture in which missing of frames has occurred during decoding, or a picture in which frames have not completely been decoded. Accordingly, in order to prevent such defective pictures from being output, a control for outputting normally decoded pictures from the decoding circuit is carried out.

In FIG. 56, the decoding circuit 101 judges which picture is to be output, and the result of the judgment is informed to a synthesis circuit 1000 through the system control circuit 1090. However, the result of the judgment may be directly informed from the decoding circuit 101 to the synthesis circuit 1000.

The decoded audio data is output from the audio data buffer 1044 to an audio/video output circuit 1100, wherein the decoded audio data is converted into an analog audio output "a" by an audio D/A conversion circuit 1101a, and converted into a digital audio output "da" by an audio data signal conversion circuit 11011a.

Further, the system control circuit 1090 generates still pictures and on-screen displays (OSDs), and stores them in still picture regions Sti110, Sti111 (s0,s1) and on-screen display regions OSD0, OSD1 (o0,o1), respectively.

The synthesis circuit 1000 synthesizes the video data stored in the video data buffer 1043 with any of the still pictures stored in the still picture regions Sti110, Sti111 (s0, s1) and any of the on-screen display images stored in the on-screen display regions OSD0, OSD1 (o0, o1), on the basis of synthesis parameters instructed from the system control circuit 1090, to output composite video data.

The composite video data is output from the synthesis circuit 1000 to the audio/video output circuit 1100, wherein the composite video data is converted into an analog video output "v" by a video D/A conversion circuit 1101v, and converted into a digital video output "dv" by a video data signal conversion circuit 11011v.

As described above, the decoding apparatus shown in FIG. 56 decodes a picture and a sound from a bit stream.

In the conventional decoding apparatus constructed as described above, it is premised that a picture and a sound are decoded from a bit stream. Accordingly, in order to decode plural pictures and sounds simultaneously from plural bit streams of, for example, a BS (Broadcasting Satellite) digital broadcast, a CS (Communication Satellite) digital broadcast, a 110° CS digital broadcast (a digital broadcast by a CS that is launched at 110 degrees east longitude), and the like, plural decoding apparatuses which number as many as the bit streams to be decoded are required.

SUMMARY OF THE INVENTION

The present invention is made to solve the above-described problems. Accordingly, the object of the present invention is to provide a decoding apparatus, a decoding method, a decoding program, and a decoding program storage medium, by which plural pictures and sounds can be decoded apparently at the same time in a single decoding process.

Other objects and advantages of the present invention will become apparent from the following detailed description. The detailed description and specific embodiments described are provided only for illustration since various additions and modifications within the scope of the invention will be apparent to those skilled in the art from the detailed description.

According to a first aspect of the present invention, a decoding apparatus comprises: a decoder for receiving plural coded data, and decoding the respective coded data to output decoded data; and a decoding state holder for saving and restoring plural states of the decoder. The decoder selects coded data to be a target of decoding from among the plural coded data to be decoded and decodes the selected coded data, performs saving and restoration of its state into/from the decoding state holder, outputs plural decoding results to the corresponding destinations, and completes a series of the above processes within a predetermined period of time corresponding to each coded data. Therefore, time-division decoding can be performed on plural coded data to be decoded, whereby the plural coded data can be decoded apparently at the same time by using a single decoder.

According to a second aspect of the present invention, in accordance with the decoding apparatus of the first aspect, the decoder decodes the plural coded data while changing the input of coded data at the boundary of coding units from coded data being currently decoded to another coded data. Therefore, the load on the decoding process is reduced as compared with the case where coded data to be decoded is switched at a position other than the boundary of coding units, whereby plural coded data can be decoded apparently at the same time by using a single decoder in a relatively simple process.

According to a third aspect of the present invention, in accordance with the decoding apparatus of the first aspect, the decoder determines the order in which the decoding results are output, according to information described in each coded data, and selects and decodes the coded data according to the determined order. Therefore, a target video stream to be processed can be changed at a predetermined timing, such as a header of a slice in MPEG2 data, whereby plural coded data can be simultaneously decoded with a single decoder by optimizing the order of video streams to be decoded, even when the processing performance is low. As a result, apparently-simultaneous decoding of plural coded data by using a single decoder is realized with lower processing performance.

According to a fourth aspect of the present invention, a decoding apparatus comprises: a decoder for receiving plural coded data, and decoding the respective coded data; a memory for holding the decoding results; a system controller for instructing which one of the plural coded data is to be decoded; and an output controller for outputting the decoding results stored in the memory. Coded data to be decoded is changed according to the instruction from the system controller, and the output controller performs a predetermined output when the arrangement of regions in the memory for holding the decoding results is altered with the change. For example, when a process of decoding plural pictures and a process of decoding one picture of a larger size are successively carried out, the arrangement of buffers in a frame memory is altered, and this alteration might affect buffers relating to picture output. Therefore, after the alteration of arrangement, a background color is continuously output until normal output becomes possible, whereby incorrect output can be suppressed even when the target of decoding is changed.

According to a fifth aspect of the present invention, a decoding apparatus comprises: a decoder for receiving plural coded data, and decoding the respective coded data; a memory for holding the decoding results; and an output controller for outputting the decoding results stored in the memory. The output controller controls outputs of the decoding results of the respective coded data, according to a common time index. For example, in the case where three pictures are output to one picture-output device, a read-in of time indexes of these pictures is carried out at a specific time as in the case where one picture is output to one picture-output device, whereby output control can be appropriately carried out.

According to a sixth aspect of the present invention, a decoding apparatus comprises: a decoder for receiving a plurality of coded data, and decoding the respective coded data; a memory for holding the decoding results; and an output controller for outputting the decoding results stored in the memory. When the output controller controls output of the decoding result of each coded data, the output controller reads a time index at a predetermined timing, obtains a time index corresponding to each coded data from the read time index, and controls the output on the basis of the time index corresponding to each coded data. Therefore, when plural pictures (channels) have different time indexes, a time index corresponding to one channel is held while time differences between this channel and the remaining channels are stored, whereby time indexes of the remaining channels can be calculated. As a result, even when plural channels of coded data have different time indexes, output control for these coded data can be appropriately carried out by obtaining the corresponding time indexes in a relatively simple process.

According to a seventh aspect of the present invention, in accordance with the decoding apparatus of the first aspect, the decoder obtains a maximum decoding time to be used when decoding each coded data, on the basis of a period of time that is allowed for decoding a coding unit which is obtained from information described in each coded data, and the number of coded data to be decoded. When the maximum decoding time is reached in decoding each coded data, the decoder terminates decoding of the coding unit of the coded data. Since decoding is forcefully terminated when it is not completed within a predetermined period of time, even when a defect occurs in decoding one coded data, decoding of other coded data can be normally carried out.

According to an eighth aspect of the present invention, in accordance with the decoding apparatus of the first aspect, when the decoder cannot perform normal decoding for a coding unit of arbitrary coded data, the decoder determines a position where the decoding should be resumed, on the basis of the type of coding of the coding unit. Since there is a possibility that disordered pictures might be output when appropriate decoding cannot be carried out because of an absence of pictures to be referred to in decoding, a position where decoding is to be resumed is changed according to whether or not discarded pictures should be referred to in decoding the subsequent pictures, whereby decoding can be resumed even for coded data which have not been normally decoded.

According to a ninth aspect of the present invention, in accordance with the decoding apparatus of the first aspect, when the decoder searches for a position where decoding of each coded data should be started, the decoder performs the search for each coding unit, at a timing that is obtained from information described in the coded data. Therefore, a header search is carried out not continuously but in picture units, whereby decoding can be appropriately started.

According to a tenth aspect of the present invention, in accordance with the decoding apparatus of the first aspect, the decoder changes the decoding process for each coded data, with the type of decoding process as a unit. Therefore, the process to be performed by the decoder is divided into plural stages, and the decoder is implemented so as to perform processes which are suited to the respective stages, whereby decoding of plural coded data with a single decoder can be realized with less resources.

According to an eleventh aspect of the present invention, in accordance with the decoding apparatus of the first aspect, the decoder determines a timing for starting decoding, on the basis of information described in each coded data. Therefore, when a coded picture is assigned not only with a time index of picture output but also with a time index of decoding timing, the timing of a header search may be synchronized with the time index of decoding timing, whereby decoding can be started at an appropriate timing.

According to a twelfth aspect of the present invention, in a decoding method for inputting coded data and decoding the coded data to output decoded data, when decoding of coded data as a target of decoding is interrupted, the state of the decoder which performs decoding is saved. Decoding is carried out after changing the target of decoding to another coded data, and decoding of coded data, which has been interrupted, is resumed after restoring the saved state of the decoding unit. Therefore, time-division decoding can be performed on plural coded data to be decoded, whereby the plural coded data can be decoded apparently at the same time by using a single decoder.

According to a thirteenth aspect of the present invention, in a decoding method for inputting plural coded data and decoding the respective coded data, the plural coded data are decoded while changing the input of coded data at the boundary of coding units from coded data being currently decoded to another coded data. Therefore, the load on the decoding process is reduced as compared with the case where coded data to be decoded is switched at a position other than the boundary of coding units. As a result, plural coded data can be decoded apparently at the same time by using a single decoder in a relatively simple process.

According to a fourteenth aspect of the present invention, in a decoding method for inputting plural coded data and decoding the respective coded data, an order of coded data to be output is obtained according to information described in each coded data, and the coded data are selectively decoded according to the obtained order. Therefore, a target video stream to be processed can be changed at a predetermined timing, such as a header of a slice in MPEG2 data, whereby plural coded data can be simultaneously decoded with a single decoder by optimizing the order of video streams to be decoded, even when the processing performance is low. As a result, apparently-simultaneous decoding of plural coded data by using a single decoder is realized with lower processing performance.

According to a fifteenth aspect of the present invention, a decoding method comprises: changing coded data to be decoded among plural coded data, according to an instruction; decoding the coded data to be decoded; storing the decoding results in a memory; and performing a predetermined output when the arrangement of regions in the memory for holding the decoding results is altered with the change of coded data to be decoded according to the instruction. For example, when a process of decoding plural pictures and a process of decoding one picture of a larger size are successively carried out, the arrangement of buffers in a frame memory is altered, and this alteration might affect buffers relating to picture output. Therefore, after the alteration of buffer arrangement, a background color is continuously output until normal output becomes possible, whereby an incorrect output can be suppressed even when the target of decoding is changed.

According to a sixteenth aspect of the present invention, a decoding method comprises: inputting plural coded data, and decoding the respective coded data; storing the decoding results into a memory; and when outputting the decoding results from the memory, controlling the output on the basis of a common time index. For example, in the case where three pictures are output to one picture-output device, a read-in of time indexes of these pictures is carried out at a specific time as in the case where one picture is output to one picture-output device, whereby output control can be appropriately carried out.

According to a seventeenth aspect of the present invention, a decoding method comprises: inputting plural coded data, and decoding the respective coded data; storing the decoding results into a memory; and when outputting the decoding results from the memory, reading a time index at a predetermined timing, obtaining a time index corresponding to each coded data from the read time index, and controlling the output on the basis of the time index corresponding to each coded data. Therefore, when plural pictures (channels) have different time indexes, a time index corresponding to one channel is held while time differences between this channel and the remaining channels are stored, whereby time indexes of the remaining channels can be calculated. As a result, even when plural channels of coded data have different time indexes, output control for these coded data can be appropriately carried out by obtaining the corresponding time indexes in a relatively simple process.

According to an eighteenth aspect of the present invention, in a decoding method, when inputting plural coded data and decoding the respective coded data, a maximum decoding time to be used when decoding each coded data is obtained on the basis of a period of time that is allowed for decoding a coding unit which is obtained from information described in each coded data, and the number of coded data to be decoded. When the maximum decoding time is reached in decoding each coded data, decoding of the coding unit of the coded data is terminated. Since decoding is forcefully terminated when it is not completed within a predetermined period of time, even when a defect occurs in decoding one coded data, decoding of other coded data can be normally carried out.

According to a nineteenth aspect of the present invention, in a decoding method, when inputting plural coded data and decoding the respective coded data, if normal decoding cannot be carried out for a coding unit of arbitrary coded data, a position where decoding is to be resumed is determined on the basis of the type of coding of the coding unit. Since there is a possibility that disordered pictures might be output when appropriate decoding cannot be carried out because of an absence of pictures to be referred to in the decoding, a position where decoding is to be resumed is changed according to whether or not discarded pictures should be referred to in decoding the subsequent pictures, whereby decoding can be resumed even for coded data which have not been normally decoded.

According to a twentieth aspect of the present invention, in a decoding method, when inputting plural coded data and decoding the respective coded data, a position where decoding of each coded data is to be started is searched for, and this search is performed for every coding unit, at a timing that is obtained according to information described in the coded data. Therefore, a header search is carried out not continuously but in picture units, whereby decoding can be appropriately started.

According to a twenty-first aspect of the present invention, in a decoding method, when inputting plural coded data and decoding the respective coded data, decoding of each coded data is changed with the type of decoding as a unit. Therefore, the process to be performed by the decoder is divided into plural stages, and the decoder is implemented so as to perform processes which are suited to the respective stages, whereby decoding of plural coded data with a single decoder can be realized with less resources.

According to a twenty-second aspect of the present invention, in a decoding method, when inputting plural coded data and decoding the respective coded data, a timing for starting decoding is determined on the basis of information described in each coded data. Therefore, when a coded picture is assigned not only with a time index of picture output but also with a time index of decoding timing, the timing of a header search may be synchronized with the time index of decoding timing, whereby decoding can be started at an appropriate timing.

According to a twenty-third aspect of the present invention, in a decoding program for making a computer execute a decoding method, which is a method for inputting coded data and decoding the coded data to output decoded data, when decoding of coded data as a target of decoding is interrupted, the state of the decoder which performs decoding is saved. Furthermore, decoding is carried out after changing the target of decoding to another coded data, and decoding of coded data, which has been interrupted, is resumed after restoring the saved state of the decoding unit. Therefore, time-division decoding can be performed on plural coded data to be decoded, whereby the plural coded data can be decoded apparently at the same time by using a single decoder.

According to a twenty-fourth aspect of the present invention, in a decoding program for making a computer execute a decoding method, which is a method for inputting plural coded data and decoding the respective coded data, the plural coded data are decoded while changing the input of coded data at the boundary of coding units from coded data being currently decoded to another coded data. Therefore, the load on the decoding process is reduced as compared with the case where coded data to be decoded is switched at a position other than the boundary of coding units, whereby plural coded data can be decoded apparently at the same time by using a single decoder in a relatively simple process.

According to a twenty-fifth aspect of the present invention, in a decoding program for making a computer execute a decoding method, which is a method for inputting plural coded data and decoding the respective coded data, an order of coded data to be output is obtained according to information described in each coded data, and the coded data are selectively decoded according to the obtained order. Therefore, a target video stream to be processed can be changed at a predetermined timing, such as a header of a slice in MPEG2 data, whereby plural coded data can be simultaneously decoded with a single decoder by optimizing the order of video streams to be decoded, even when the processing performance is low. As a result, apparently-simultaneous decoding of plural coded data by using a single decoder is realized with lower processing performance.

According to a twenty-sixth aspect of the present invention, a decoding program is provided for making a computer execute a decoding method, which comprises: changing coded data to be decoded among plural coded data, according to an instruction; decoding the coded data to be decoded; storing the decoding results in a memory; and performing a predetermined output when the arrangement of regions in the memory for holding the decoding results is altered with the change of coded data to be decoded according to the instruction. For example, when a process of decoding plural pictures and a process of decoding one picture of a larger size are successively carried out, the arrangement of buffers in a frame memory is altered, and this alteration might affect buffers relating to picture output. Therefore, after the alteration of buffer arrangement, a background color is continuously output until normal output becomes possible, whereby incorrect output can be suppressed even when the target of decoding is changed.

According to a twenty-seventh aspect of the present invention, a decoding program is provided for making a computer execute a decoding method, which comprises: inputting plural coded data, and decoding the respective coded data; storing the decoding results into a memory; and when outputting the decoding results from the memory, controlling the output on the basis of a common time index. For example, in the case where three pictures are output to one picture-output device, a read-in of time indexes of these pictures is carried out at a specific time as in the case where one picture is output to one picture-output device, whereby output control can be appropriately carried out.

According to a twenty-eighth aspect of the present invention, a decoding program is provided for making a computer execute a decoding method, which comprises: inputting plural coded data, and decoding the respective coded data; storing the decoding results into a memory; and when outputting the decoding results from the memory, reading a time index at a predetermined timing, obtaining a time index corresponding to each coded data from the read time index, and controlling the output on the basis of the time index corresponding to each coded data. Therefore, when plural pictures (channels) have different time indexes, a time index corresponding to one channel is held while time differences between this channel and the remaining channels are stored, whereby time indexes of the remaining channels can be calculated. As a result, even when plural channels of coded data have different time indexes, output control for these coded data can be appropriately carried out by obtaining the corresponding time indexes in a relatively simple process.

According to a twenty-ninth aspect of the present invention, in a decoding program for making a computer execute a decoding method, which is a method for inputting plural coded data and decoding the respective coded data, a maximum decoding time to be used when decoding each coded data is obtained on the basis of a period of time that is allowed for decoding a coding unit which is obtained from information described in each coded data, and the number of coded data to be decoded. When the maximum decoding time is reached in decoding each coded data, decoding of the coding unit of the coded data is terminated. Since decoding is forcefully terminated when it is not completed within a predetermined period of time, even when a defect occurs in decoding one coded data, decoding of other coded data can be normally carried out.

According to a thirtieth aspect of the present invention, in a decoding program for making a computer execute a decoding method, which is a method for inputting plural coded data and decoding the respective coded data, when normal decoding cannot be carried out for a coding unit of arbitrary coded data, a position where decoding is to be resumed is determined on the basis of the type of coding of the coding unit. Since there is a possibility that disordered pictures might be output when appropriate decoding cannot be carried out because of an absence of pictures to be referred to in decoding, a position where decoding is to be resumed is changed according to whether or not discarded pictures should be referred to in the decoding the subsequent pictures, whereby decoding can be resumed even for coded data which have not been normally decoded.

According to a thirty-first aspect of the present invention, in a decoding program for making a computer execute a decoding method, which is a method for inputting plural coded data and decoding the respective coded data, when searching for a position where decoding of each coded data is to be started, this search is performed for every coding unit, at a timing that is obtained according to information described in the coded data. Therefore, a header search is carried out not continuously but in picture units, whereby decoding can be appropriately started.

According to a thirty-second aspect of the present invention, in a decoding program for making a computer execute a decoding method, which is a method for inputting plural coded data and decoding the respective coded data, decoding of each coded data is changed with the type of decoding as a unit. Therefore, the process to be performed by the decoder is divided into plural stages, and the decoder is implemented so as to perform processes which are suited to the respective stages, whereby decoding of plural coded data with a single decoder can be realized with less resources.

According to a thirty-third aspect of the present invention, in a decoding program for making a computer execute a decoding method, which is a method for inputting plural coded data and decoding the respective coded data, a timing for starting decoding is determined on the basis of information described in each coded data. Therefore, when a coded picture is assigned not only with a time index of picture output but also with a time index of decoding timing, the timing of a header search may be synchronized with the time index of a decoding timing, whereby decoding can be started at an appropriate timing.

According to a thirty-fourth aspect of the present invention, in a recording medium in which a decoding program for making a computer execute a decoding method is recorded, where the decoding method is a method for inputting coded data and decoding the coded data to output decoded data, when decoding of coded data as a target of decoding is interrupted, the state of the decoder which performs decoding is saved. Furthermore, decoding is carried out after changing the target of decoding to another coded data, and decoding of coded data, which has been interrupted, is resumed after restoring the saved state of the decoding unit. Therefore, time-division decoding can be performed on plural coded data to be decoded, whereby the plural coded data can be decoded apparently at the same time by using a single decoder.

According to a thirty-fifth aspect of the present invention, in a recording medium in which a decoding program for making a computer execute a decoding method is recorded, where the decoding method is a method for inputting plural coded data and decoding the respective coded data, the plural coded data are decoded while changing the input of coded data at the boundary of coding units from coded data being currently decoded to another coded data. Therefore, the load on the decoding process is reduced as compared with the case where coded data to be decoded is switched at a position other than the boundary of coding units, whereby plural coded data can be decoded apparently at the same time by using a single decoder in a relatively simple process.

According to a thirty-sixth aspect of the present invention, in a recording medium in which a decoding program for making a computer execute a decoding method is recorded, where the decoding method is a method for inputting plural coded data and decoding the respective coded data, an order of coded data to be output is obtained according to information described in each coded data, and the coded data are selectively decoded according to the obtained order. Therefore, a target video stream to be processed can be changed at a predetermined timing, such as a header of a slice in MPEG2 data, whereby plural coded data can be simultaneously decoded with a single decoder by optimizing the order of video streams to be decoded, even when the processing performance is low. As a result, apparently-simultaneous decoding of plural coded data by using a single decoder is realized with lower processing performance.

According to a thirty-seventh aspect of the present invention, a recording medium is provided in which a decoding program for making a computer execute a decoding method is recorded. The decoding method comprises: changing coded data to be decoded among plural coded data, according to an instruction; decoding the coded data to be decoded; storing the decoding results in a memory; and performing a predetermined output when the arrangement of regions in the memory for holding the decoding results is altered with the change of coded data to be decoded according to the instruction. For example, when a process of decoding plural pictures and a process of decoding one picture of a larger size are successively carried out, the arrangement of buffers in a frame memory is altered, and this alteration might affect buffers relating to picture output. Therefore, after the alteration of this arrangement, a background color is continuously output until normal output becomes possible, whereby incorrect output can be suppressed even when the target of decoding is changed.

According to a thirty-eighth aspect of the present invention, a recording medium is provided in which a decoding program for making a computer execute a decoding method is recorded. The decoding method comprises: inputting plural coded data into, and decoding the respective coded data; storing the decoding results into a memory; and when outputting the decoding results from the memory, controlling the output on the basis of a common time index. For example, in the case where three pictures are output to one picture-output device, a read-in of time indexes of these pictures is carried out at a specific time as in the case where one picture is output to one picture-output device, whereby output control can be appropriately carried out.

According to a thirty-ninth aspect of the present invention, a recording medium is provided in which a decoding program for making a computer execute a decoding method is recorded. The decoding method comprises: inputting plural coded data, and decoding the respective coded data; storing the decoding results into a memory; and when outputting the decoding results from the memory, reading a time index at a predetermined timing, obtaining a time index corresponding to each coded data from the read time index, and controlling the output on the basis of the time index corresponding to each coded data. Therefore, when plural pictures (channels) have different time indexes, a time index corresponding to one channel is held while time differences between this channel and the remaining channels are stored, whereby time indexes of the remaining channels can be calculated. As a result, even when plural channels of coded data have different time indexes, output control for these coded data can be appropriately carried out by obtaining the corresponding time indexes in a relatively simple process.

According to a fortieth aspect of the present invention, in a recording medium in which a decoding program for making a computer execute a decoding method is recorded, where the decoding method is a method for inputting plural coded data and decoding the respective coded data, a maximum decoding time to be used when decoding each coded data is obtained on the basis of a period of time that is allowed for decoding a coding unit which is obtained from information described in each coded data, and the number of coded data to be decoded. When the maximum decoding time is reached in decoding each coded data, decoding of the coding unit of the coded data is terminated. Since decoding is forcefully terminated when it is not completed within a predetermined period of time, even when a defect occurs in decoding one coded data, decoding of other coded data can be normally carried out.

According to a forty-first aspect of the present invention, in a recording medium in which a decoding program for making a computer execute a decoding method is recorded, where the decoding method is a method for inputting plural coded data and decoding the respective coded data, when normal decoding cannot be carried out for a coding unit of arbitrary coded data, a position where decoding is to be resumed is determined on the basis of the type of coding of the coding unit. Since there is a possibility that disordered pictures might be output when appropriate decoding cannot be carried out because of an absence of pictures to be referred to in the decoding, a position where decoding is to be resumed is changed according to whether or not discarded pictures should be referred to in decoding the subsequent pictures. As a result, decoding can be resumed even for coded data which have not been normally decoded.

According to a forty-second aspect of the present invention, in a recording medium in which a decoding program for making a computer execute a decoding method is recorded, where the decoding method is a method for inputting plural coded data and decoding the respective coded data, when searching for a position where decoding of each coded data is to be started, this search is performed for every coding unit, at a timing that is obtained according to information described in the coded data. Therefore, a header search is carried out not continuously but in picture units, whereby decoding can be appropriately started.

According to a forty-third aspect of the present invention, in a recording medium in which a decoding program for making a computer execute a decoding method is recorded, where the decoding method is a method for inputting plural coded data and decoding the respective coded data, decoding of each coded data is changed with the type of decoding as a unit. Therefore, the process to be performed by the decoder is divided into plural stages, and the decoder is implemented so as to perform processes which are suited to the respective stages, whereby decoding of plural coded data with a single decoder can be realized with less resources.

According to a forty-fourth aspect of the present invention, in a recording medium in which a decoding program for making a computer execute a decoding method is recorded, where the decoding method is a method for inputting plural coded data and decoding the respective coded data, a timing for starting decoding is determined on the basis of information described in each coded data. Therefore, when a coded picture is assigned not only with a time index of picture output but also with a time index of decoding timing, the timing of a header search may be synchronized with the time index of decoding timing, whereby decoding can be started at an appropriate timing.

BRIEF DESCRIPTION OF THE DRAWINGS

FIG. 3 is a diagram for explaining plural bit streams.

FIG. 4 is a diagram for explaining the result of demultiplexing the plural bit streams.

FIG. 5 is a block diagram illustrating a first example of a bit stream output circuit.

FIG. 28 is a diagram illustrating a process for outputting one picture.

DETAILED DESCRIPTION OF THE PREFERRED EMBODIMENTS

First Embodiment

A decoding apparatus according to a first embodiment of the present invention saves and holds the state of a decoding circuit by a decoding state holding circuit, and restores the state of the decoding circuit according to a change of a bit stream to be processed by the decoding circuit. As a result, plural bit streams can be decoded apparently at the same time by using a single decoding circuit.

Figure 1:
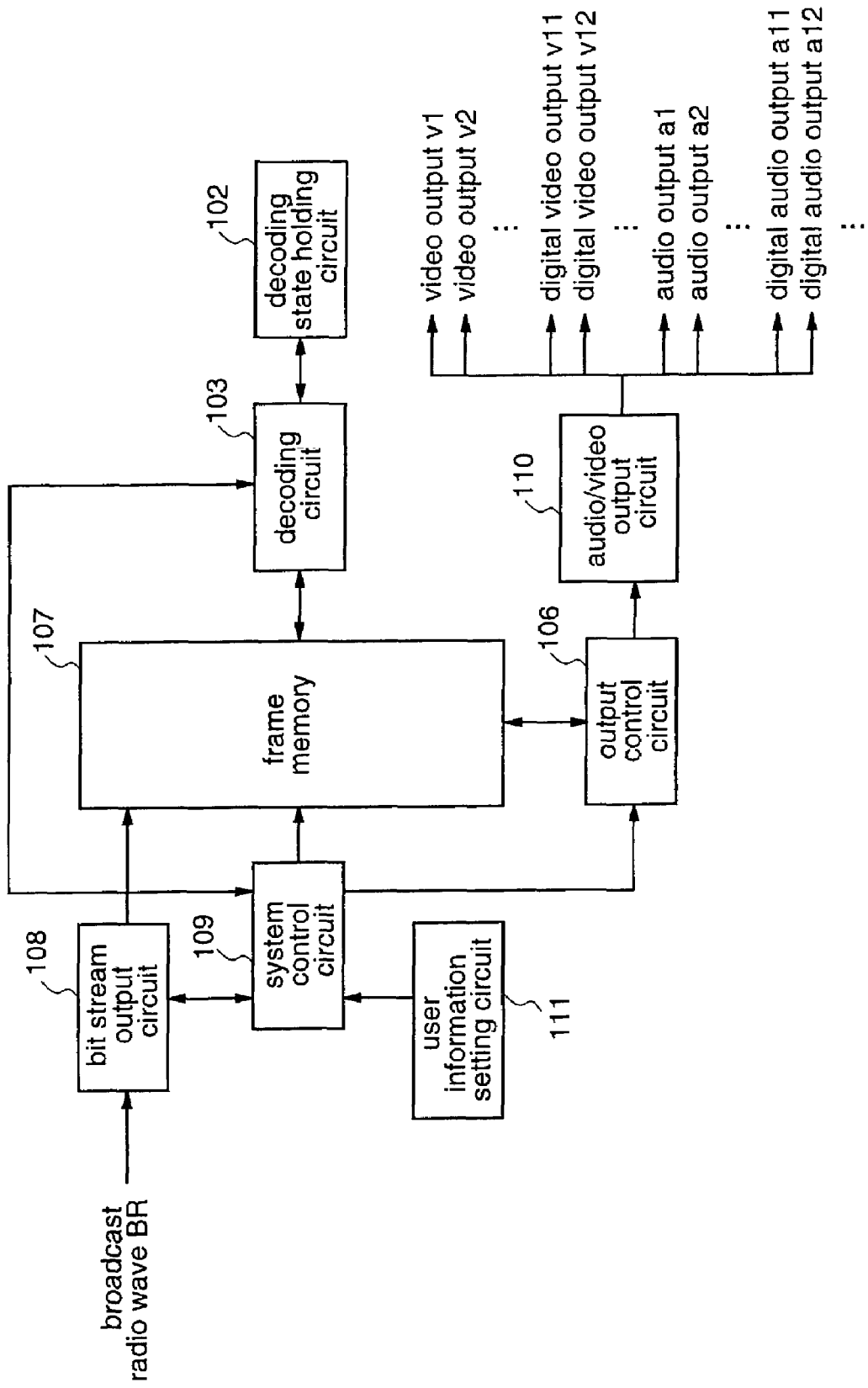
FIG. 1 is a block diagram illustrating the construction of a decoding apparatus according to the present invention.

FIG. 1 is a block diagram illustrating the construction of a decoding apparatus according to the first embodiment of the present invention. As shown in FIG. 1, the decoding apparatus according to the first embodiment is different from the conventional apparatus in the following two points. First, the decoding apparatus of the first embodiment is provided with a decoding state holding circuit. Second, the decoding apparatus of the first embodiment is provided with an output control circuit instead of the synthesis circuit.

With reference to FIG. 1, reference numeral 108 denotes a bit stream output circuit for outputting plural bit streams; reference numeral 107 denotes a frame memory (memory) in which the plural bit streams from the bit stream output circuit 108 are stored in frame units; reference numeral 103 denotes a single decoding circuit (decoder) for decoding the plural bit streams; reference numeral 102 denotes a decoding state holding circuit (decoding state holder) for holding the decoding state of the decoding circuit 103; reference numeral 110 denotes an audio/video output circuit for outputting the decoded data of the plural bit streams, i.e., video outputs v1, v2, ..., audio outputs a1, a2, ..., digital video outputs v11, v12, ..., and digital audio outputs a11, a12, ..., and the like; reference numeral 106 denotes an output control circuit (output controller) for performing output control on the audio/video output circuit 110; reference numeral 109 denotes a system control circuit (system controller) for controlling the decoding apparatus; and reference numeral 111 denotes a user information setting circuit for setting user information on the system control circuit 109. The decoding circuit 103 may be constituted by exclusive hardware, or the decoding circuit 103 may be implemented by software of a computer such as a DSP (Digital Signal Processor).

The operation of the whole decoding apparatus is as follows. That is, a frequency band corresponding to one channel of an HDTV (High-Definition TV) is equivalent to a frequency band corresponding to plural channels of an SDTV (Standard-Definition TV). For example, a broadcast radio wave BR including information corresponding to three channels of the SDTV is inputted to the bit stream output circuit 108 to be demodulated by a front end (not shown) in the bit stream output circuit 108. The bit stream output circuit 108 takes SDTV channels 1, 2, and 3 as the result of demodulation, and outputs them to the frame memory 107. Then, bit streams corresponding to the SDTV broadcasts of the respective channels, which are stored in the frame memory 107, are controlled by the system control circuit 109 as follows. For example, the SDTV channel 1 is decoded by the decoding circuit 103, and the state of the decoding circuit 103 is saved in the decoding state holding circuit 102 when decoding of a predetermined amount of data, such as one frame of data, is completed. Thereafter, the next SDTV channel 2 is decoded by the decoding circuit 103, and similarly, the state of the decoding circuit 103 is saved in the decoding state holding circuit 102 when decoding of a predetermined amount of data, such as one frame of data, is completed. The above-mentioned operation is circularly repeated like channel 1→channel 2→channel 3→channel 1→ . . .

Since the state of the decoding circuit 103 is stored in the decoding state holding circuit 102 when decoding for one frame is completed, the decoding circuit 103 recalls the state at the point of time when decoding of the previous frame has been ended, from the decoding state holding circuit 102, when the above-mentioned operation makes one round to return to the first channel. Therefore, even when the channel being decoded is changed during the operation, the decoding circuit 103 can transit to decoding of the next frame when returning to the first channel.

The audio/video output circuit 110 outputs video outputs v1, v2, . . . , digital video outputs v11, v12, . . . , audio outputs a1, a2, . . . , digital audio outputs a11, a12, . . . to the outside (i.e., external to the decoding apparatus), on the basis of the result of decoding for every channel, which is output from the output control circuit 106.

When the above-described operation is performed such that decoding for each channel of the SDTV is carried out at a speed three times or more as high as a speed that is required for decoding only one channel of the SDTV, one decoding apparatus can be operated in time division. As a result, demodulation of three channels can be carried out apparently at the same time.

The decoding apparatus according to the first embodiment is divided into three sections, i.e., an input section, a decoding section, and an output section, and the operations of the respective sections will be described hereinafter.

[Input Section]

The bit stream output circuit 108 receives a broadcast radio wave BR including plural digital broadcasts, and stores audio bit streams and video bit streams of plural channels, which are instructed by the system control circuit 109, into the frame memory 107. The construction of the bit stream output circuit 108 is shown in FIG. 2.

Figure 2:
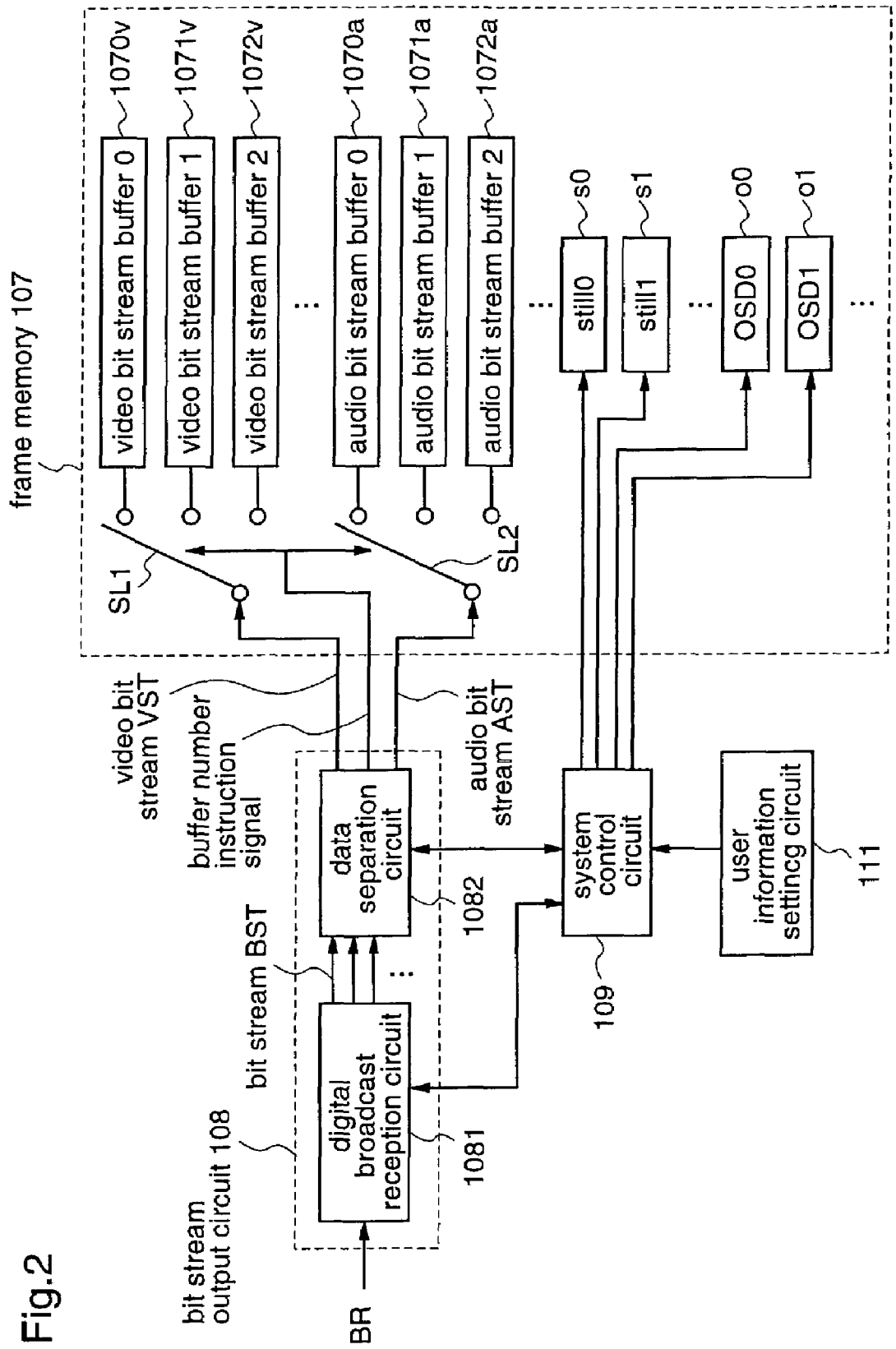
FIG. 2 is a block diagram illustrating the specific construction of an input section of the decoding apparatus according to the present invention.

With reference to FIG. 2, the bit stream output circuit 108 comprises a digital broadcast reception circuit 1081 and a data separation circuit 1082. The digital broadcast reception circuit 1081 receives the broadcast radio wave BR including plural digital broadcasts, and outputs a bit stream BST comprising bit streams BST0, BST1, BST2 corresponding to the respective broadcasts, as shown in FIG. 3. The broadcast radio wave BR including plural digital broadcasts may be a broadcast radio wave comprising plural SDTV programs to be broadcast in the same time zone, which are obtained by dividing the frequency band of one HDTV. Alternatively, the broadcast radio wave BR may be a broadcast radio wave comprising plural programs to be broadcast from one broadcast station by different broadcast systems for the respective programs. For example, there is a case where a program A is broadcast by the HDTV while a program B that follows the program A is broadcast by the SDTV, and such mixing of broadcast systems occurs when the copyright holders of the respective programs do not allow conversion of the broadcast systems. Furthermore, some of the bit streams BST0, BST1, and BST2 may be broadcast contents which are time-shifted by a D-VHS™ video deck or the like.

In the example of FIG. 3, each broadcast bit stream BST is composed of three pieces of data, and each data is composed of packets. As shown in FIG. 4, the data separation circuit 1082 separates, from the plural bit streams BST, audio bit streams AST (audio bit streams AST0, AST1, and AST2) and video bit streams VST (video bit streams VST0, VST1, and VST2) according to an instruction from the system control circuit 109, and stores them into audio bit stream buffers 1070*a*, 1071*a*, and 1072*a* and corresponding video stream buffers 1070*v*, 1071*v*, and 1072*v* in the frame memory 107, which buffers are selected by mutually-ganged selectors SL2 and SL1. Thereby, as for the bit stream 0 shown in FIG. 4, packets included in data 00 of broadcast 0 are selected to be audio bit stream AST0, and packets included in data 01 of broadcast 0 are selected to be video bit stream VST0.

Examples of the constructions of the bit stream output circuit are shown in FIGS. 5, 6, 10, and 11.

In the bit stream output circuit shown in FIG. 5, digital broadcast reception circuits 10810, 10811, 10812, . . . and data separation circuits 10820, 10821, 10822, . . . , which are similar to those employed in the conventional apparatus, are respectively connected in series, and these series circuits are prepared by the same number as the bit streams, and are arranged in parallel with each other. Further, plural data separation buffers 10830, 10831, 10832, . . . for transferring the outputs from these serial circuits to the frame memory 107 are provided. These buffers are provided so as to correspond to the respective data separation circuits, and any of the outputs from the buffers is selected by the selector s1 to be output to the frame memory 107.

The bit stream output circuit shown in FIG. 5 can be easily constituted by the same circuits as those employed in the conventional apparatus.

Figure 6:
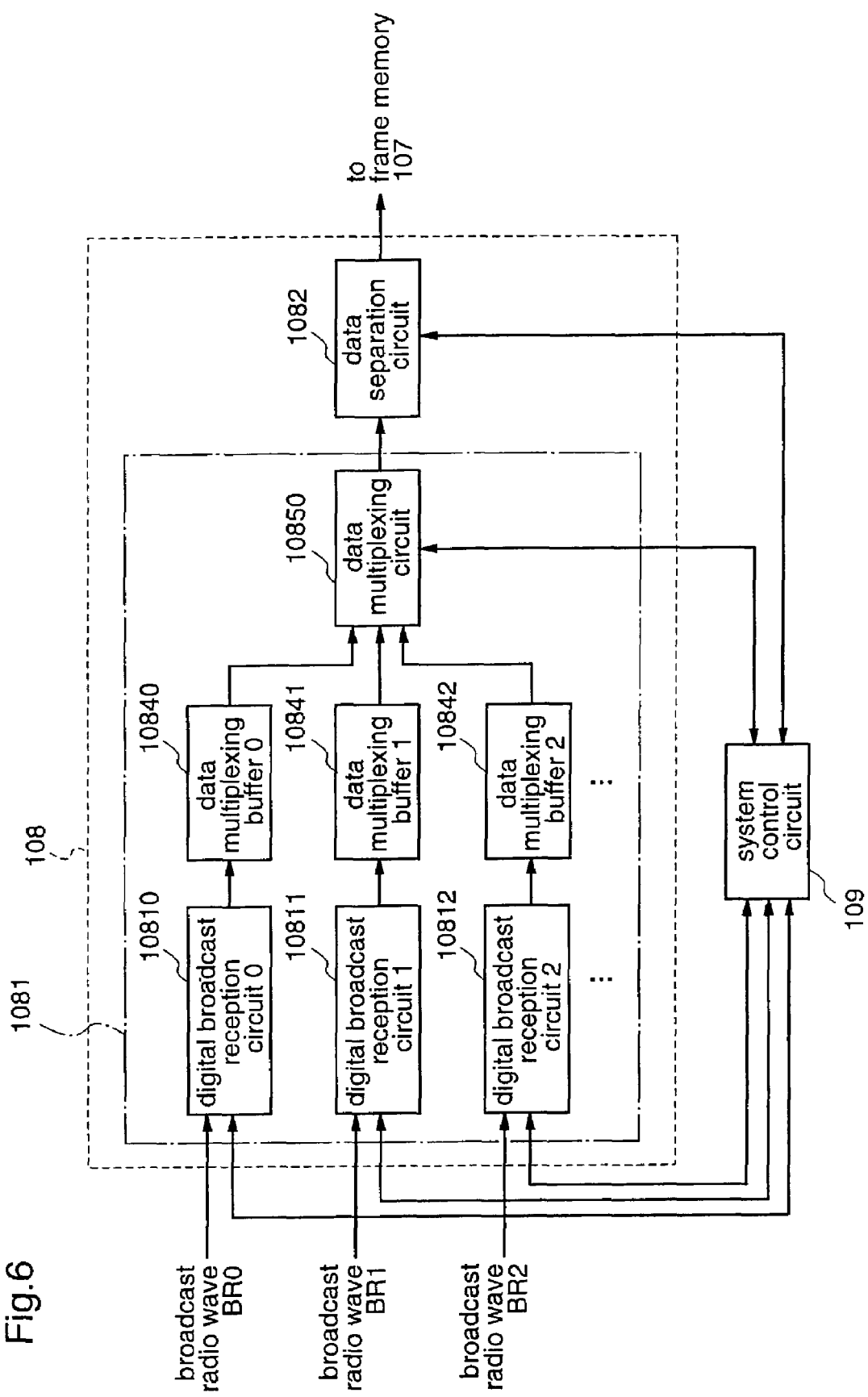
FIG. 6 is a block diagram illustrating a second example of a bit stream output circuit.
Figure 7:
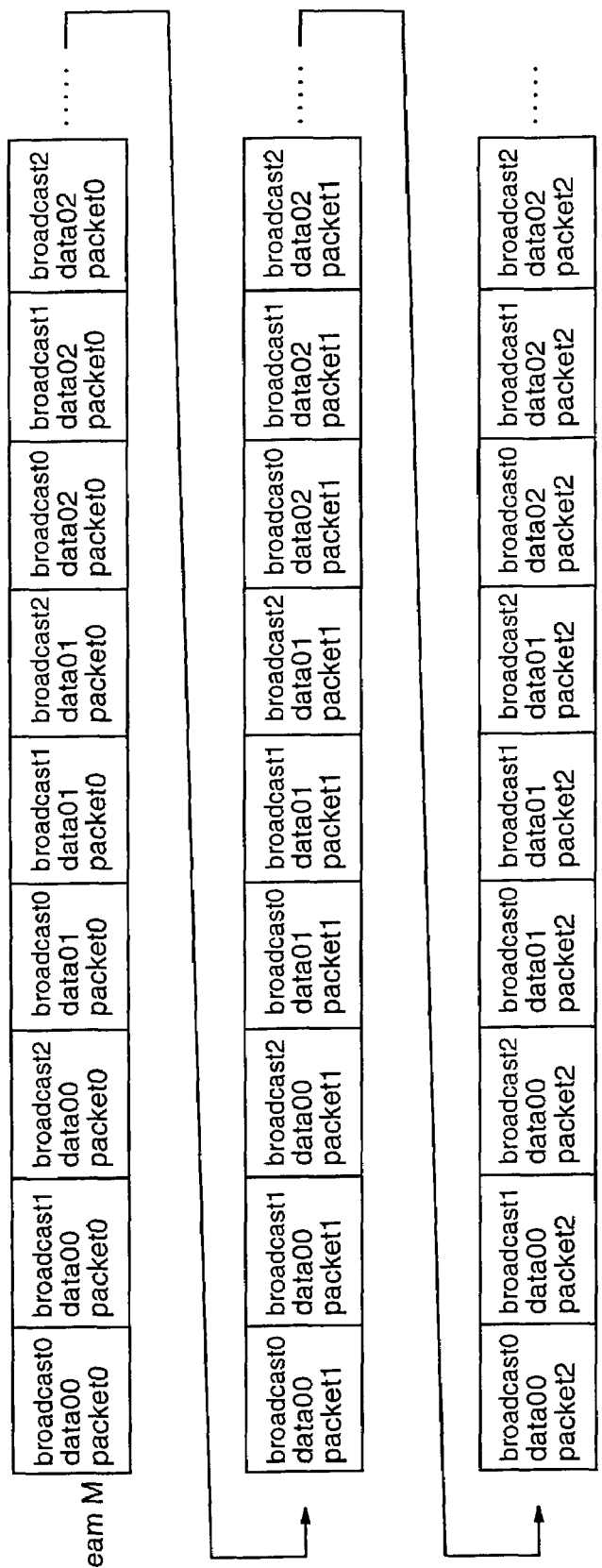
FIG. 7 is a diagram illustrating a bit stream that is generated in the bit stream output circuit shown in FIG. 6.

Next, in the bit stream output circuit shown in FIG. 6, digital broadcast reception circuits 10810, 10811, 10812, . . . , which are similar to those employed in the conventional apparatus, and data multiplexing buffers 10840, 10841, 10842, . . . are respectively connected in series, and these series circuits are prepared by the same number as the bit streams, and are arranged in parallel with each other. The bit streams outputted from the respective data multiplexing buffers are multiplexed by a data multiplexing circuit 10850 to obtain a bit stream M in which packets are serially arranged as shown in FIG. 7, and thereafter, audio bit streams and video bit streams to be processed are extracted by the data separation circuit 1082.

The reason why the data multiplexing buffer is provided between each digital broadcast reception circuit and the data multiplexing circuit is as follows. When the data multiplexing circuit 10850 simply performs multiplexing of packets to generate a single bit stream, there may occur a mismatch in time information used by each bit stream or in instruction information indicating each audio stream/video stream. The data multiplexing buffer performs correction to prevent such a mismatch.

For example, as for time information, a specific bit stream is determined as a reference, and a difference in time information between the reference bit stream and another bit stream at a specific point of time is obtained. Then, the time information of the bit stream which is not the reference is corrected by a value of the difference obtained. In an example shown in FIG. 8, D01 denotes a difference in time information between the bit stream BST0 and the bit stream BST1, and D02 denotes a difference in time information between the bit stream BST0 and the bit stream BST2. This processing must be performed not only for the time indexes indicated by the bit streams but also for all of the time information included in the bit streams, such as time indexes for outputting the decoded audio, time indexes for outputting decoded pictures, and the like. Further, as shown in FIG. 9, with respect to instruction information of each audio stream/video stream, it is changed so that instruction information di0 before correction and instruction information di1 after correction do not overlap each other.

When the bit stream outputted from the digital broadcast reception circuit 1081, which comprises the digital broadcast reception circuits 10810-10812, the data multiplexing buffers 10840-10842, and the data multiplexing circuit 10850 as shown in FIG. 6, is connected to a digital broadcast transmission circuit, the broadcasts received by the digital broadcast reception circuits 10810-10812 can be retransmitted by using a digital CATV or the like.

Figure 10:
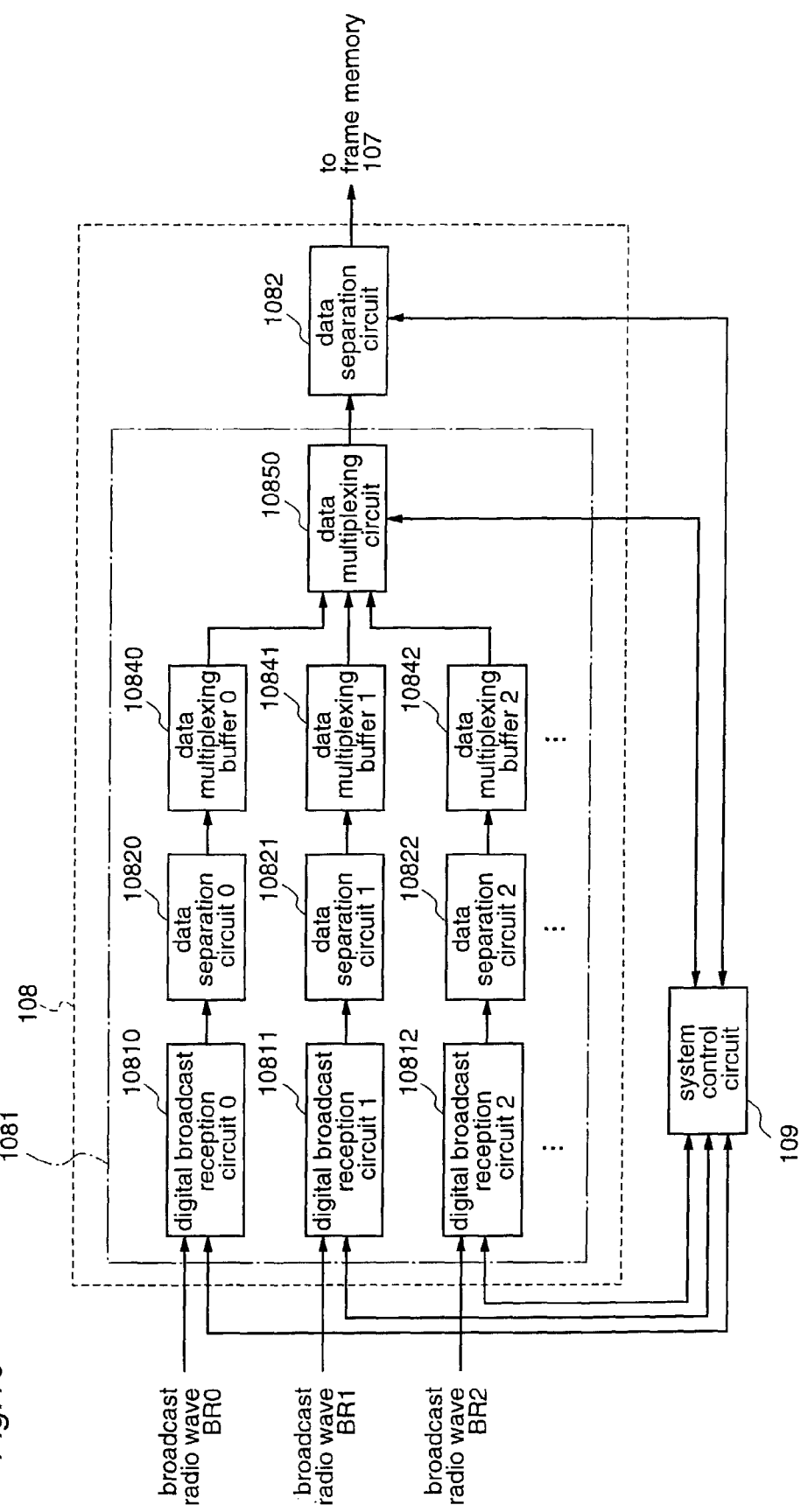
FIG. 10 is a block diagram illustrating a third example of a bit stream output circuit.

Although the bit stream output circuit shown in FIG. 10 is based on the bit stream output circuit shown in FIG. 6, the bit stream output circuit of FIG. 10 is different from the circuit shown in FIG. 6 in that data separation circuits 10820, 10821, 10822, . . . , which are similar to those employed in the conventional apparatus, are inserted between the digital broadcast reception circuits 10810, 10811, 10812, . . . and the data multiplexing buffers 10840, 10841, 10842, . . . , respectively. Thereby, data of unnecessary channels are not transmitted to the subsequent (downstream) circuits, and the condition of the band width required for the multiplexed stream in the stage after the bit stream output circuit is eased.

Figure 11:
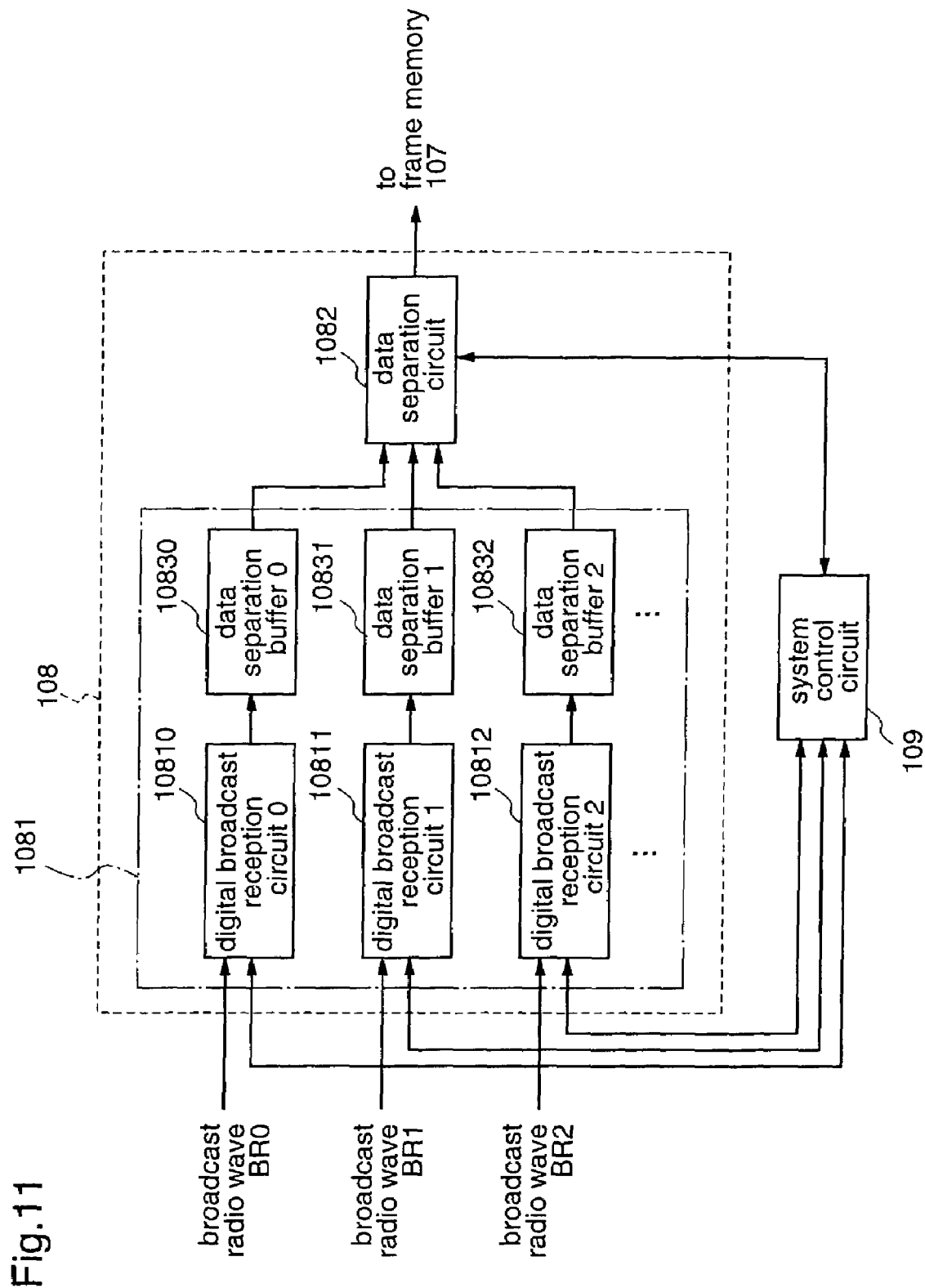
FIG. 11 is a block diagram illustrating a fourth example of a bit stream output circuit.

In the bit stream output circuit shown in FIG. 11, as in the conventional apparatus, digital broadcast reception circuits 10810, 10811, 10812, . . . which number as many as the bit streams that are prepared, and data separation buffers 10830, 10831, 10832, . . . for supplying the bit streams are provided between the respective digital broadcast reception circuits 10810, 10811, 10812, . . . and the data separation circuit 1082. As a result, the data separation circuit 1082 is provided with a function of separating the plural bit streams from the data separation buffers 10830, 10831, 10832, . . .

Figure 12:
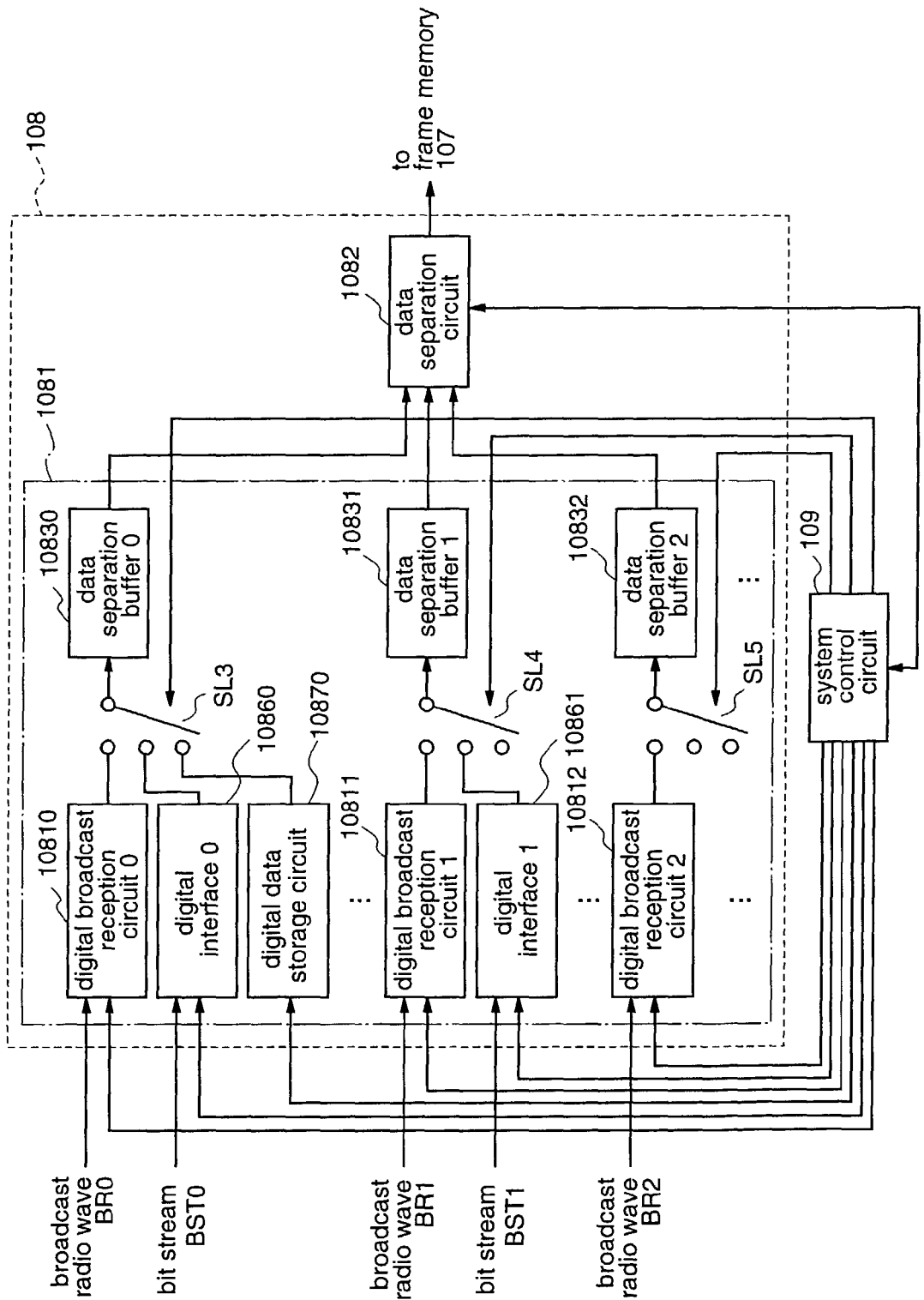
FIG. 12 is a block diagram illustrating a fifth example of a bit stream output circuit.

In the above-described bit stream output circuits, only the digital broadcast reception circuits are used as sources of bit streams. However, as shown in FIG. 12, digital interfaces 10860, 10861, . . . which capture bit streams from other digital equipment, and digital data storage circuits 10870, . . . which hold digital data may be used as sources of bit streams. In this case, the outputs from the digital interfaces and the digital data storage circuits are selected by selectors SL3, SL4, and SL5, and the selected outputs are stored in the data separation buffers 10830, 10831, 10832, . . . instead of the outputs of the digital broadcast reception circuits 10810, 10811, 10812, . . .

Figure 13:
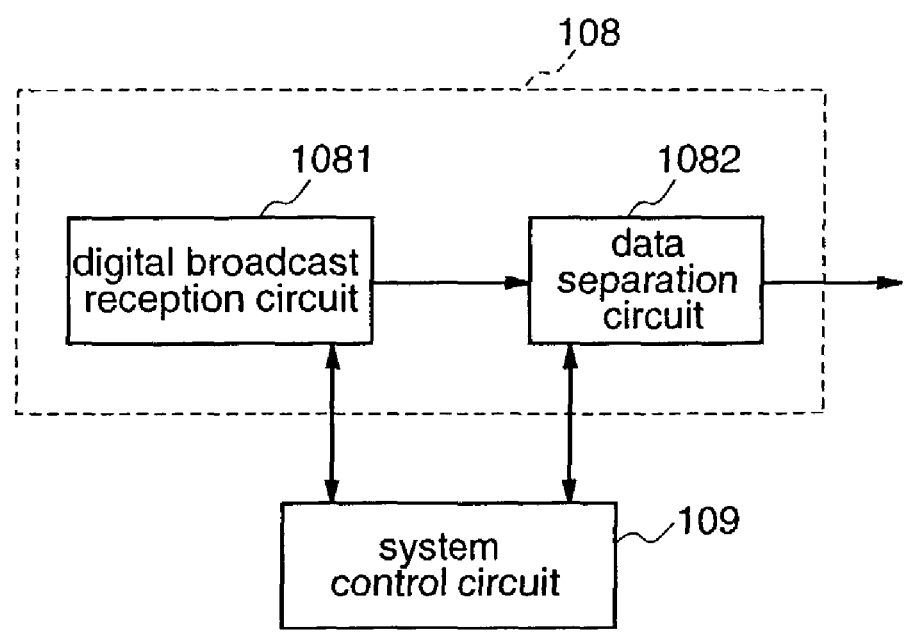
FIG. 13 is a block diagram illustrating a sixth example of a bit stream output circuit.

Further, in the case where a single broadcast including plural bit streams is decoded, like the case where three SDTV programs are broadcast by using one HDTV band, the bit stream output circuit 108 may comprise a digital broadcast reception circuit 1081 and a data separation circuit 1082 as shown in FIG. 13. Although, in FIG. 13, the supply of bit streams is realized by providing the digital broadcast reception circuit 1081 in the stage previous to the data separation circuit 1082, bit streams may be supplied from a recording medium such as a DVD.

[Decoding Section]

Figure 14:
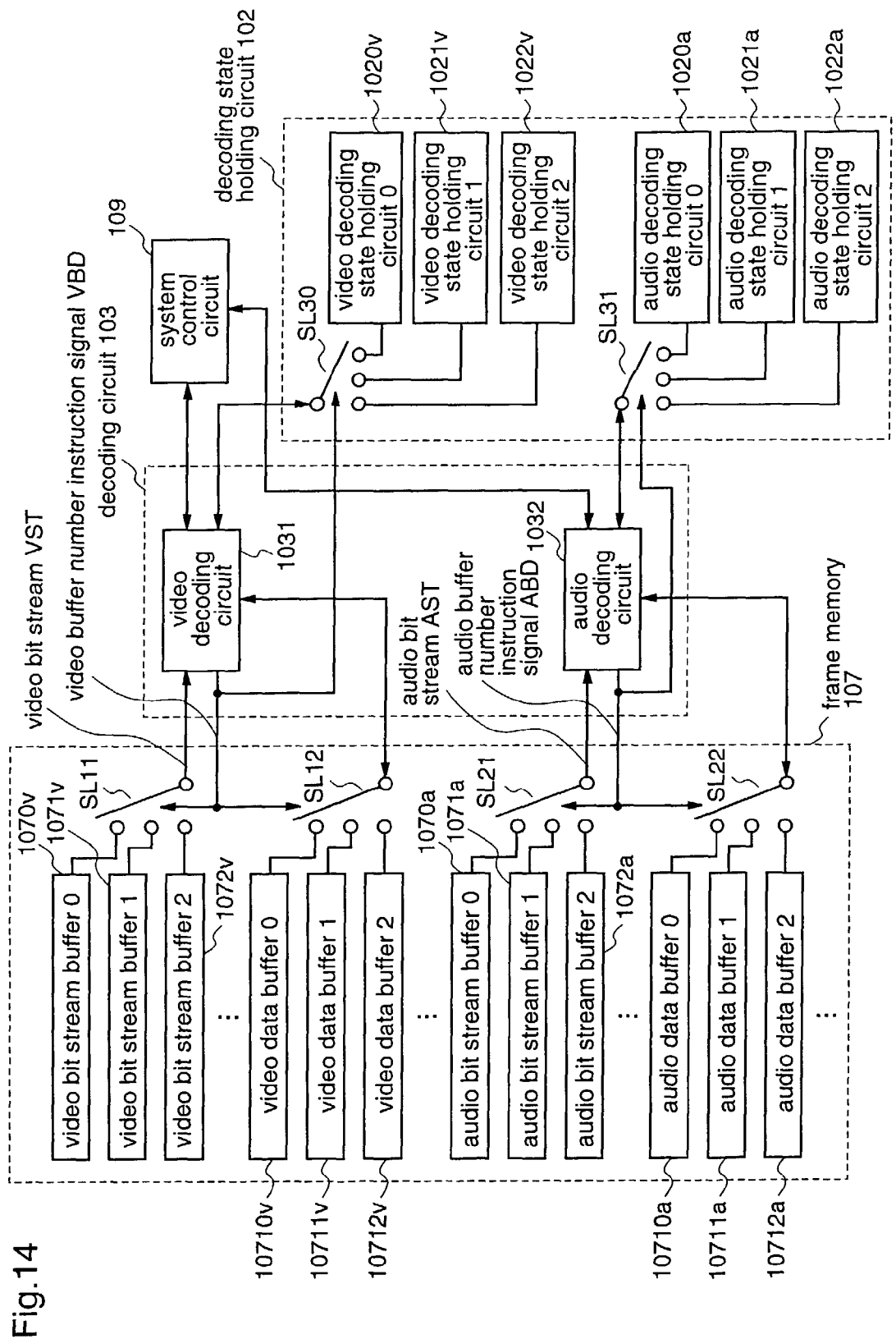
FIG. 14 is a block diagram illustrating the specific construction of a decoding section of the decoding apparatus according to the present invention.

Next, examples of the internal structures of the frame memory 107, decoding circuit 103, and decoding state holding circuit 102 are shown in FIG. 14. Fundamentally, the frame memory 107 selects any of video bit stream buffers 1070v, 1071v, 1072v, . . . with a selector SL11, and selects any of audio bit stream buffers 1070a, 1071a, 1072a, . . . with a selector SL21, thereby reading a video bit stream VST and an audio bit stream AST, respectively. Furthermore, a video decoding circuit 1031 and an audio decoding circuit 1032 decode video data and audio data, respectively, and the results of decoding are stored in any of video data buffers 10710v, 10711v, 10712v . . . and any of audio data buffers 10710a, 10711a, 10712a, . . . , which are selected by selectors SL12 and SL22 that are ganged with the selectors SL11 and SL21, respectively. At this time, which one of the plural buffers is to be a target of decoding is determined on the basis of a setting of the system control circuit 109, and a timing for changing the target buffer is determined in each of the decoding circuits 1031 and 1032. Further, a video buffer number instruction signal VBD and an audio buffer number instruction signal ABD, which indicate the results of determination, are transmitted to the selectors SL11, SL12 and to the selectors SL21, SL22.

Figure 15:
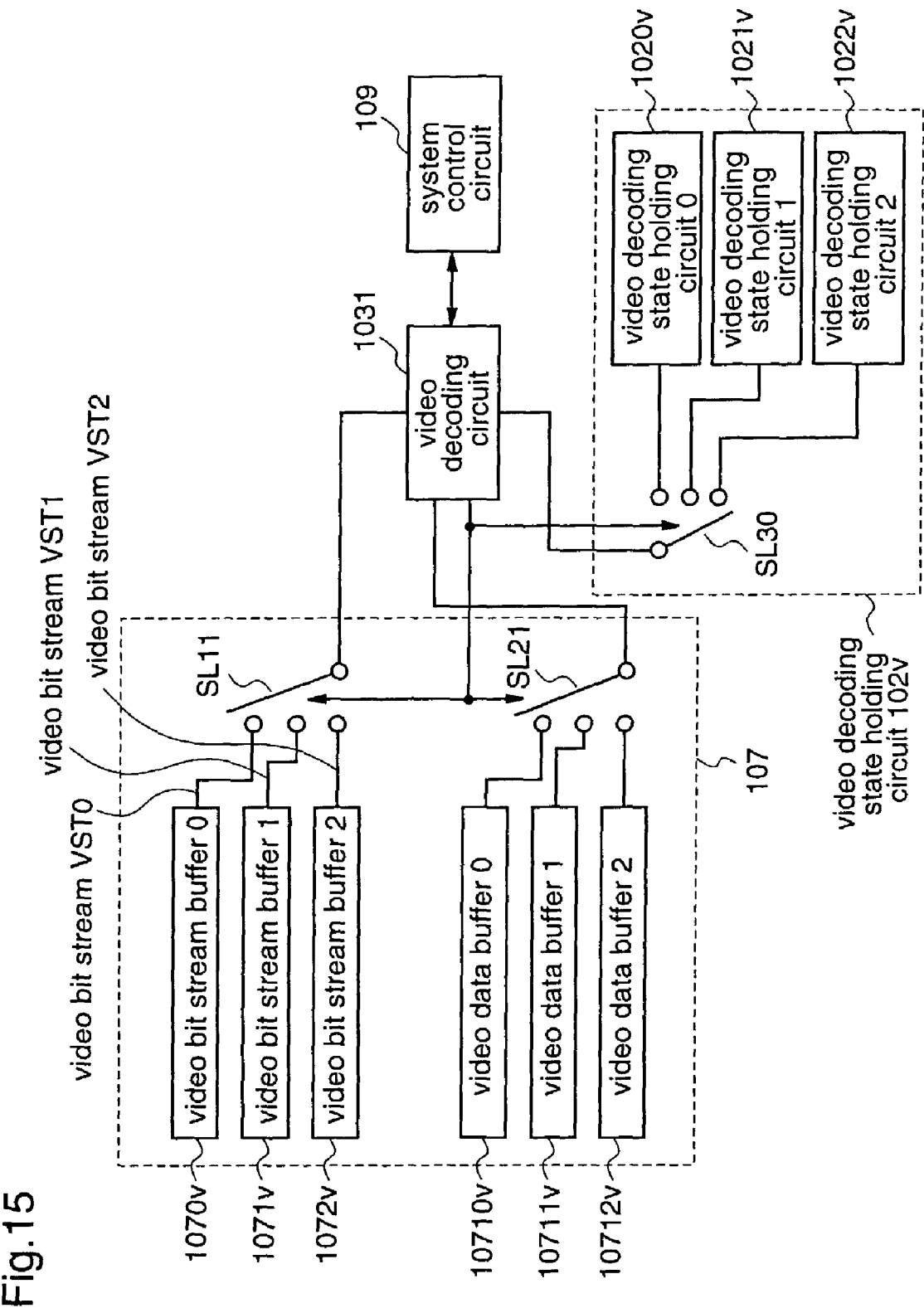
FIG. 15 is a diagram illustrating a part relating to video decoding, of the decoding section shown in FIG. 14.
Figure 16:
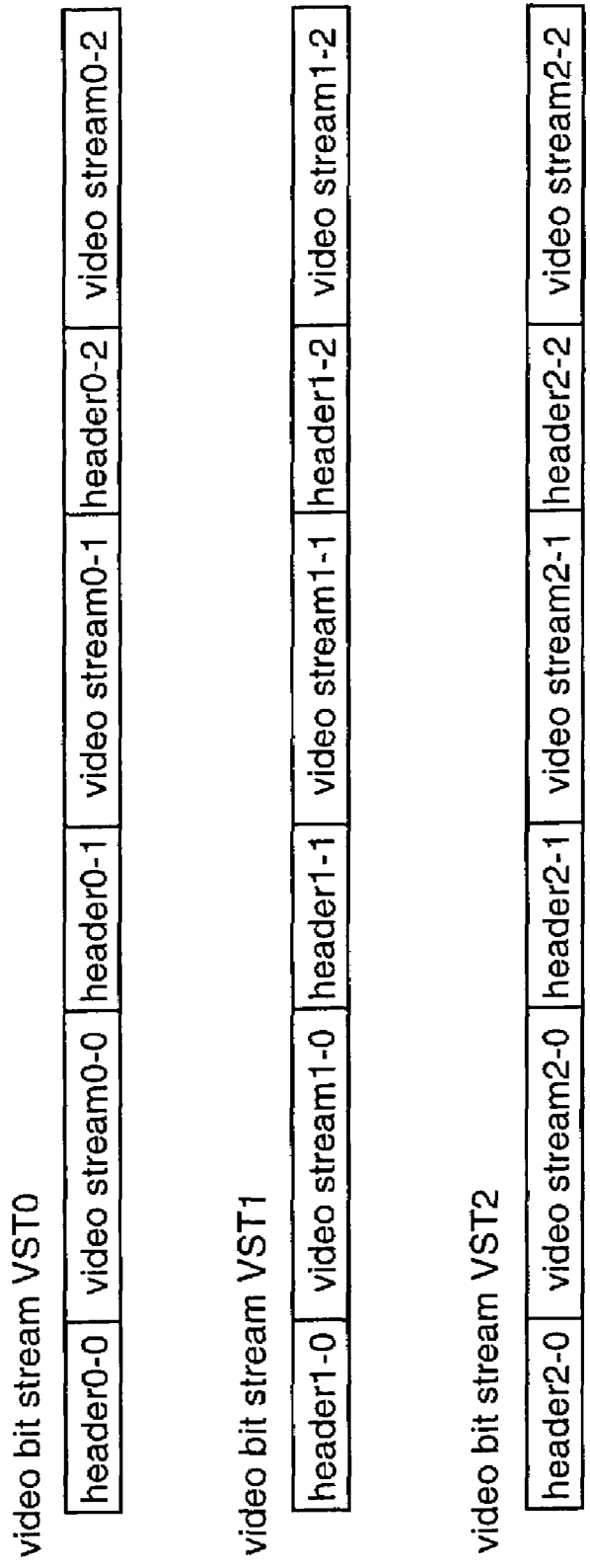
FIG. 16 is a diagram illustrating examples of video bit streams.

Hereinafter, the change of processing will be described with reference to FIGS. 16 to 24. Although only video processing will be described for the purpose of simplification, the same holds true for audio processing. FIG. 15 shows only a part relating to video decoding, of the whole structure shown in FIG. 14. FIG. 16 shows the outlines of video bit streams VST0, VST1, and VST2 to be supplied from the video bit stream buffers 1070v, 1071v, and 1072v to the video decoding circuit 1031, respectively. In FIG. 16, the video stream VST0 comprises header 0-0, video stream 0-0, header 0-1, video stream 0-1, header 0-2, and video stream 0-2, which are arranged in this order. These video bit streams are processed in the video decoding circuit 1031. At this time, the order in which the streams are to be output is determined according to information described in each video stream, and data are selected to be decoded according to the determined order. Further, and the target video bit stream to be processed is changed by the selector SL11 at a predetermined timing, such as a header of a slice in MPEG2. Thereby, complicated decoding process in the case where the target is changed at a timing other than a predetermined timing becomes unnecessary, and plural coded data can be simultaneously decoded with a single decoding circuit even when the processing performance is low.

Figure 17:
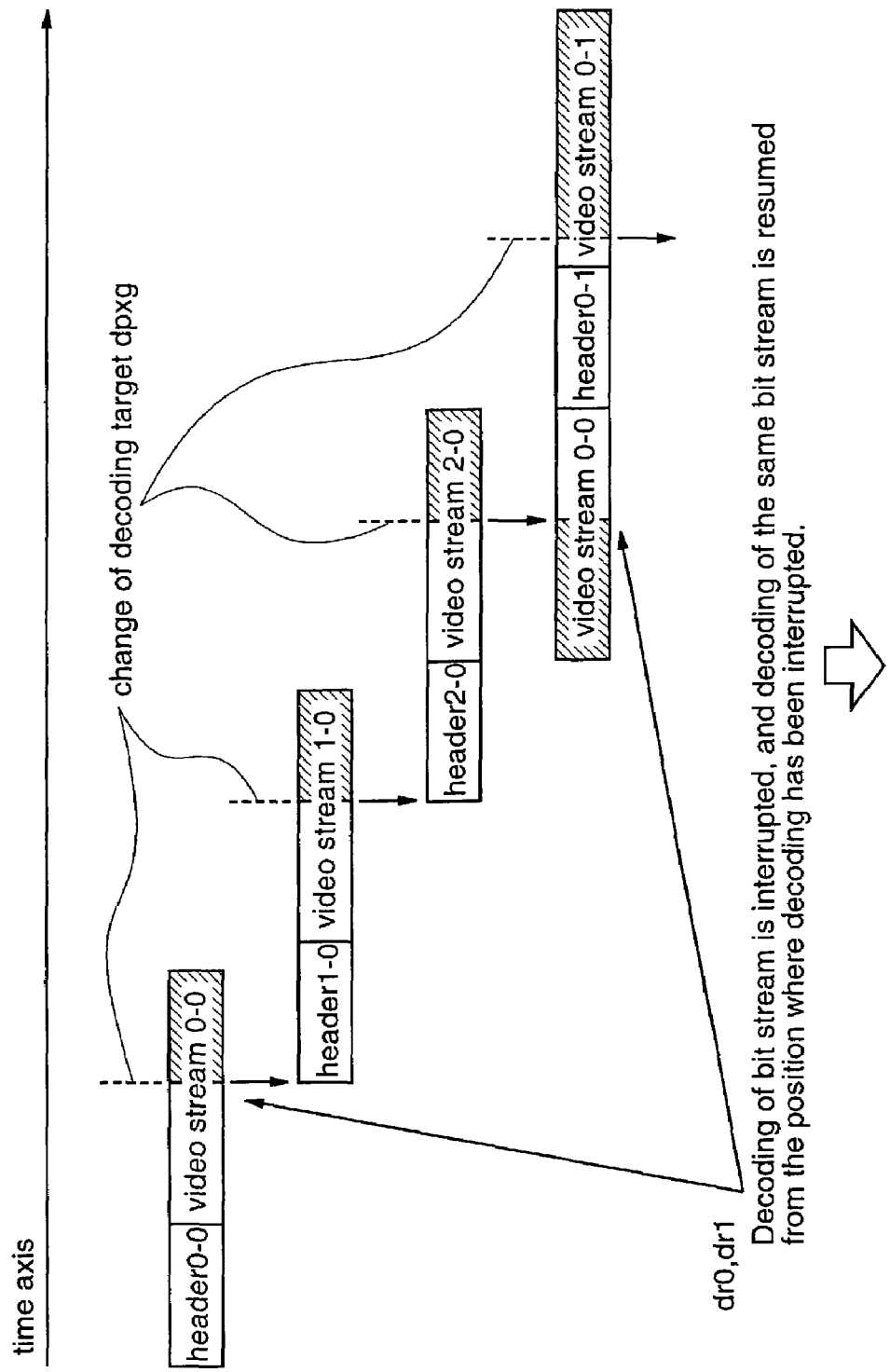
FIG. 17 is a diagram for explaining time-division-processing for plural video bit streams with a single decoding apparatus.

An example of this processing is shown in FIG. 17. In FIG. 17, decoding is circularly carried out in order of video bit streams 0, 1, 2. Initially, decoding of the video bit stream 0 is started. When decoding up to a position dpxg at which decoding should be interrupted (e.g., a breakpoint of frames or slices) is completed, decoding is interrupted at some midpoint in the video bit stream 0, and the decoding target is changed to the video bit stream 1. The decoding result is output to each of the video data buffers 10710v and 10711v by the selector SL21. In advance of the target change, information to be used for subsequent processing of the video bit stream 0 is stored, and the stored information must be read when resuming decoding from the position where decoding of the video bit stream 0 has been interrupted.

The video decoding state holding circuits 1020v, 1021v, and 1022v are circuits for holding the information. As examples of information to be stored, there are header information, and the state during decoding of the video stream (i.e., the state transition in the decoding circuit, the memory contents, and the like). Assuming that the video bit stream to be decoded is based on MPEG2, examples of information to be stored are as follows: information that appears on a syntax of an MPEG2 format (e.g., information as to whether or not Qmatrix information and pictures are progressive, information indicating the order in which DCT coefficients are coded, etc.), and information that does not appear on the syntax (information stored for predictive coding of DC components of a DCT, information stored for predictive coding of motion vectors, information indicating a reference frame to be used for inter-frame prediction, etc.).

For example, at a decoding interrupted point dr0 or a decoding resumed point dr1 shown in FIG. 17, the decoding state of the video bit stream 0 is stored in the video decoding state holding circuit 1020v, and thereafter, the decoding state of the previous video bit stream 1 is restored from the video decoding state holding circuit 1021v by the selector SL30 to transit the processing onto the video bit stream 1. By decoding the plural video bit streams within a processing unit time in repetition of the above-mentioned processes, the plural video bit streams can be simultaneously decoded by using a single decoding circuit.

Figure 18:
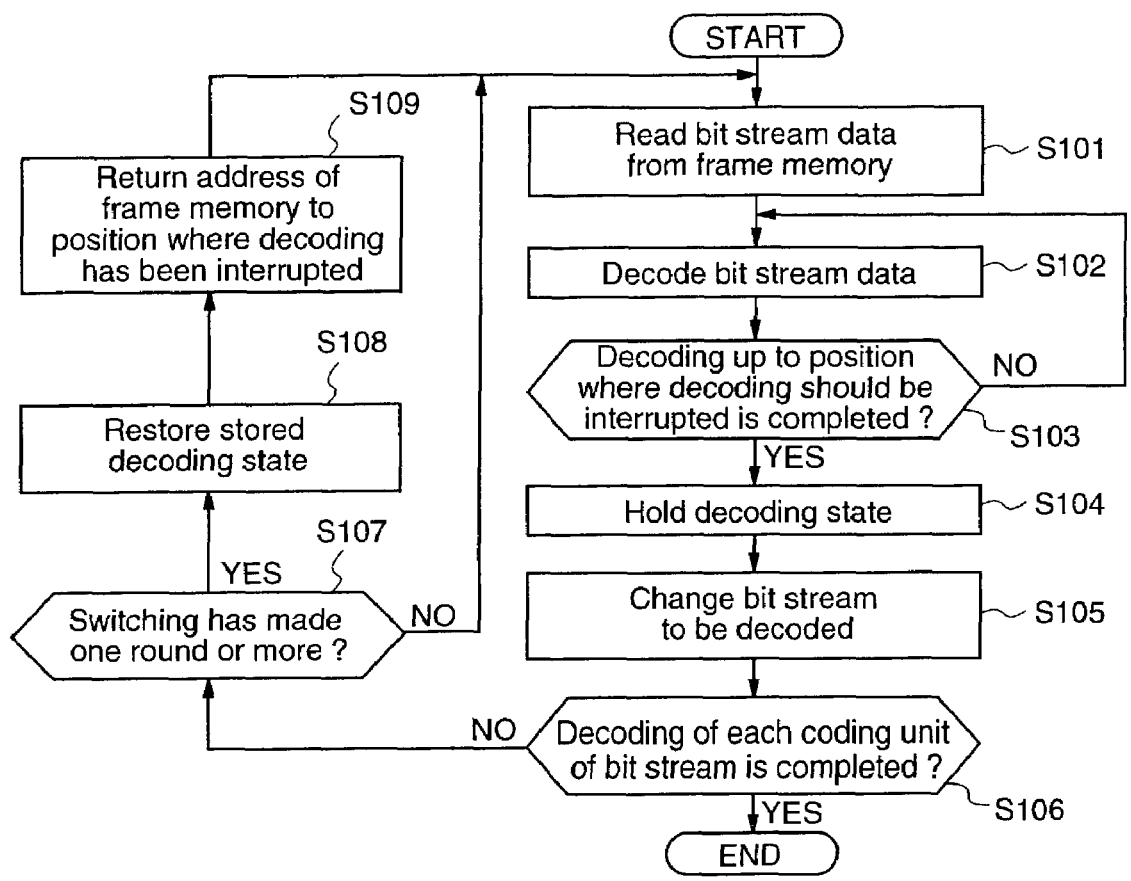
FIG. 18 is a flowchart illustrating the flow of process steps for time-division-processing plural video bit streams by using a single decoding circuit.

FIG. 18 is a flowchart illustrating a series of processes described above. Initially, bit stream data is read from the frame memory 107 (step S101). Next, the bit stream data is decoded by the decoding circuit 103 (step S102), and the decoding is continued until a position is reached where the decoding should be interrupted, such as an end of a slice in the video stream (step S103). When the position where the decoding should be interrupted is reached, the decoding state is stored in the decoding state holding circuit 102 (step S104), and the target bit stream to be decoded is changed (step S105). At this time, it is judged whether or not decoding of all coded units of the target bit stream has been completed. When decoding of all coded units of the target bit stream has not yet been completed (step S106), it is judged whether or not target switching has made more than one round (step S107). When target switching has made more than one round, the decoding state stored in the decoding state holding circuit 102 is returned to the decoding circuit 103 (step S108), and the address of the frame memory 107 is returned to the position where decoding has been interrupted (step S109), followed by step S101. On the other hand, when target switching has not made one round, steps S108 and S109 are bypassed to return to step S101.

Further, when interruption of decoding is not performed at some midpoint in the video stream but is performed at the boundary between the video stream being decoded and the header of the following video stream, since decoding of one processing unit with respect to the video stream itself has been completed at this change point dpxg, the amount of information to be stored in the video decoding state holding circuit can be reduced. Although, in FIG. 20, the decoding process is interrupted (i.e., the decoding target is changed) at a position between a point dr0 after the end of the video stream and a point dr1 before the start of the next header, the video stream and the next header may be processed continuously, and the decoding process may be interrupted at a position between the next header and the next video stream. In this case, since header information of the next video stream can be obtained in advance of decoding, preparation for decoding of the next video stream can be carried out before starting decoding.

Figure 19:
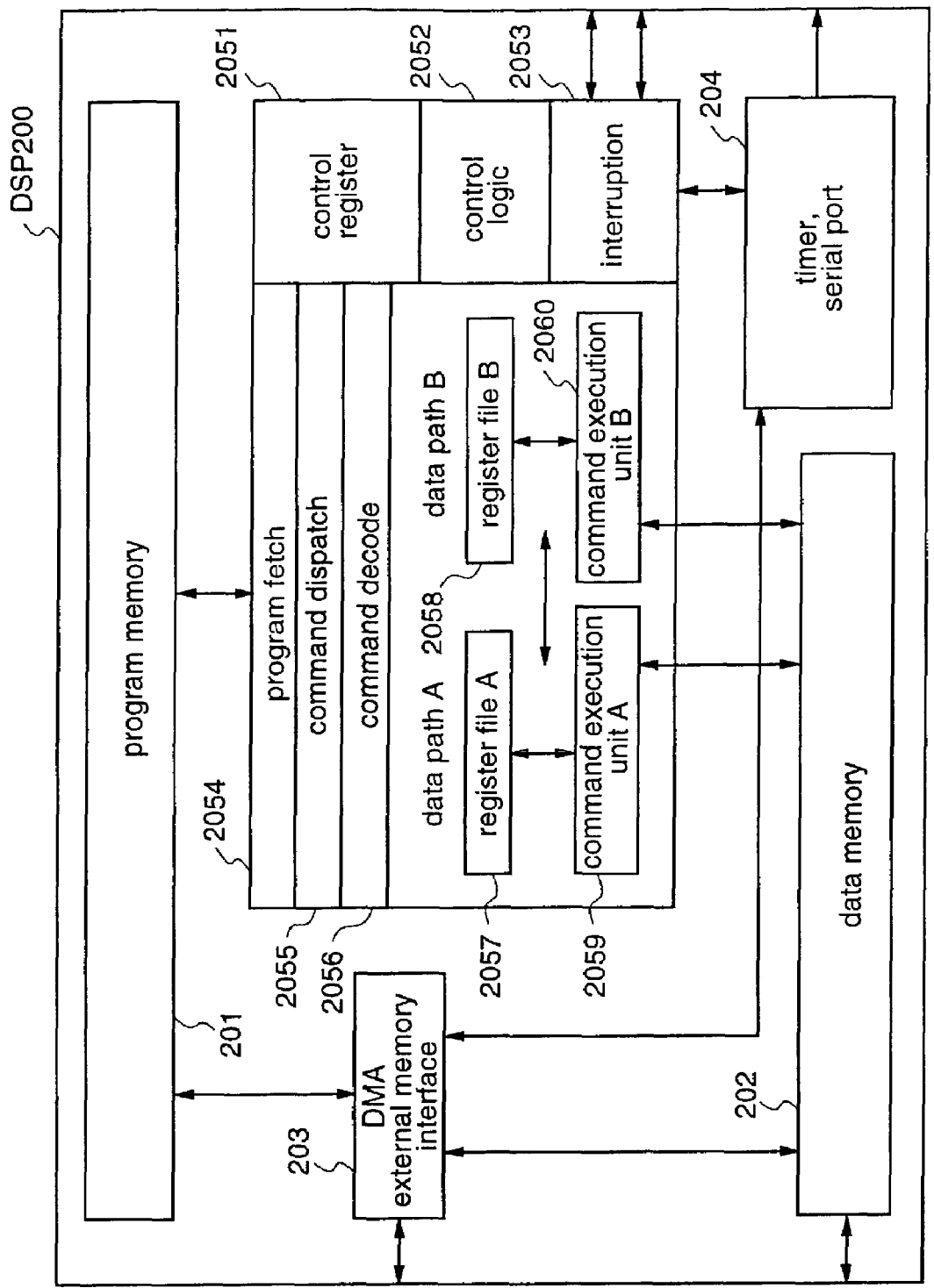
FIG. 19 is a block diagram illustrating the internal structure of a DSP (Digital Signal Processor).
Figure 20:
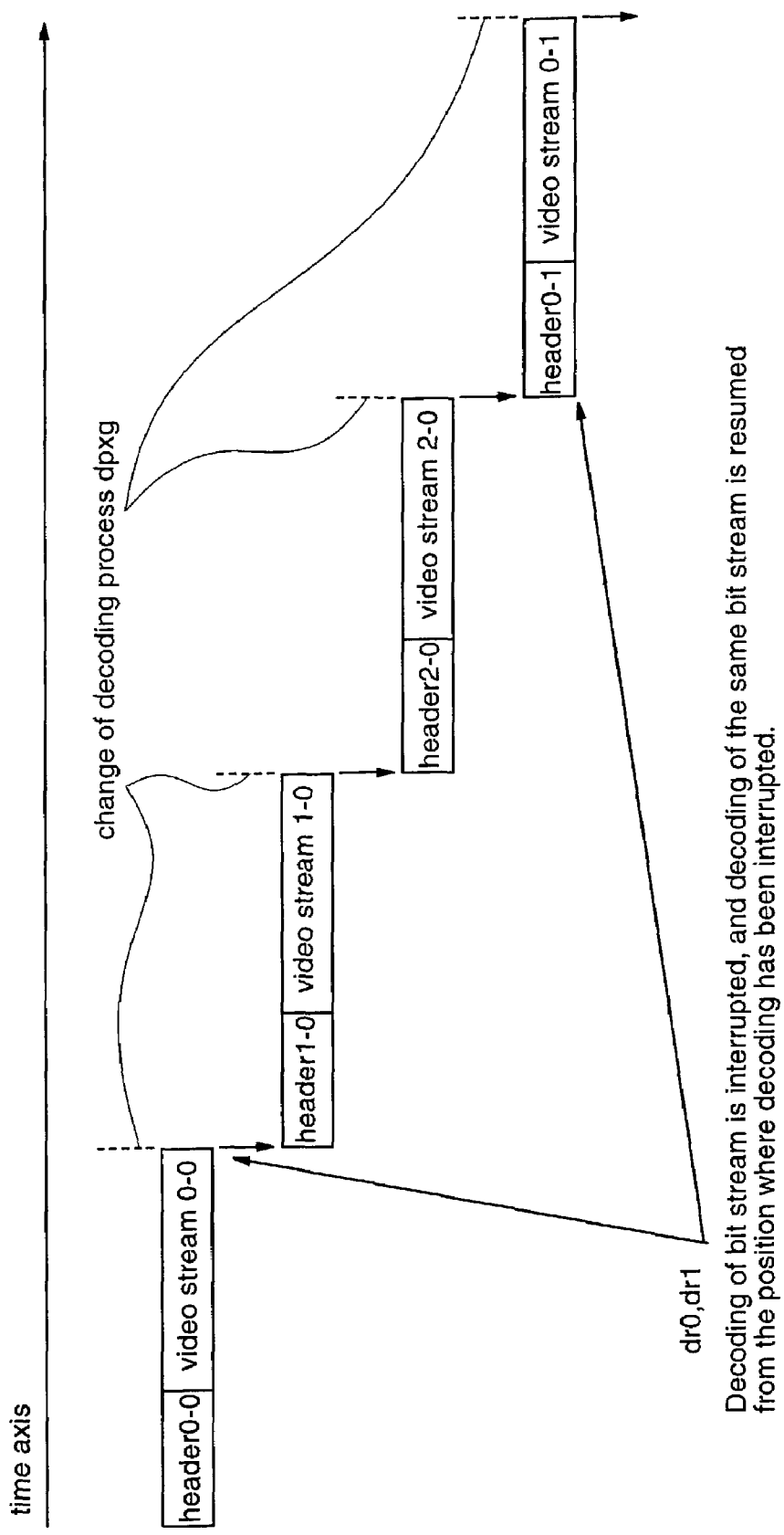
FIG. 20 is a diagram for explaining a case where the timing of time division shown in FIG. 17 is changed.

While the above description has been made from the viewpoint of circuit implementation, when software implementation by a DSP or the like is performed as shown in FIG. 19, the video decoding state holding circuit can be realized by a memory 202 in a DSP 200 and, in this case, saving and recovery of the decoding state can be realized by changing the address of the memory 202, which is indicated by a pointer (not shown). However, when a hardware accelerator for decoding is installed in the DSP 200, a state saving/recovery process for the hardware accelerator is further required, depending on the construction of the hardware accelerator.

In FIG. 19, reference numeral 201 denotes a program memory, reference numeral 203 denotes a DMA/external memory interface, reference numeral 204 denotes a timer/serial port, reference numeral 2051 denotes a control register, reference numeral 2052 denotes a control logic, reference numeral 2053 denotes an interruption circuit, reference numeral 2054 denotes a program fetch, reference numeral 2055 denotes a command dispatch, reference numeral 2056 denotes a command decode, reference numeral 2057 denotes a register file A, reference numeral 2058 denotes a register file B, reference numeral 2059 denotes a command execution unit A, and reference numeral 2060 denotes a command execution unit B.

Furthermore, the video decoding state holding circuit may be implemented by not only the memory in the DSP but also a region, part or whole of which is stored in the frame memory. In this case, however, the processing time might be increased because access to the frame memory requires more time than access to the memory in the DSP. If such an increase in the processing time does not matter much, the memory capacity for holding the decoding state to be secured in the DSP can be reduced.

Furthermore, in the case of software implementation, by completing audio decoding for plural target channels to be processed within a processing time for an audio coding unit as in the video decoding process described above, the decoding circuit can be implemented by a single circuit without being separated into a video decoding circuit and an audio decoding circuit, and as a result, plural audio and video streams can be simultaneously decoded. However, management of audio decoding and management of video decoding (management relating to switching of audio decoding target channel, and management relating to switching of video decoding target channel) should be separately carried out because of a difference in coding units between video and audio, and switching between the audio processing and the video processing may be performed during standby of the video decoding process. For example, audio decoding may be performed while waiting for completion of processing by the hardware accelerator during video decoding.

[Output Section]

Figure 21:
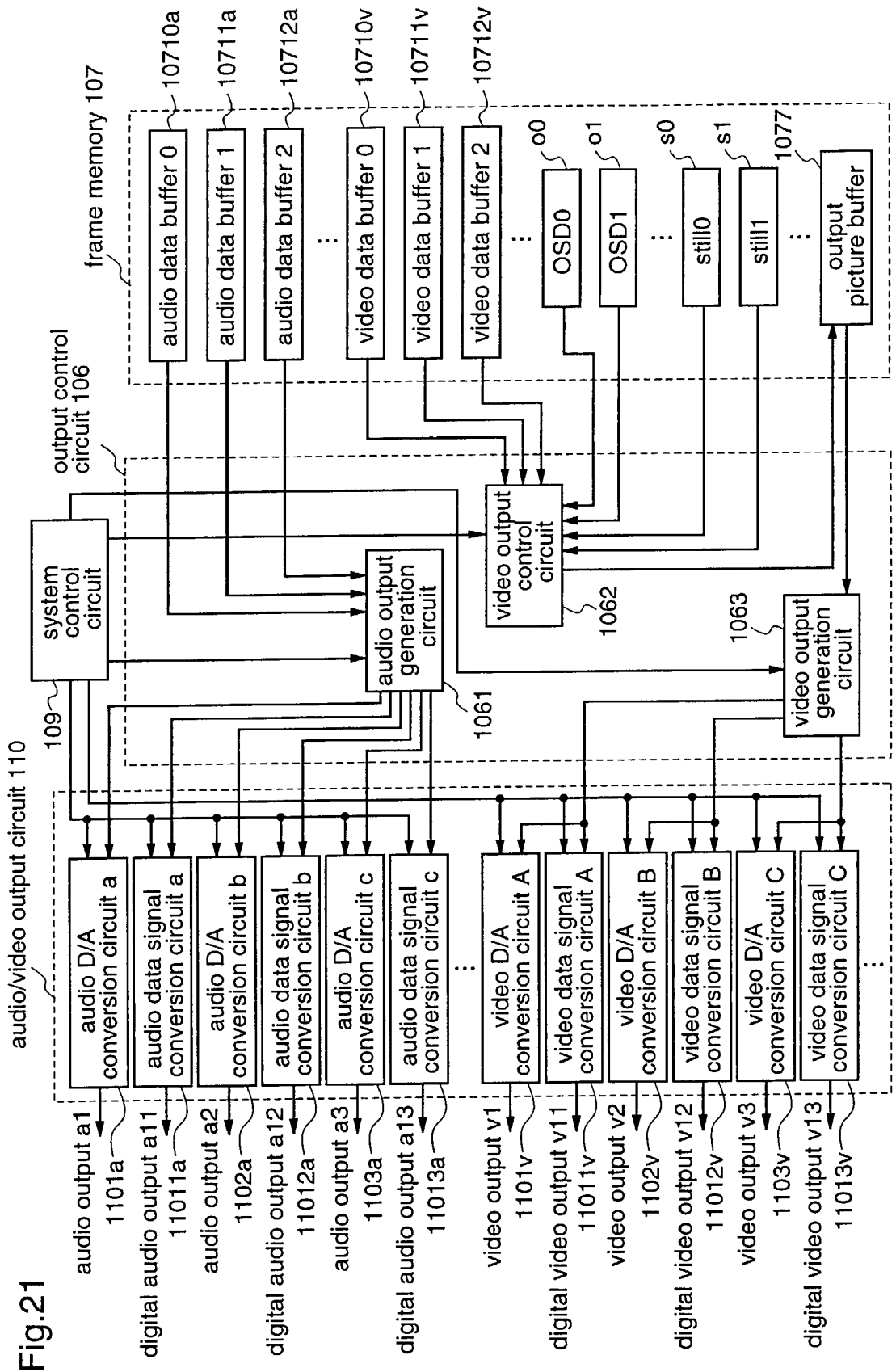
FIG. 21 is a block diagram illustrating the specific construction of an output section of the decoding apparatus according to the present invention.

Next, examples of the constructions of the frame memory 107, output control circuit 106, and system control circuit 109 relating to outputting of decoding results are shown in FIG. 21. With reference to FIG. 21, the results of decoding by the above-described audio decoding circuit and video decoding circuit are stored in an audio data buffers 10710a, 10711a, 10712a, . . . , video data buffers 10710v, 10711v, 10712v, . . . , and how to output the decoding results is controlled.

An audio output generation circuit 1061 controls output data from the audio data buffers 10710a, 10711a, 10712a, . . . on the basis of an instruction from the system control circuit 109, whereby audio outputs a1, a2, a3, . . . are output from audio D/A conversion circuits 1101a, 1102a, 1103a, . . . , and digital audio outputs a11, a12, a13, . . . are output from audio data signal conversion circuits 11011a, 11012a, 11013a, . . . , respectively.

At this time, although the audio D/A conversion circuits 1101a, 1102a, 1103a, . . . and the audio data signal conversion circuits 11011a, 11012a, 11013a, . . . are operated on the basis of the instruction from the system control circuit 109, these circuits may be operated according to an instruction from the audio output generation circuit 1061.

Figure 22:
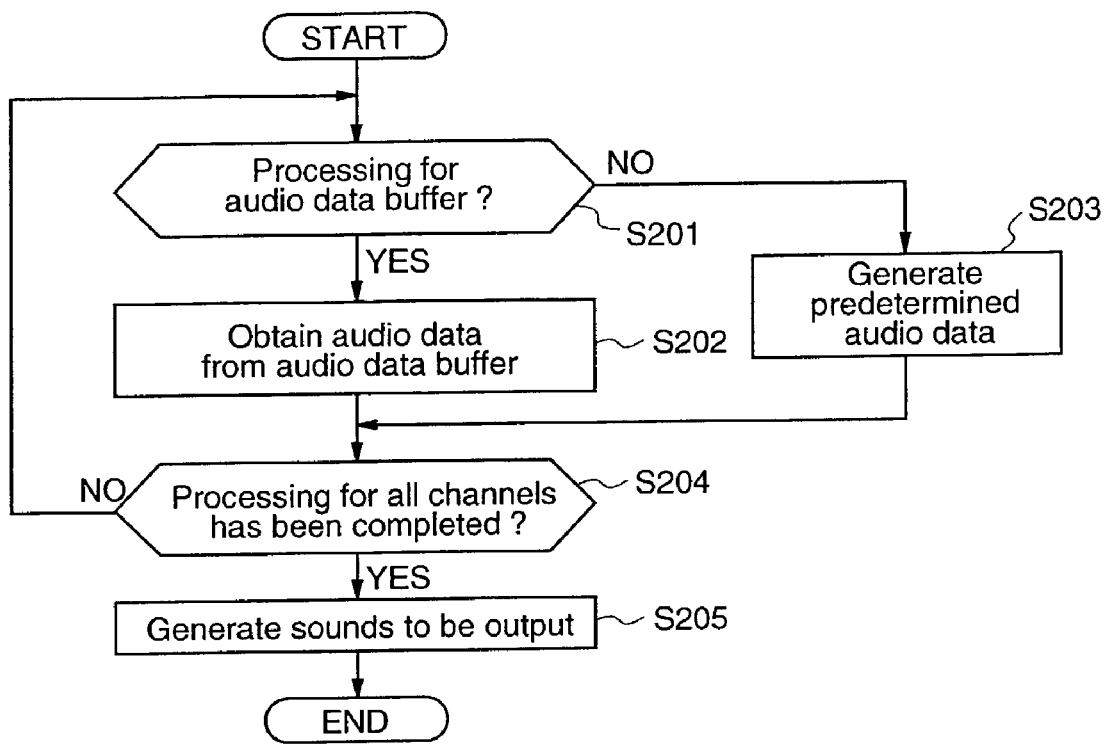
FIG. 22 is a flowchart illustrating the flow of process steps for generating audio outputs.

FIG. 22 is a flowchart for explaining a series of steps of the above-described processing. When the instruction from the system control circuit 109 is directed to any of the audio data buffers 1070a-1072a (step S201), the audio output generation circuit 1061 obtains audio data from the audio data buffer (any of the audio data buffers 1070a-1072a) (step S202). Otherwise, the system control circuit 109 or the decoding circuit 103 generates predetermined audio data such as audio data for silence (step S203). The above-mentioned steps are repeated for all channels (step S204), and digital signal processing is performed on the obtained audio data or the generated predetermined audio data to generate audio outputs, and the audio outputs are processed by the audio D/A conversion circuits 1101a-1103a and the audio signal conversion circuits 11011a-11013a to obtain audio outputs a1-a3 and digital audio outputs a11-a13, respectively (step S205).

The video output control circuit 1062 generates pictures to be output, from the video data buffers 10710v, 10711v, 10712v, . . . , on-screen display regions OSD0 o0, OSD1 o1, . . . , and still picture regions still0 s0, still1 s1, . . . , on the basis of an instruction from the system control circuit 109, and outputs these pictures to an output picture buffer 1077. A video output generation circuit 1063 outputs the pictures stored in the output picture buffer 1077, on the basis of an instruction from the system control circuit 109, to video D/A conversion circuits 1101v, 1102v, 1103v, . . . and video data signal conversion circuits 11011v, 11012v, 11013v, . . . The video D/A conversion circuits 1101v, 1102v, 1103v, . . . and video data signal conversion circuits 11011v, 11012v, 11013v, . . . output video outputs v1, v2, v3, . . . , and digital video outputs v11, v12, v13, . . . , respectively.

Figure 23:
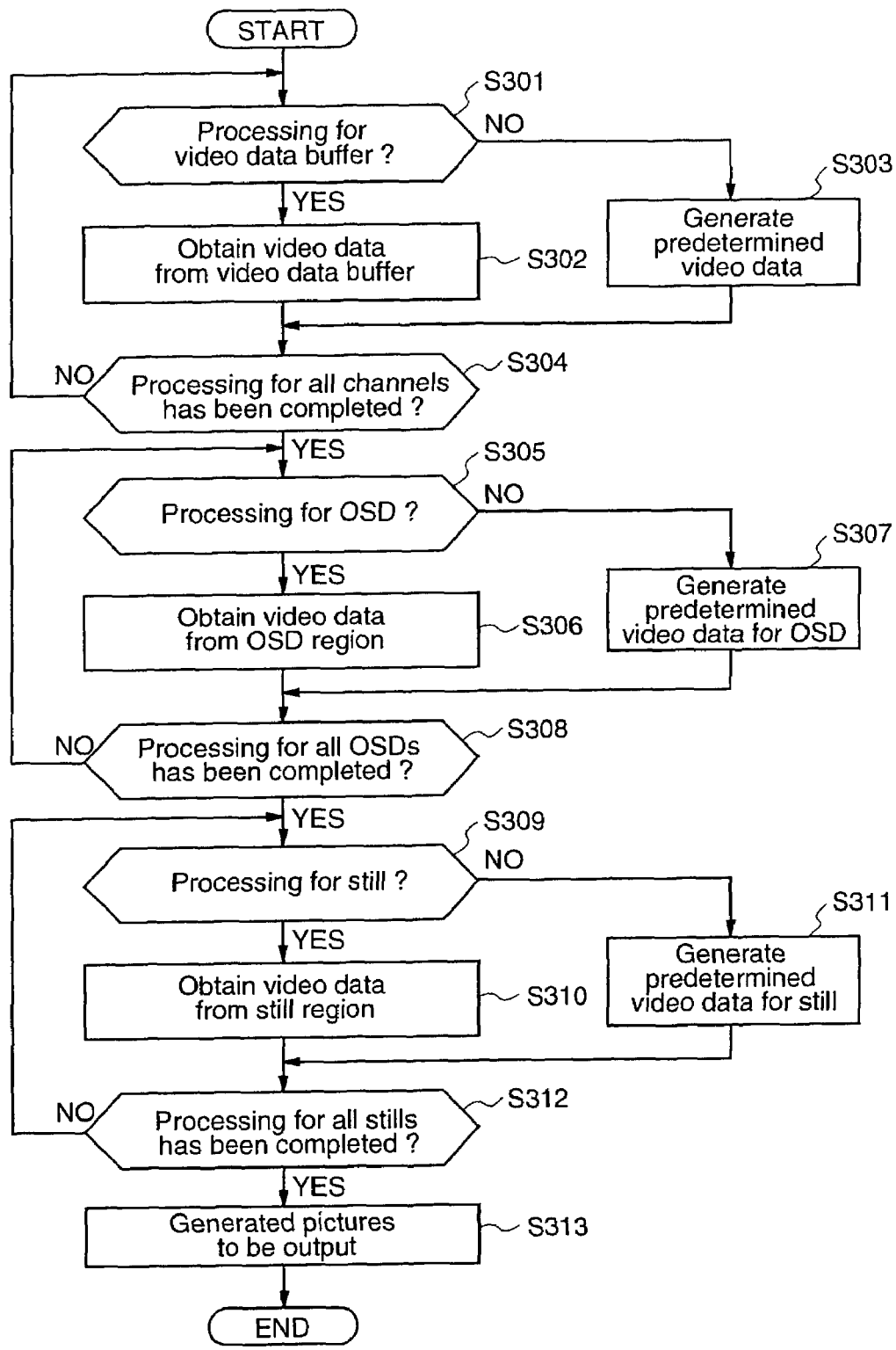
FIG. 23 is a flowchart illustrating the flow of process steps for generating video outputs.
Figure 24:
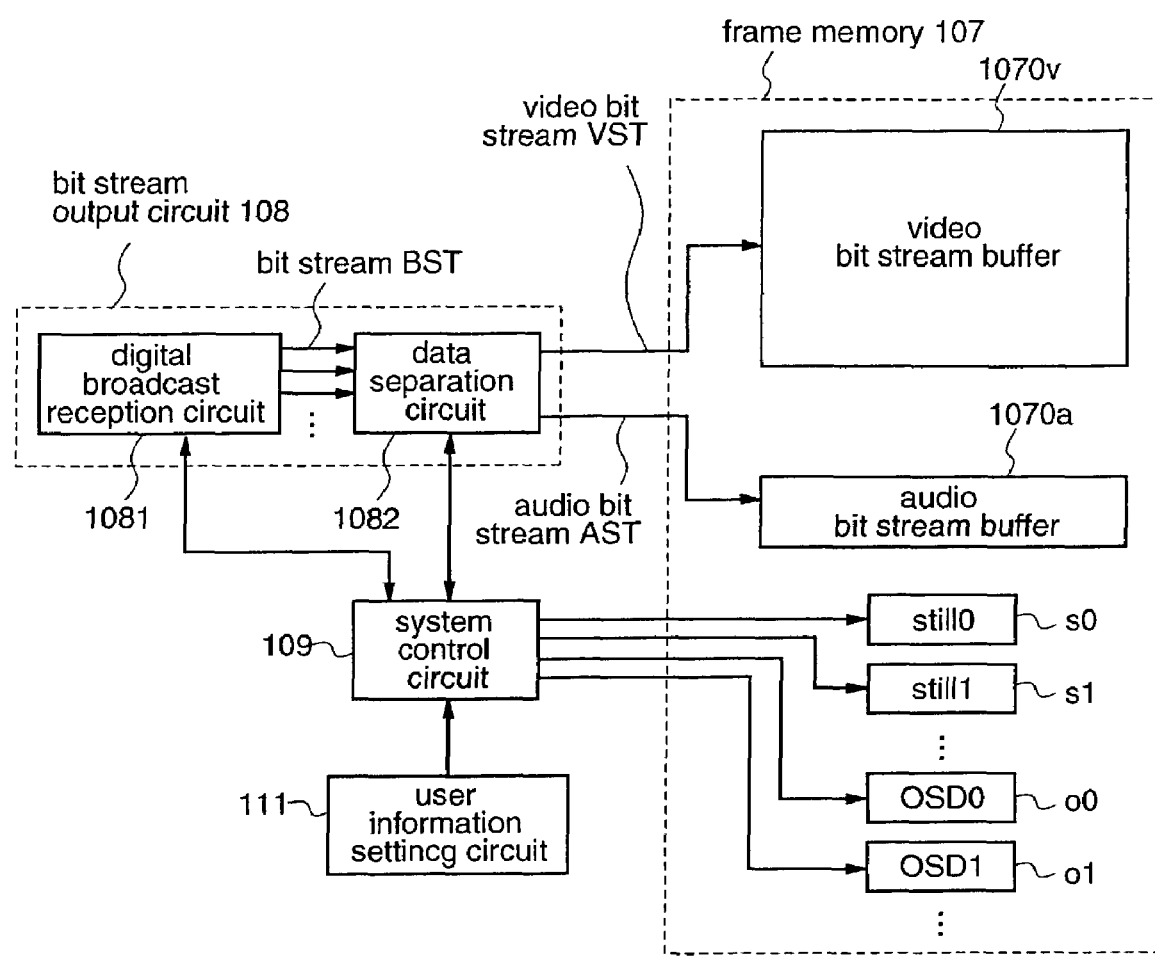
FIG. 24 is a block diagram illustrating the input section in a case where one picture/sound is decoded by the decoding apparatus according to the present invention.

FIG. 23 is a flowchart for explaining a series of steps of the above-mentioned processing.

When the instruction from the system control circuit 109 is directed to any of the video data buffers 1070v-1072v (step S301), the video output control circuit 1062 obtains video data from the video data buffer (any of the video data buffers 1070v-1072v) (step S302). Otherwise, the system control circuit 109 or the decoding circuit 103 generates predetermined video data such as video data for a blue screen (step S303). The above-mentioned steps are repeated for all channels (step S304).

When the instruction from the system control circuit 109 is directed to the OSD (step S305), the video output control circuit 1062 obtains video data from any of the OSD regions o0 and o1 (step S306). Otherwise, the system control circuit 109 or the decoding circuit 103 generates predetermined video data (step S307). The above-mentioned steps (S305-S307) are repeated for all channels (step S308).

Furthermore, when the instruction from the system control circuit 109 is directed to the still picture region (step S309), the video output control circuit 1062 obtains video data from any of the still regions s0 and s1 (step S310). Otherwise, the system control circuit 109 or the decoding circuit 103 generates predetermined video data (step S311). The above-mentioned steps (S309-S311) are repeated for all channels (step S312).

After the video data so obtained is temporarily stored in the output picture buffer 1077, digital signal processing is carried out to generate video outputs, and the video outputs are processed by the video D/A conversion circuits 1101v-1103v and the video signal conversion circuits 11011v-11013v to obtain video outputs v1-v3 and digital video outputs v11-v13, respectively (step S313).

While the decoding results of plural audio bit streams and the decoding results of plural video bit streams are output independently from each other in FIG. 21, the construction can be altered as desired.

The construction shown in FIG. 21 is effective when a single digital tuner is shared by plural output devices (e.g. televisions) to view or listen to different pictures or sounds from the respective output devices. However, when different pictures are combined to generate a composite picture and the composite picture is output to a single output device, the output control circuit performs combination or superimposing of the plural pictures as well as synthesis or selection of the sounds to be output, thereby to obtain one channel of output, resulting in a simplified audio/video output circuit.

Further, when the decoded picture and sound are selected and output to a single output device, the output can be speedily switched between the picture and the sound that are being simultaneously decoded. The reason is as follows. Usually, when switching the output, a time for decoding processes (selection of bit stream, storage into buffer, decoding, etc.) is required until the output is actually obtained.

Although the above description has been given of the case where plural pictures and sounds are decoded, it is also applicable to decoding of pictures only, decoding of sounds only, and a case where the number of pictures to be decoded is different from the number of sounds to be decoded.

Figure 25:
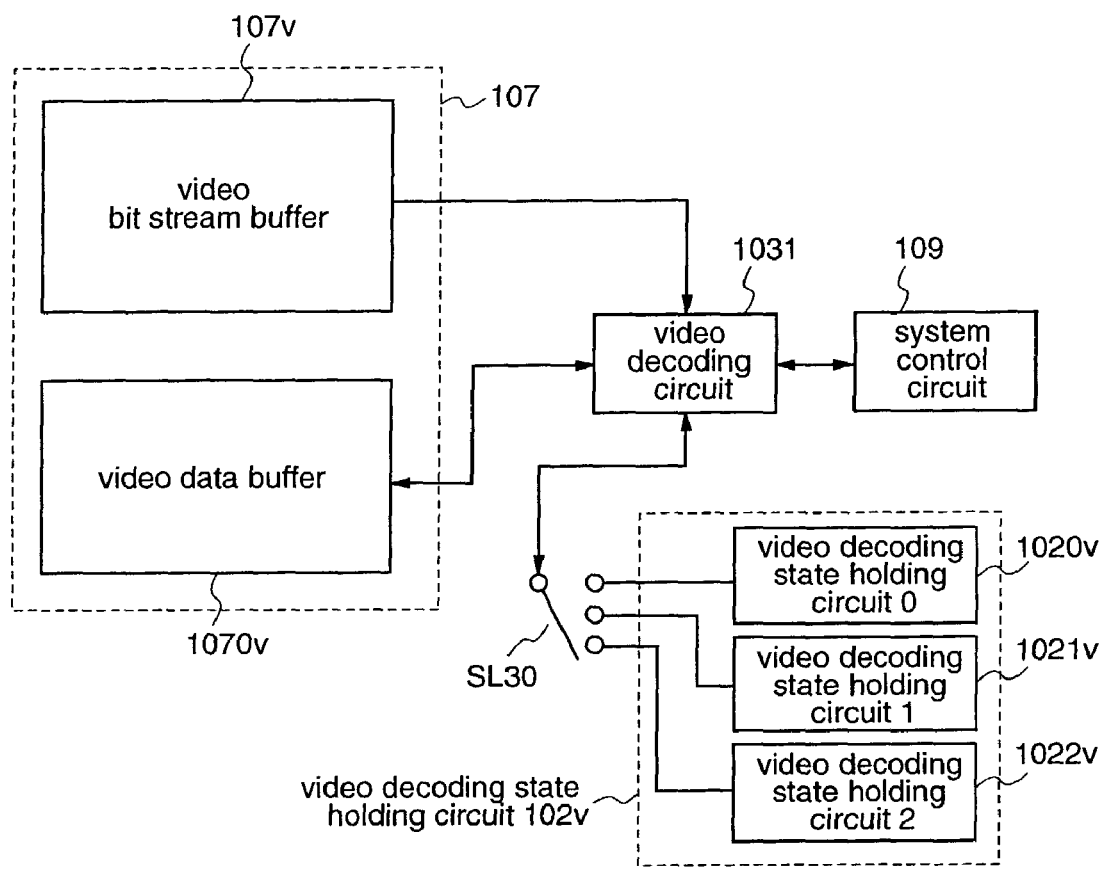
FIG. 25 is a block diagram illustrating the decoding section in a case where one picture/sound is decoded by the decoding apparatus according to the present invention.
Figure 26:
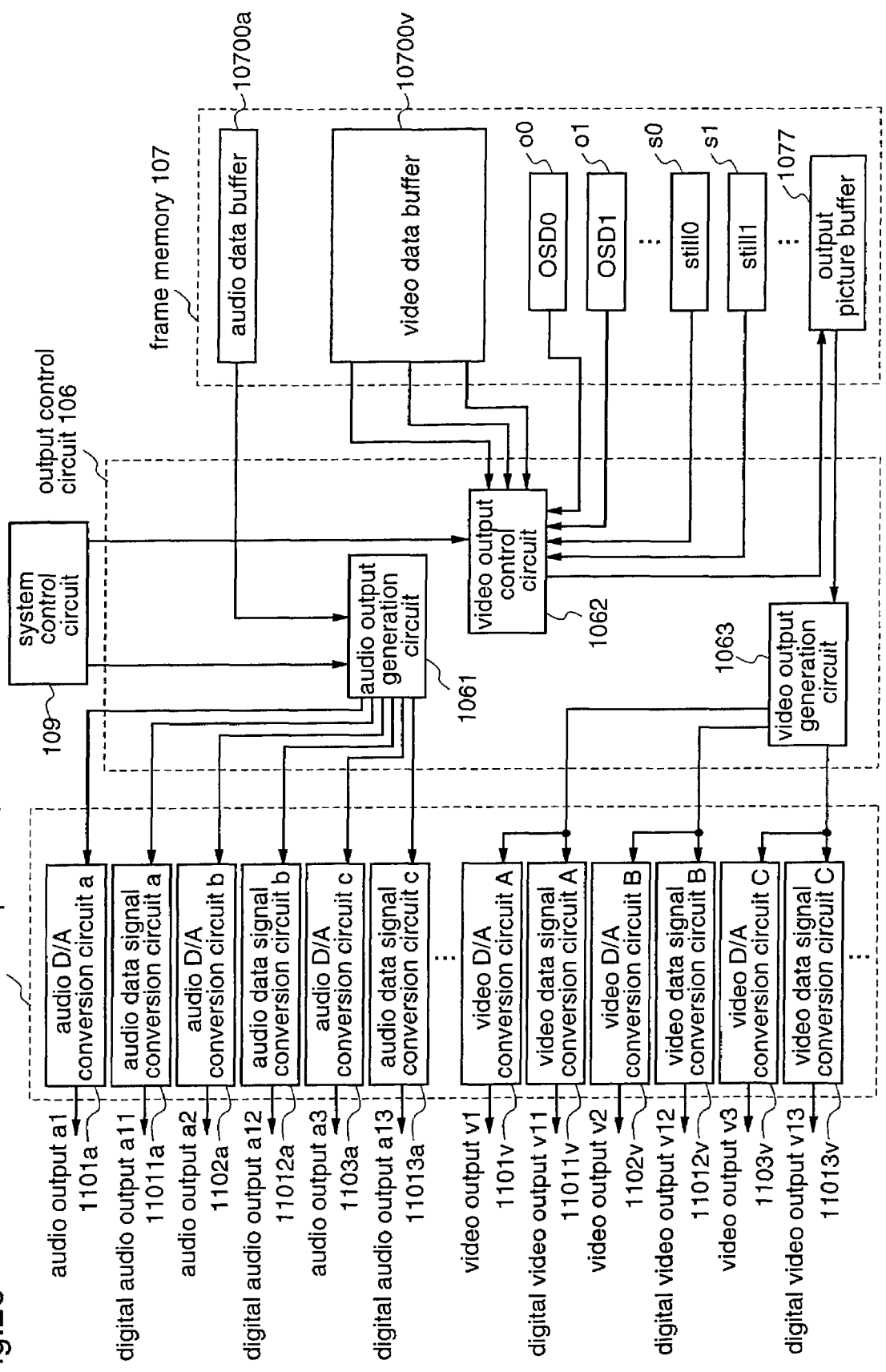
FIG. 26 is a block diagram illustrating the output section in a case where one picture/sound is decoded by the decoding apparatus according to the present invention.

Heretofore, the operation of the decoding apparatus for decoding plural pictures/sounds simultaneously has been described. Hereinafter, the operation of the decoding apparatus for decoding one picture/sound will be described with reference to FIGS. 24, 25, and 26. Decoding one picture/sound is different from decoding plural pictures/sounds in the way of allocating buffers in the frame memory (i.e., audio bit stream buffer H, video bit stream buffer H, audio data buffer H, and video data buffer H). The reason why the way of allocating buffers is different between the case of decoding plural pictures/sounds and the case of decoding one picture/sound is because the buffer capacity that is required for decoding one picture/sound is relatively large. For example, the maximum picture size that can be handled in decoding plural pictures is a picture of NTSC, and a maximum picture size that can be handled in decoding one picture is a picture of high-vision.

Therefore, when decoding of plural pictures and decoding of a single larger-sized picture are successively performed, the arrangement of the respective buffers in the frame memory should be altered. This rearrangement might affect the buffers relating to picture output. Accordingly, in order to prevent picture output from being disordered, the color of background is continuously output until normal picture output becomes possible after the alteration of arrangement, or a buffer for picture output, which is not affected by the alteration of arrangement, is provided to output the contents stored in this buffer.

The above description is given of the case where plural coded data are inputted, i.e., the case where the state of inputting plural coded data transits to the state of inputting a single piece of coded data, or the case where the state of inputting a single piece of coded data transits to the state of inputting plural coded data. However, similar processing is applicable even when a single piece of coded data is inputted, as long as the arrangement of the decoding results in the memory should be altered.

For instance, there is a case where the size of coded pictures is changed, for example, when the contents of input coded data are changed from those of HDTV to those of SDTV and vice versa.

Although the arrangement in the frame memory for HDTV may be used as it is for decoding of SDTV, an arrangement for SDTV may be additionally provided to improve the performance.

To be specific, an effective use of the memory is realized by altering the arrangement in the memory, and more empty regions can be used for other processes, such as a process for additional OSDs (On-Screen Displays) or still pictures, in SDTV decoding than in HDTV decoding.

Figure 27B:
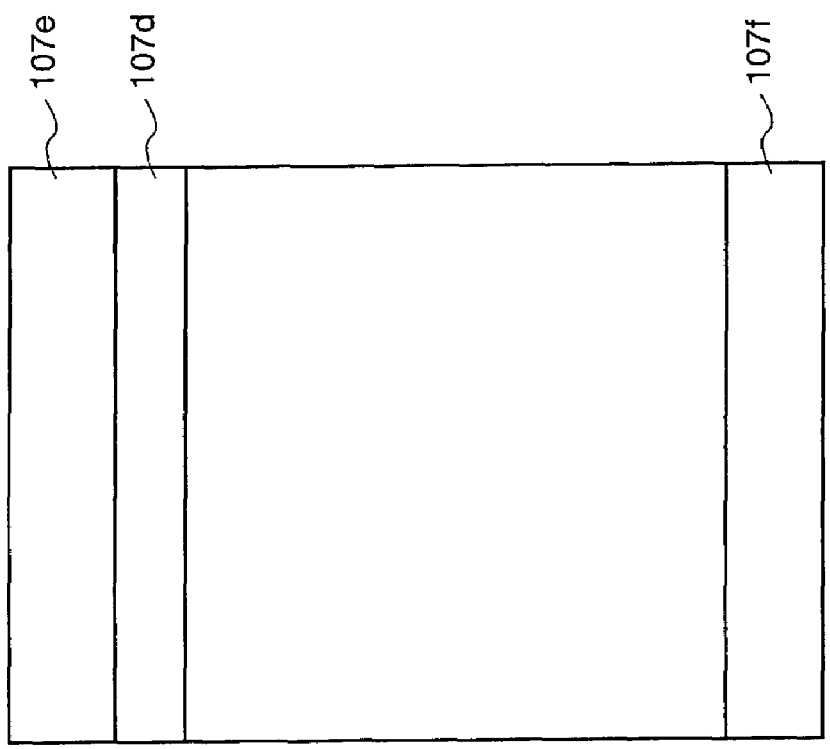
FIG. 27 is a diagram illustrating a case where a memory arrangement is altered when input coded data vary.
Figure 27A:
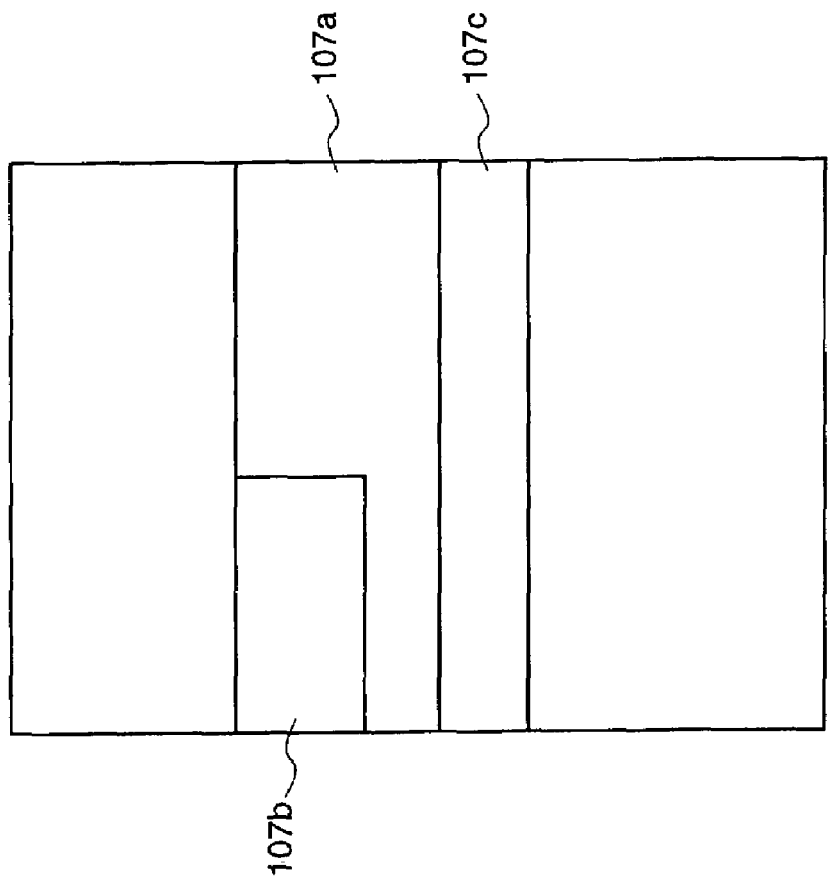

For example, when an NTSC region 107b is provided in part of a region 107a for HDTV broadcast as shown in FIG. 27(a), only one region 107c is secured as an OSD region. However, when only an NTSC region 107d is arranged without providing a region for HDTV broadcast as shown in FIG. 27(b), two regions 107e and 107f can be secured as OSD regions.

Figure 8:
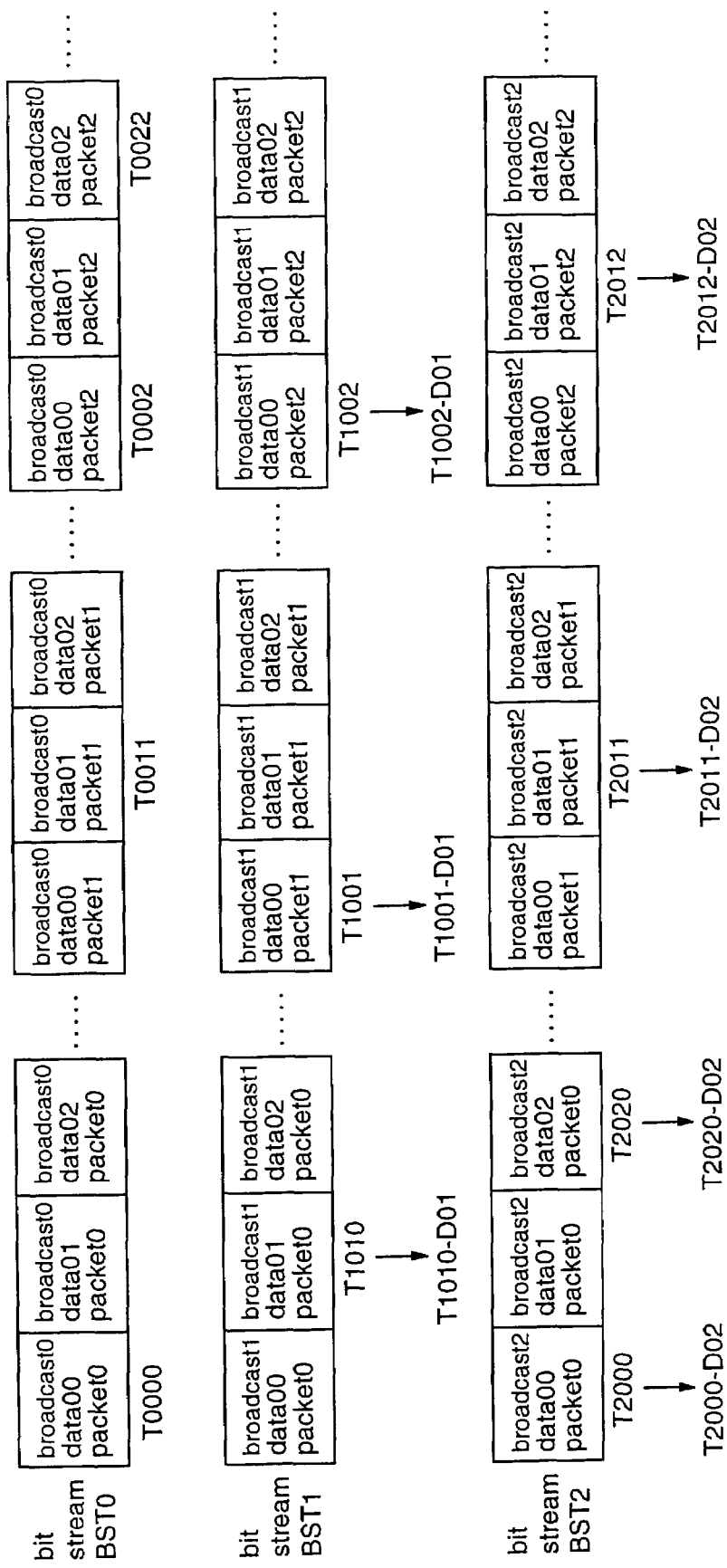
FIG. 8 is a diagram for explaining correction of time information during the generation of bit streams.
Figure 9:
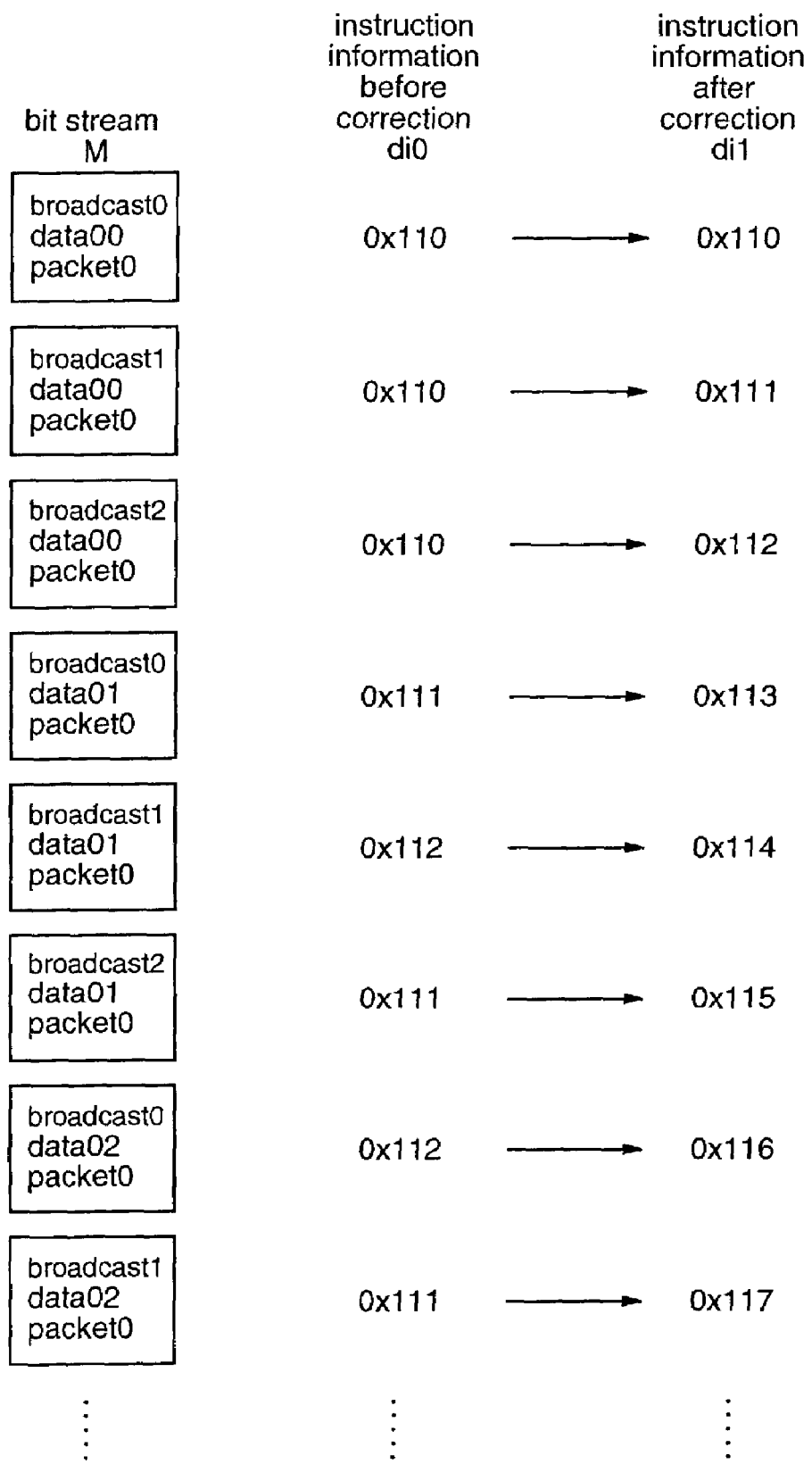
FIG. 9 is a diagram for explaining correction of instruction information during the generation of bit streams.

The above-mentioned alteration of the arrangement in the memory can be realized by any of the following methods.

i) The bit stream output circuit 108 shown in FIG. 8 analyzes the bit stream and informs the analysis result to the system control circuit 109, and the system control circuit 109 changes the storage region in the frame memory 107.

ii) The system control circuit 109 shown in FIG. 1 analyzes the bit stream to judge the type of the bit stream, and changes the storage region in the frame memory 107.

iii) The system control circuit 109 changes the whole operation on the basis of signal information which is defined by a broadcast standard and exists separately from the bit stream, i.e., information indicating whether the current broadcast is HDTV or SDTV, or the like.

iv) The system control circuit 109 changes the storage region in the frame memory 107 on the basis of the decoding result of the decoding circuit 103, especially, the header information.

As described above, the arrangement in the memory can be altered according to the characteristics of the coded data. When the arrangement is altered, a process of outputting a blue screen, or the like, is performed to suppress disordering of output pictures. The output of a blue screen is realized by, for example, generating a signal having a predetermined value indicating blue by the output control circuit 106, or writing a signal indicating blue into the entire region of one frame of the frame memory 107 by the system control circuit 109.

The arrangement for SDTV may be either the arrangement in which the region for the SDTV line is additionally provided as described above, or one of the arrangements of plural regions to be provided when decoding plural coded data.

The fundamental operation of the decoding apparatus is as described above. Hereinafter, a description will be given of especially noticeable points in the operation of the decoding apparatus, i.e., the control of picture output, control of decoding order, management of decoding period, resumption of decoding, and optimization of decoding.

[Control of Picture Output]

Figure 34:
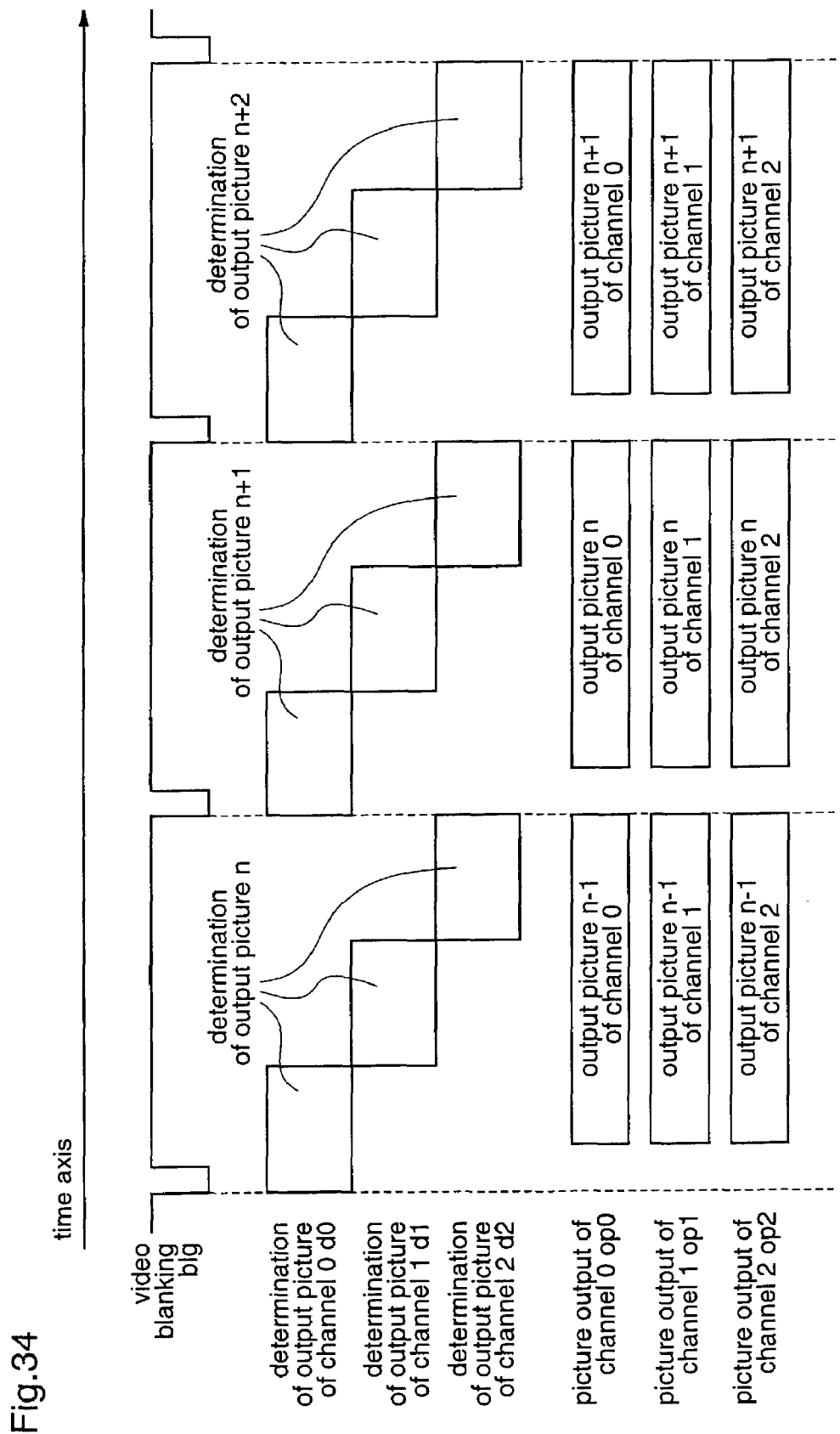
FIG. 34 is a diagram illustrating a process for outputting three pictures.
Figure 35A:
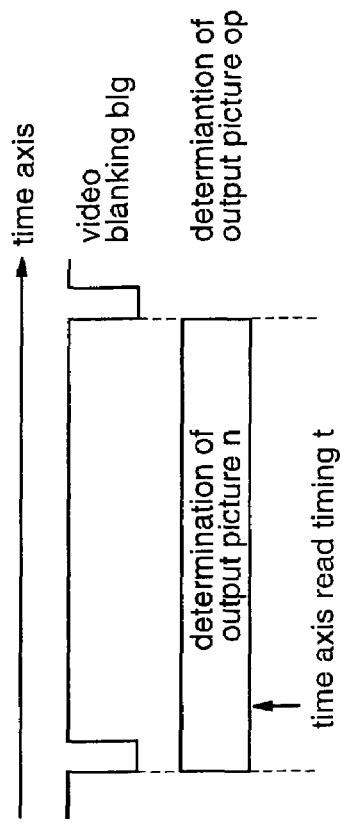
FIG. 35 is a diagram for explaining the timing for determining pictures to be output.
Figure 35B:
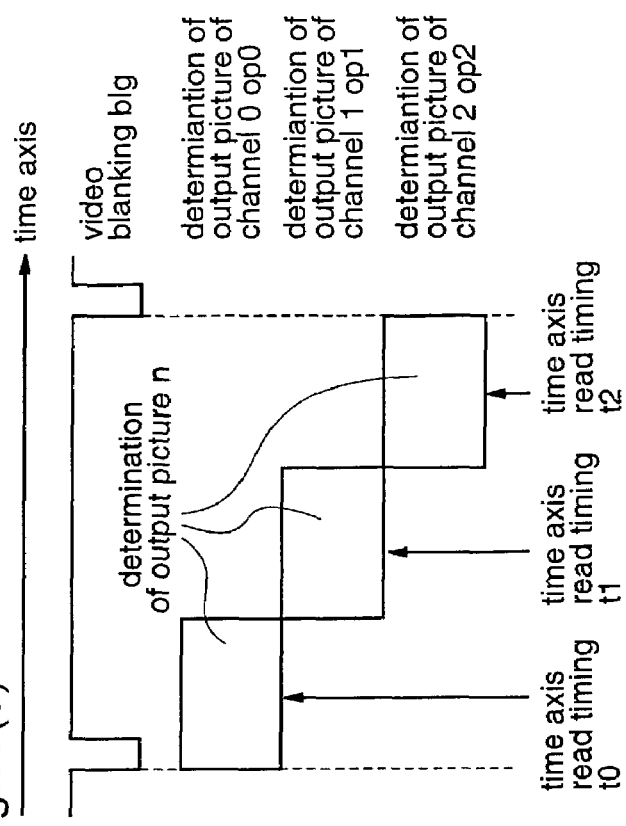
Figure 35C:
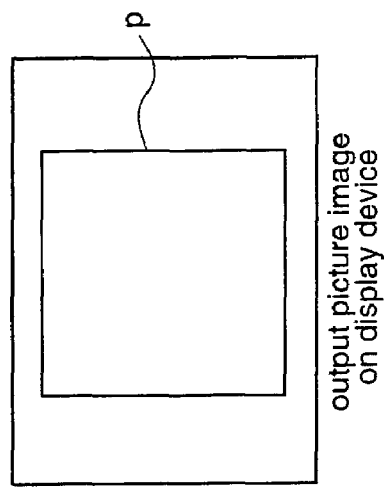
Figure 35D:
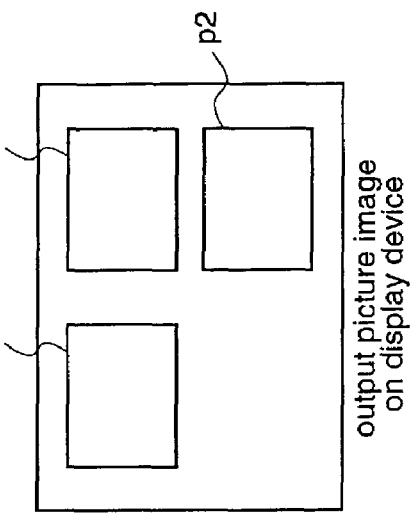

Initially, an output picture determination which is performed by the output control circuit will be described with reference to FIGS. 28 through 38. FIG. 28 is a diagram for explaining a process of determining (d) a picture to be output with respect to a video stream, and outputting the determined picture (op). FIG. 34 is a diagram for explaining a process of decoding three pictures, and outputting the decoded pictures. In either case, picture output is carried out between the end of each video blanking (blg) and the beginning of a next video blanking, and a picture/pictures to be used for picture output is/are determined by the time at which picture output is started. This determination is made according to whether or not the picture to be output is normally decoded, whether or not the decoded picture is in its output timing, (described later), or the like. FIGS. 35(a)-35(d) are diagrams for explaining the case where one picture to be output is determined according to the picture output timing (FIGS. 35(a) and 35(b)), and the case where three pictures to be output are determined (FIGS. 35(c) and 35(d)).

Figure 29:
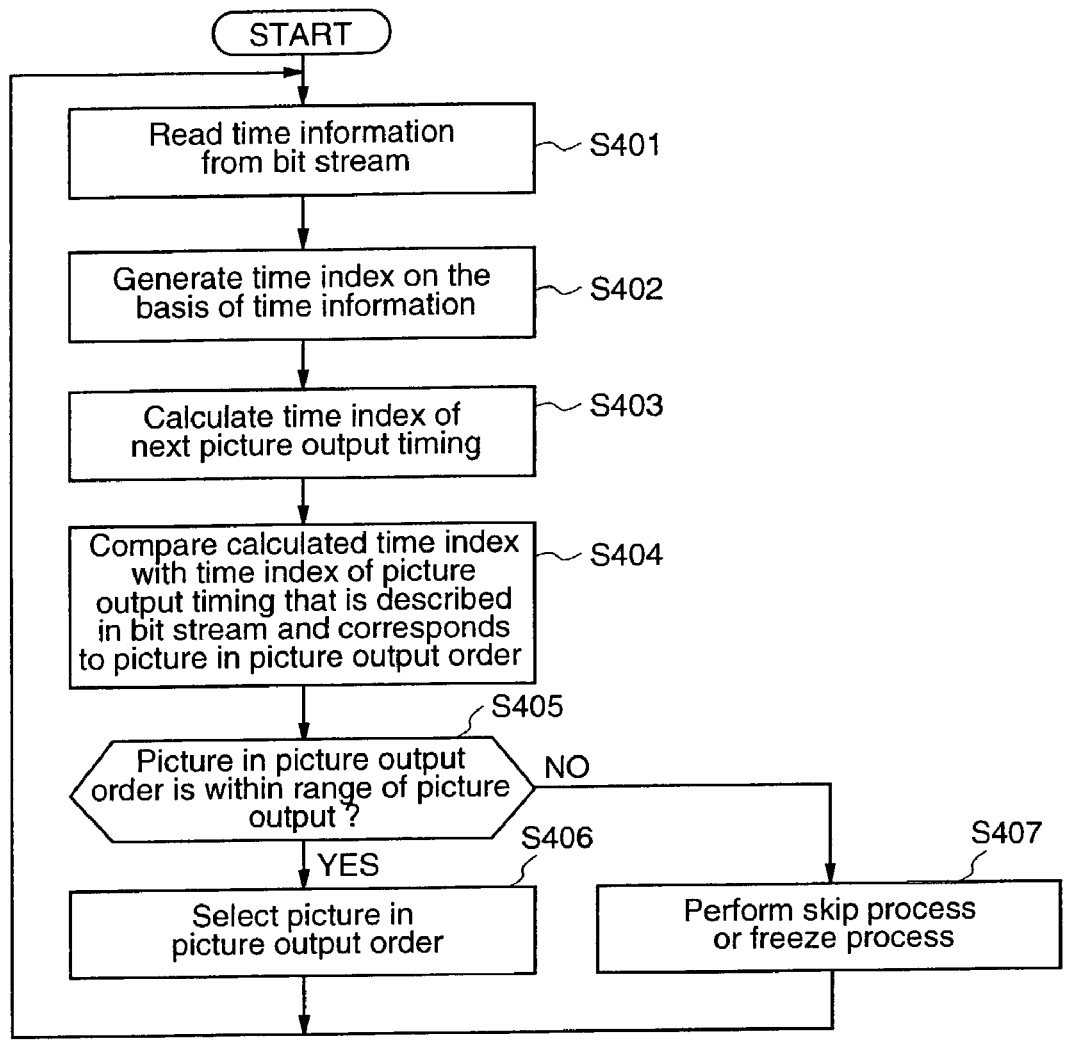
FIG. 29 is a flowchart illustrating the flow of process steps for outputting one picture.

Initially, the determination of one picture to be output will be described. As shown in FIG. 29, a time index, which is generated in the circuit on the basis of a value described in the bit stream, is read (steps S401 and S402), and a time index of a next picture output timing is calculated from the read value (step S403). Then, the calculated value is compared with a time index of picture output, which is described in the bit stream and corresponds to a picture existing in the picture output order (step S404). When the time index is within a range of picture output (step S405), this picture existing in the picture output order is selected (step S406). When the picture existing in the picture output order is not suited to picture output, either a skip process or a freeze process described as follows is carried out.

1. Skip Process

Figure 30:
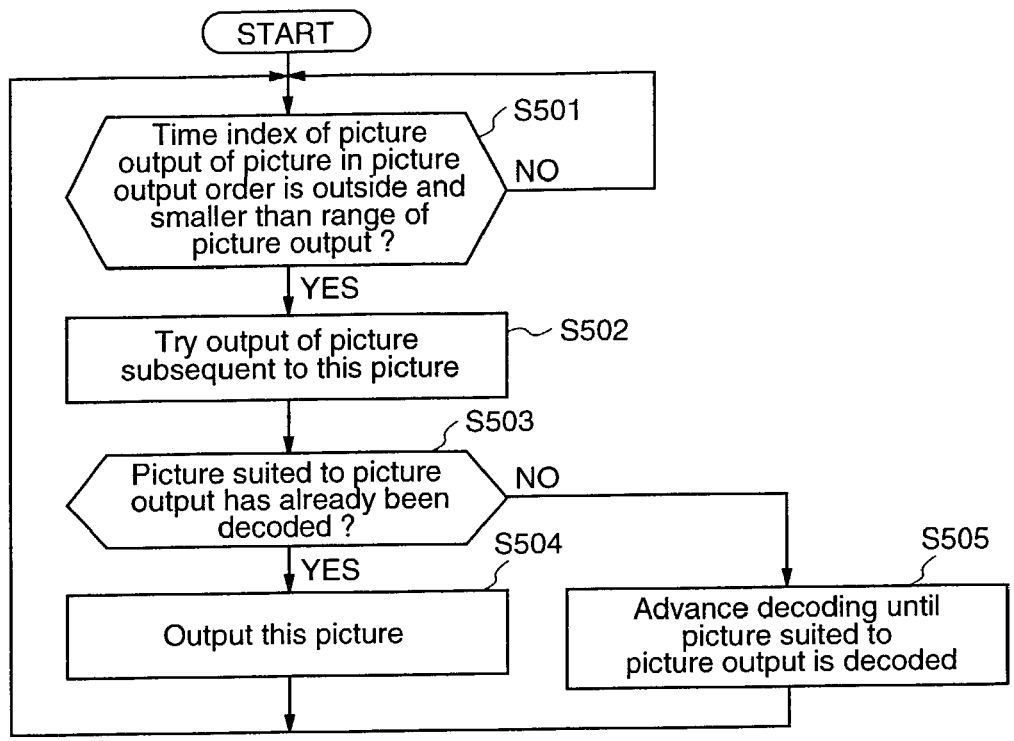
FIG. 30 is a flowchart illustrating the flow of a skip process.

As shown in FIG. 30, when the time index of picture output of the picture existing in the picture output order is not within the range of picture output and is smaller than the time index of the next picture output timing (step S501), this picture is not output, followed by a process of trying to output a subsequent picture in the picture output order (step S502). If a picture suited to picture output has already been decoded (step S503), this picture is output (step S504). When there is no picture suited to picture output among the already-decoded pictures, decoding is advanced as long as possible until a picture suited to picture output is decoded (step S505). However, when decoding of a picture suited to picture output is not in time for picture output, any of the already-decoded pictures is selected to output, or the background color is output without using the decoded pictures, and the subsequent decoding process is advanced as long as possible until a picture suited to picture output is decoded. At this time, unnecessary pictures may be skipped without being decoded.

2. Freeze Process

Figure 31:
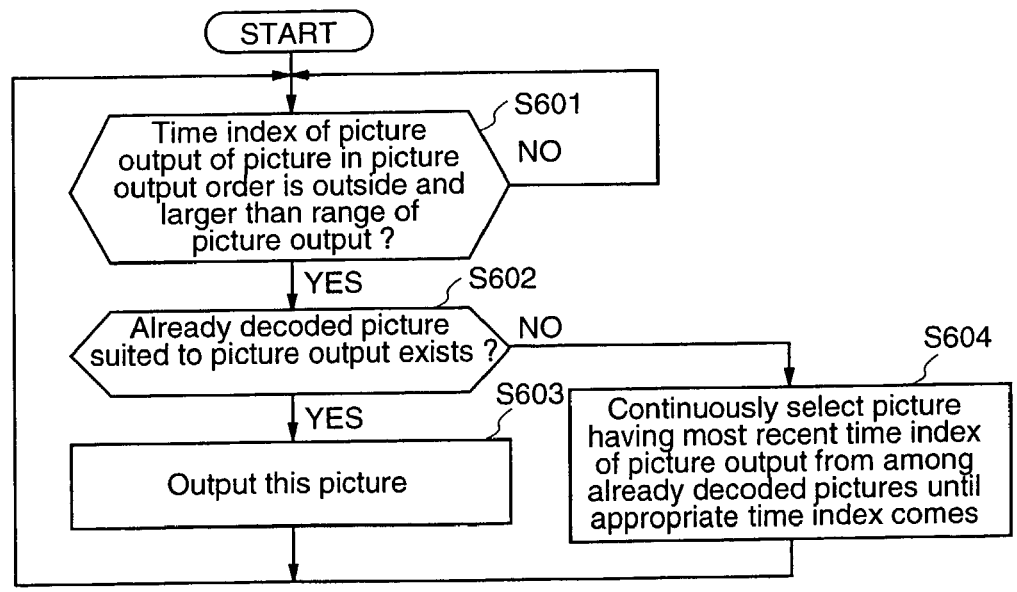
FIG. 31 is a flowchart illustrating the flow of a freeze process.
Figure 32:
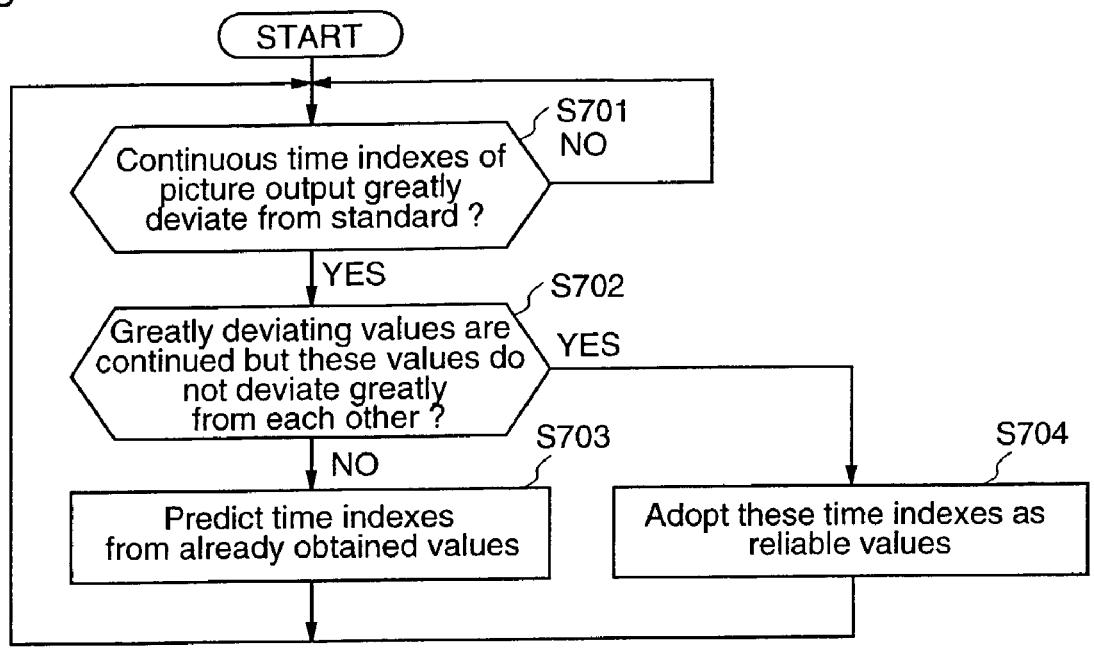
FIG. 32 is a flowchart illustrating the flow of process steps when there is a possibility that errors might occur in time indexes of picture output of plural pictures.
Figure 33:
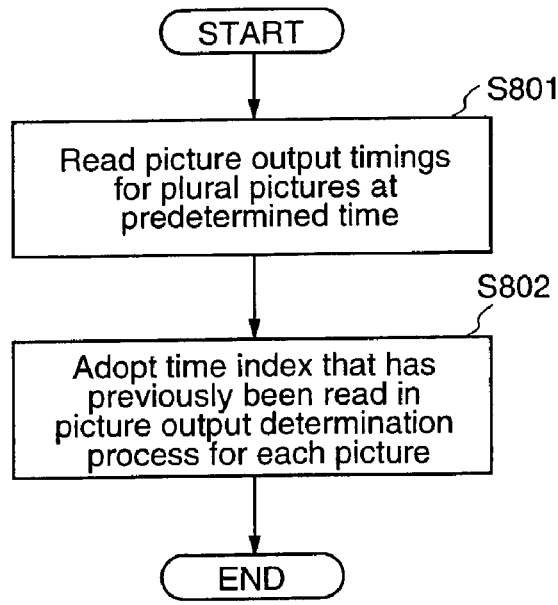
FIG. 33 is a flowchart illustrating the operation for reading time indexes when there are plural pictures.

As shown in FIG. 31, when the time index of picture output of the picture existing in the picture output order is not within the range of picture output and is larger than the time index of the next picture output timing (step S601), it is judged whether or not an already-decoded picture suited to picture output exists (step S602). When there is a decoded picture suited to picture output, this picture is selected (step S603). When there is no decoded picture suited to picture output, a picture having a most recent time index of picture output is selected from among the already-decoded pictures, and selection of this picture is continued until an appropriate time index comes (step S604). At this time, the decoding process is interrupted, or the decoding process is interrupted after decoding is advanced as long as possible. The range in which decoding can be advanced is a range in which decoded pictures can be stored into video data buffers excluding a buffer that stores already-decoded pictures which have not yet been output, and a buffer that stores pictures which can be referred to in the future decoding process.

The above-mentioned comparison of time indexes is based on the premise that the time indexes for picture output of the respective pictures are reliable. When there is a possibility that errors might occur in the time indexes for picture output of the respective pictures, resistance against errors must be set additionally. Fundamentally, continuous time indexes of picture output do not greatly deviate from each other. Therefore, with reference to FIG. 32, if a value greatly deviates from other values by, for example, half a day, this value is not trusted (step S701), and a value is predicted from already-obtained values (step S703). When values that greatly deviate from the standard are continued and these values do not deviate very much from each other (step S702), it is judged that the standard of the time indexes is changed, and these time indexes are adopted as reliable values (step S704). As for an error in time information, for example, a difference between time information of a picture which has been judged as to whether or not it can be a target of picture output, and time information of a picture which is currently to be output is obtained, and the time information is judged as an error when the difference is larger than a predetermined value such as one hour.

Figure 36:
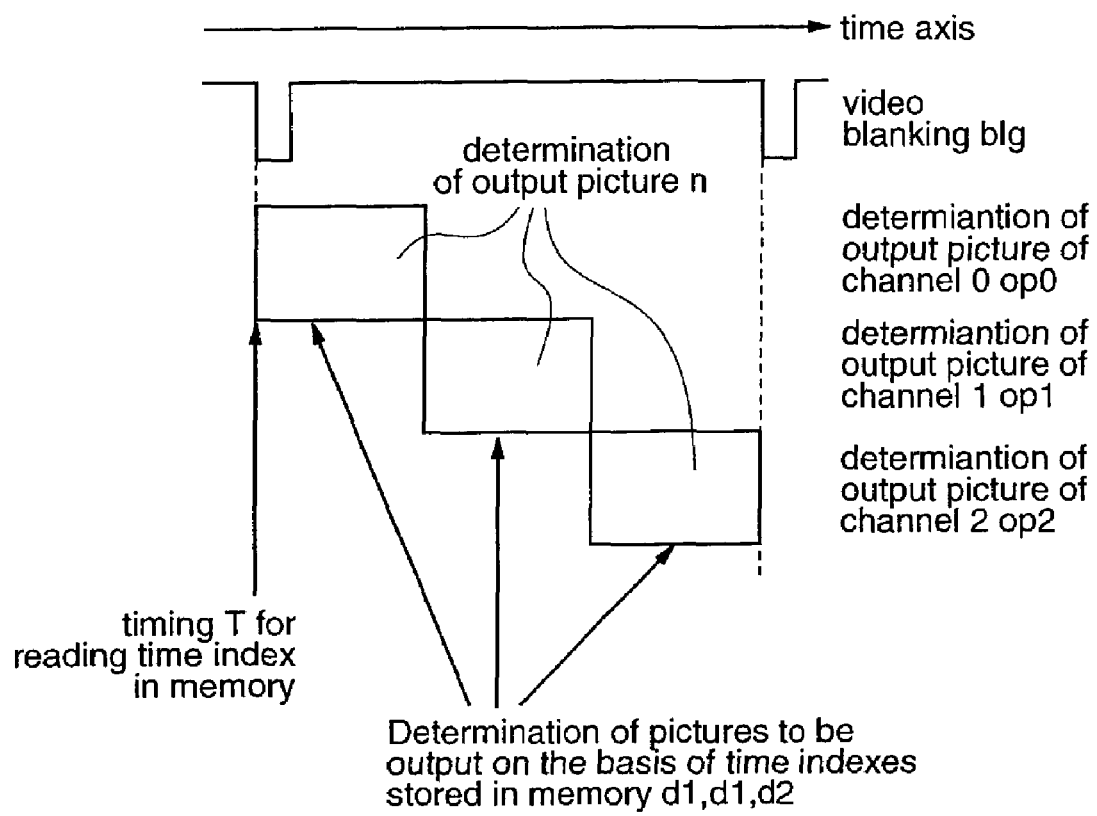
FIG. 36 is a diagram for explaining time indexes to be used for the picture output determination timing.

Further, it is desired that read-in of time indexes is performed at a specific timing as shown in FIG. 36. The reason is as follows. If the read-in timing is not constant, the timing for reading a time index as well as a period of time until the next picture output timing must be grasped, whereby the procedure for calculating the time index of the next picture output timing is complicated, or the calculated time index is not appropriate. Accordingly, a read-in of a time index is desirably performed at a point having a predetermined time difference from the picture output timing such as the start or end point of a video blanking, whereby more appropriate processing is possible. Further, when the decoding apparatus is implemented by software, an interruption is generated at a point having a predetermined time difference from the picture output timing for calling a time index read-in routine.

Figure 37:
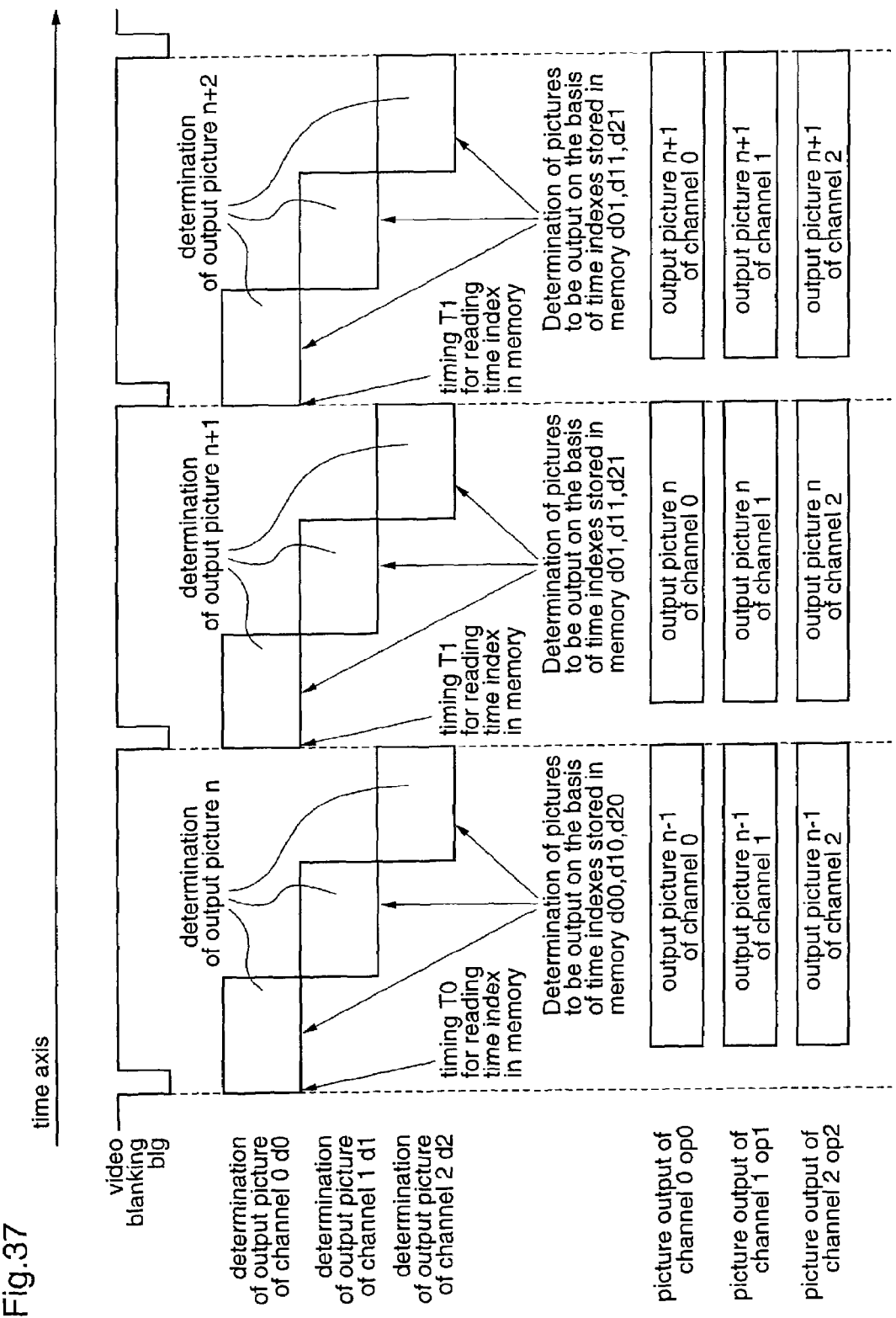
FIG. 37 is a diagram illustrating the case where pictures to be output are determined on the basis of the time indexes shown in FIG. 40.

Next, the determination of three pictures to be output will be described. When there are three pictures to be output, processing similar to that described for one picture to be output is performed for each picture. However, attention should be given to read-in of time indexes. As shown in FIGS. 35(*a*)-35(*d*), a read-in of time indexes for three pictures p1, p2, and p3 is carried out in similar manner to that for one picture p. Since a time index is read during a process of determining a picture to be output, the respective pictures have different picture output timings. However, as shown in FIGS. 35(*c*) and 35(*d*), when three pictures are to be output to one picture output device, since the actual output timing is common to the three pictures, the output timing obtained in the output picture determination process for each picture becomes inappropriate one. Accordingly, when there are three pictures to be output, read-in of time indexes is not carried out during the output picture determination process, but carried out as follows. That is, as shown in FIGS. 36 and 37, a time index is read in the memory at a predetermined time T as in the case for one picture (refer to step S801 of FIG. 33). In output picture determination processes d0, d1, and d2 for the respective pictures, the time index previously read in the memory is adopted (refer to step S802 of FIG. 33), thereby performing output control by an appropriate process. This is particularly effective when coded data which are generated by shooting at different angles are decoded and combined to obtain a composite picture to be output.

[Control of Decoding Order]

Next, with reference to FIGS. 38 through 43, a description will be given of a processing time in the case where three pictures are decoded.

Figure 38:
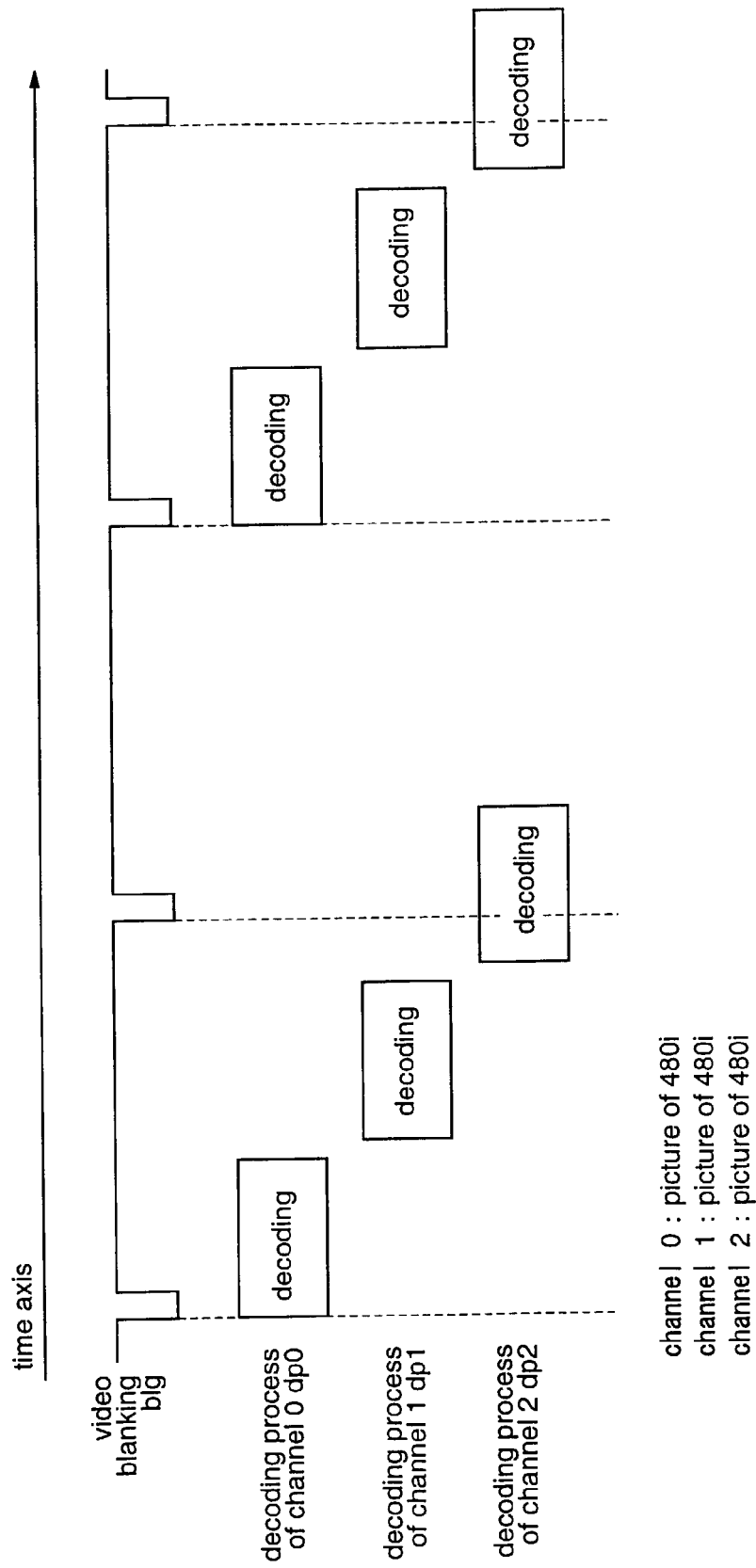
FIG. 38 is a diagram illustrating the case where three 480i pictures are normally decoded.

FIG. 38 is a diagram illustrating an example of a processing time in the case where three 480i pictures are decoded. It is assumed that each picture is coded in frame units. As conventional, decoding of each picture should be completed within a period of time corresponding to a frame (hereinafter, referred to as a frame period), and FIG. 38 shows the state where decoding is normally carried out.

Figure 39:
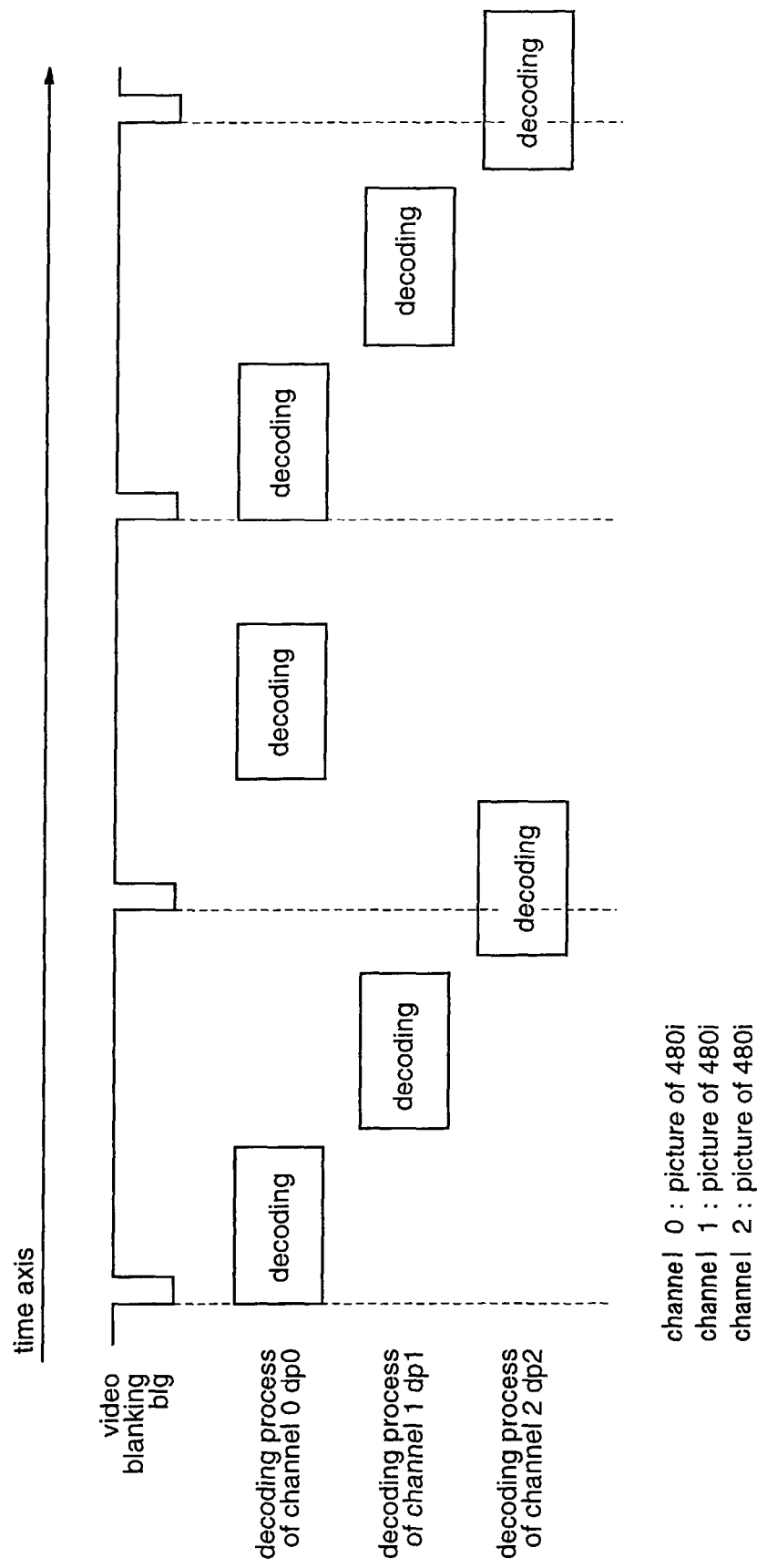
FIG. 39 is a diagram illustrating the case where two 480i pictures and one 480p picture are normally decoded.
Figure 40:
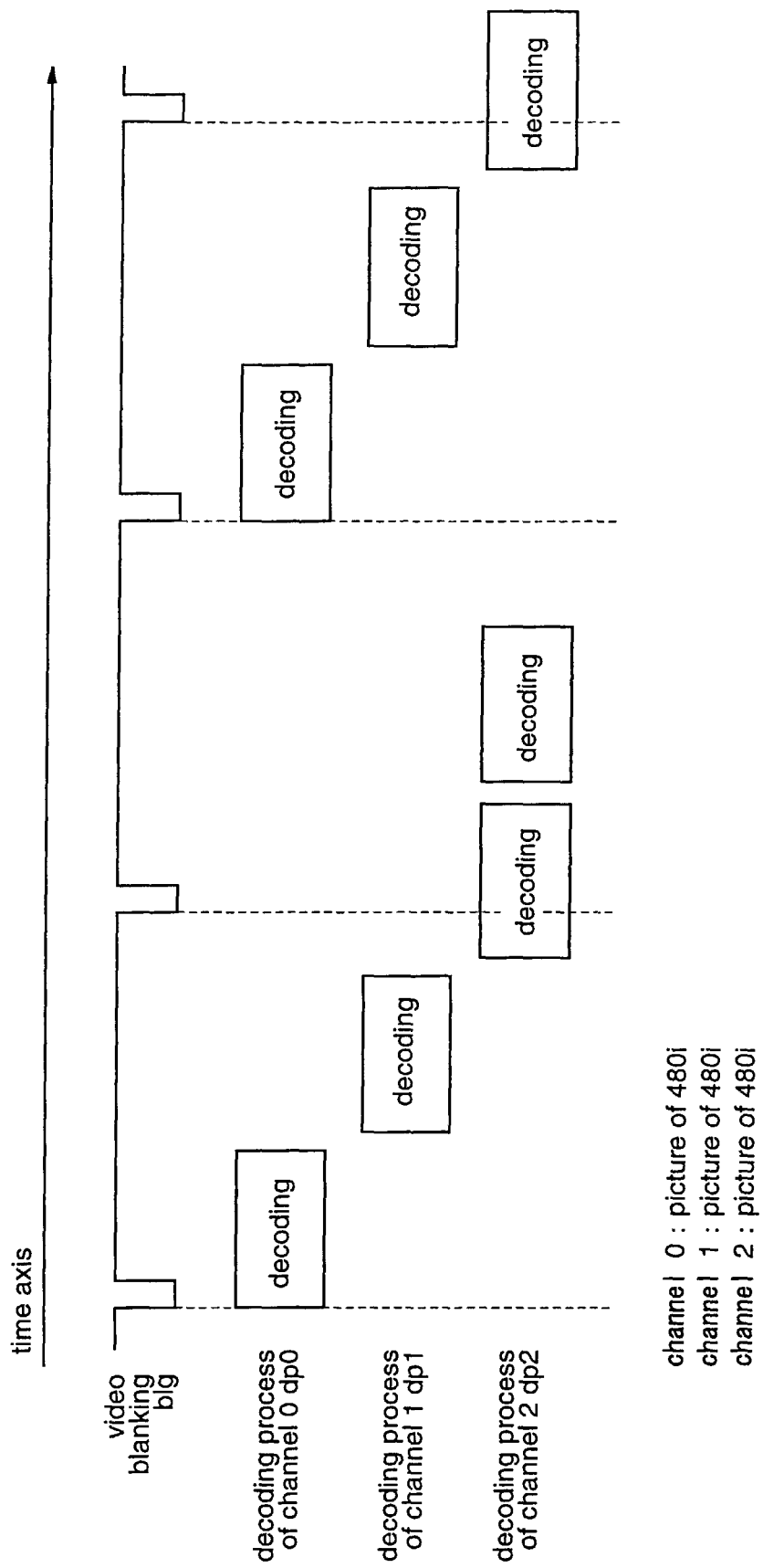
FIG. 40 is a diagram illustrating the case where two 480i pictures and one 480p picture are not normally decoded.
Figure 41:
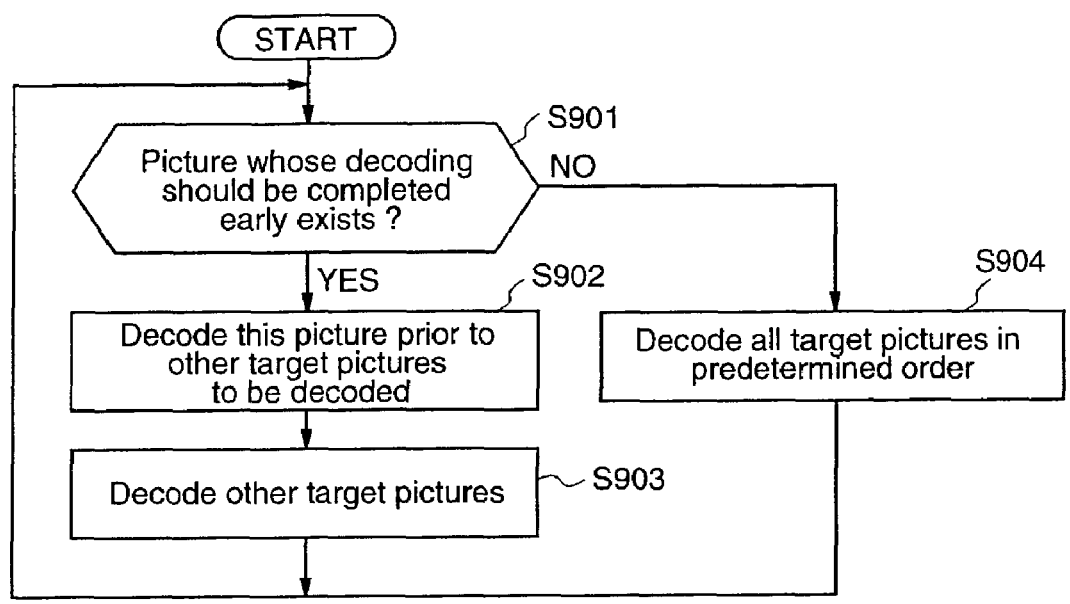
FIG. 41 is a flowchart for explaining the case where plural pictures whose decoding times are different from each other are decoded.
Figure 42:
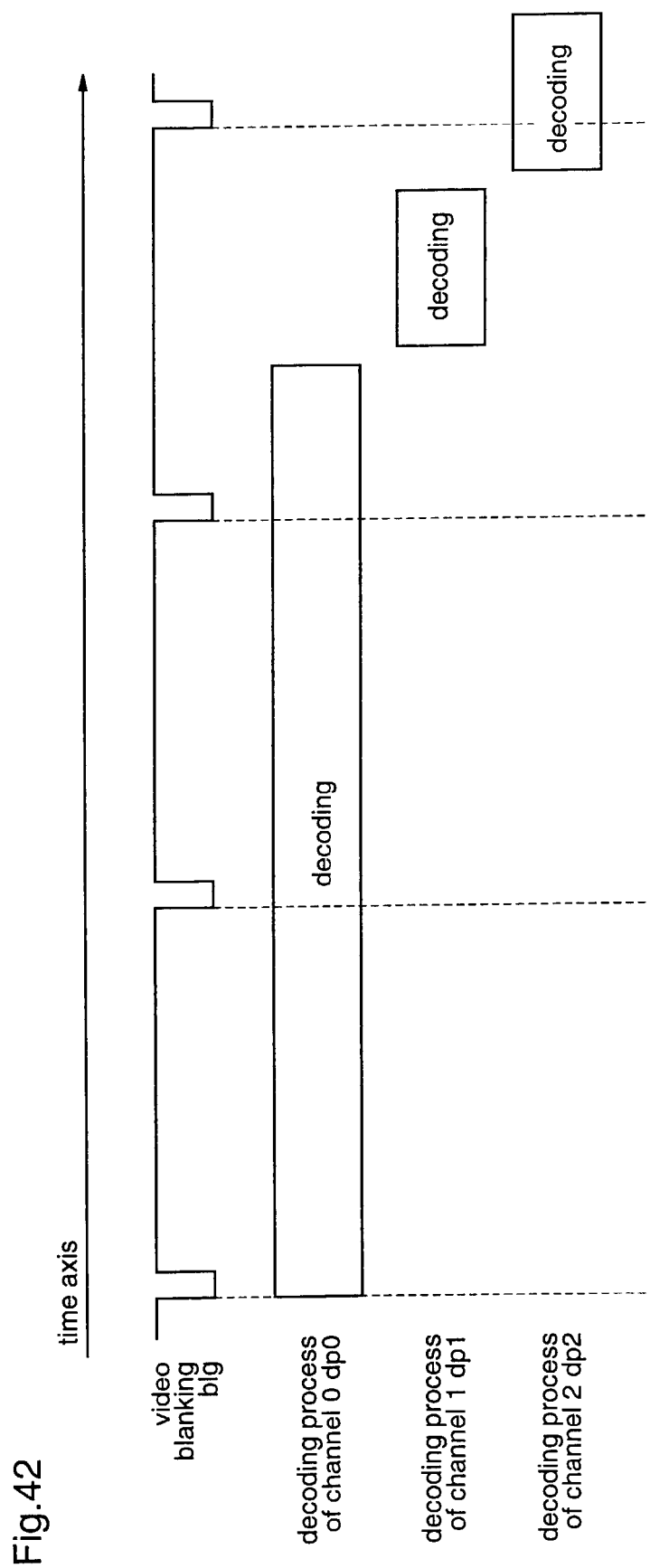
FIG. 42 is a diagram illustrating the case where three pictures cannot be normally decoded.

FIGS. 39 and 40 show the case where two 480i pictures and one 480p picture (i.e., a progressive picture having 480 scanning lines) are decoded. Assuming that each picture is coded in frame units, decoding should be completed within the frame period. However, as for the 480i picture and the 480p picture, the frame period is equivalent to a period of 2V and a period of 1V, respectively. Accordingly, decoding of the 480p picture should be completed within half the time for the 480i picture. Although FIG. 39 shows the state where decoding is normally carried out, FIG. 40 shows the state where the decoding process of channel 2 in which the 480p picture is decoded is not completed within the frame period. Therefore, when decoding plural pieces of coded data, it is judged whether or not there is a picture whose decoding should be completed early is present (step S901 in FIG. 41). When such a picture exists, it is processed with first priority (steps S902 and S903), whereby required processing ability is reduced. The judgment as to whether there is a picture whose decoding should be completed early is carried out on the basis of information indicating the picture output order and the length of the frame period, and time indexes for performing decoding. When there is no picture whose decoding should be completed early, the decoding process is normally carried out in the predetermined order, i.e., the decoding process is carried out with the type of the decoding process as a unit (step S904). Thereby, decoding of plural pieces of coded data by a single decoding circuit is realized with less resources.

While in the above-described method the decoding order is determined according to whether or not there is a picture whose decoding should be completed early, the decoding order may be determined according to the priorities of pictures, which are set in the system control circuit from the user information setting circuit. Thereby, the viewer can select coded data to be decoded with priority. Further, the priorities of pictures may be set in the system control circuit on the basis of the priorities of channels being broadcast, which are specified in the broadcast management standard (when a high-vision channel and plural NTSC channels are continuously broadcast, a channel, which is selected by default from among the plural NTSC channels and continues decoding, is placed at the beginning of the priority order). Furthermore, when the priorities of channels are also described in the bit stream, the priorities are extracted from the bit stream by the bit stream output circuit to set the priorities of pictures by the system control circuit, whereby decoding of plural pictures based on their priorities is realized.

[Management of Decoding Period]

Figure 43:
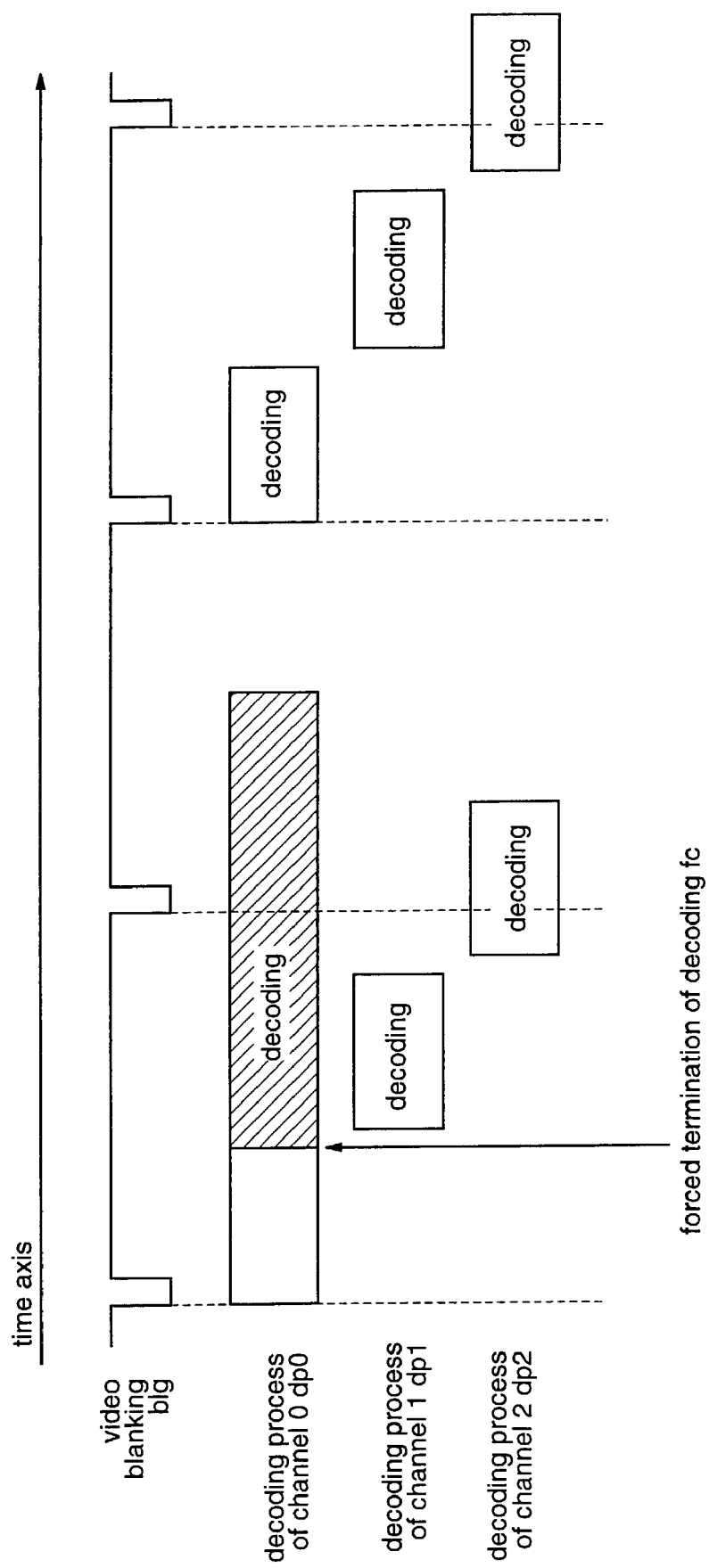
FIG. 43 is a diagram illustrating the case where decoding is forcefully terminated.

FIG. 43 shows the case where three 480i pictures are decoded, and decoding of one of the three 480i pictures is not normal. When decoding of one of the three pictures is not completed within the frame period, it might affect decoding of the remaining two pictures. For example, when decoding of the first picture among the three pictures in the decoding order is not completed within a predetermined period of time as shown in "decoding process dp0 of channel 0" in FIG. 42, even when the remaining two pictures are in the normally decodable states as shown in "decoding process dp1 of channel 1" and "decoding process dp2 of channel 2", decoding cannot be completed within the predetermined period of time and, consequently, all pictures cannot be decoded. FIG. 43 shows a solution for this problem. FIG. 43 shows the case where more time is spent for the decoding process of one picture than usual.

Figure 44:
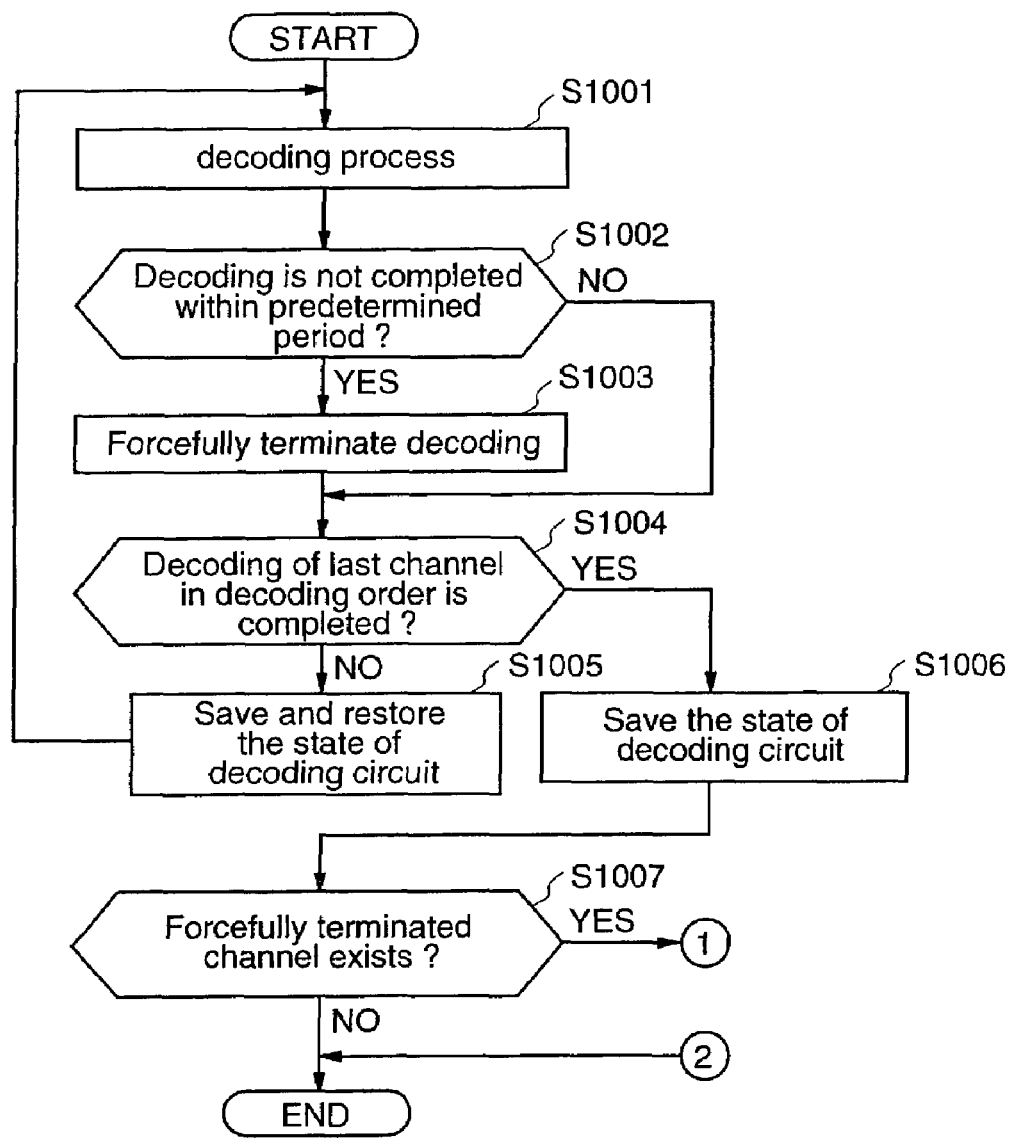
FIG. 44 is a flowchart illustrating the flow of process steps in the case where a picture whose decoding cannot be completed within a predetermined period is included in plural pictures.

FIG. 44 shows a series of process steps in this case. When the decoding process (step S1001) is not completed within a predetermined period of time (step S1002), decoding is forcefully terminated by a forced termination process fc shown in FIG. 43 (step S1003). When decoding of the last channel in the decoding order has been completed (step S1004), the state of the decoding circuit is saved (step S1006), and the process goes to another channel (step S1004). On the other hand, when decoding of the last channel in the decoding order has not yet been completed (step S1004), the state of the decoding circuit is saved and restored (step S1005), and the process returns to the initial decoding process (step S1001).

In the above-described decoding process, a maximum time which is allowed for decoding is set on each picture to be decoded, and when decoding is not completed within this time, the decoding process is forcefully terminated to reduce an influence on decoding of other pictures. This process is implemented by using a timer or the like. Therefore, even when a defect occurs in decoding one coded data, other coded data can be normally decoded, and as a result, normal pictures can be decoded without being affected by the decoding of other pictures.

[Resumption of Decoding]

As for a picture whose decoding process has forcefully been terminated, resumption of decoding should be carried out.

Figure 45:
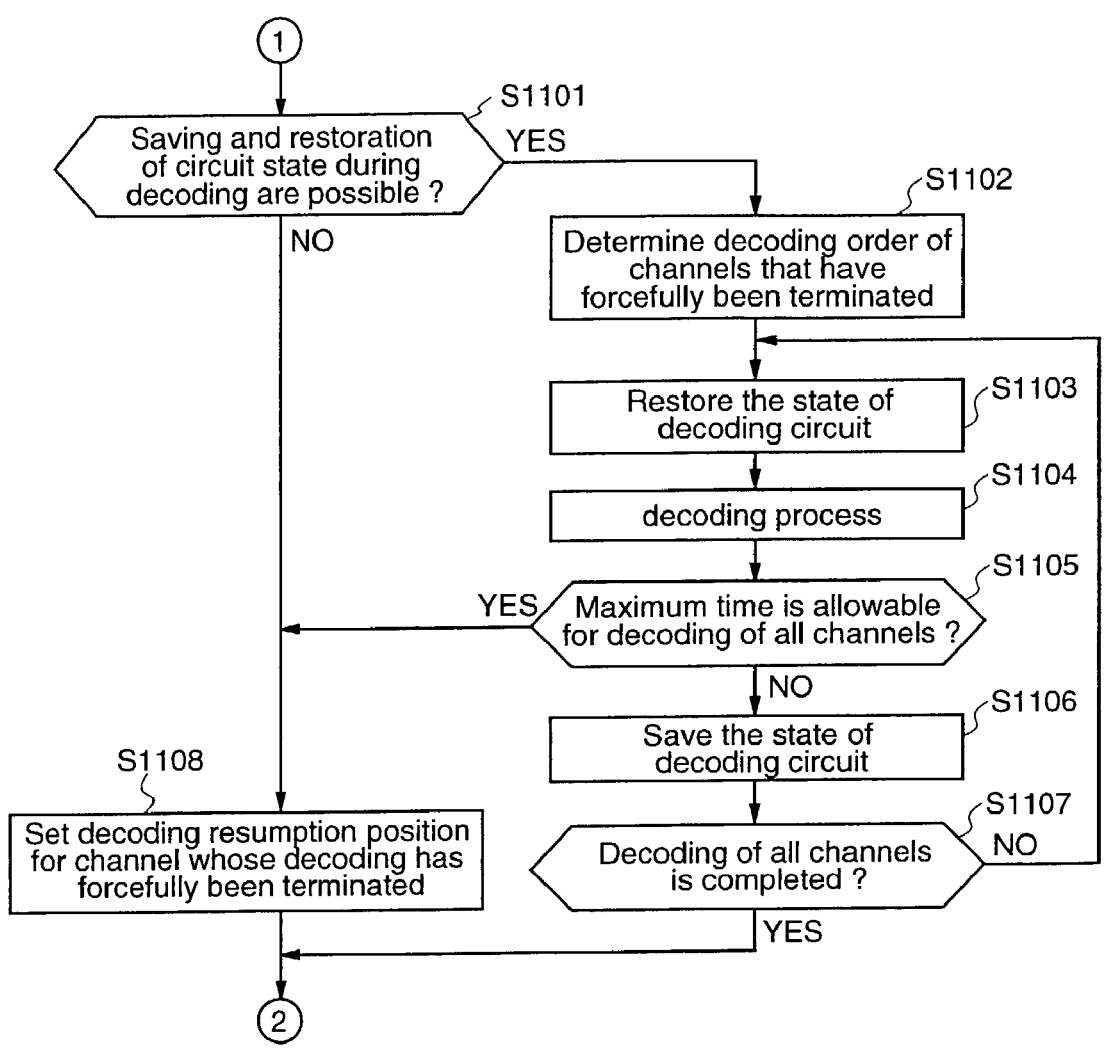
FIG. 45 is a flowchart illustrating the flow of a decoding resumption process.

With reference to FIG. 45, when the state of the decoding circuit can completely be saved and restored with respect to a picture that is currently decoded (step S1101), in order to retry decoding of a channel whose decoding process has forcefully been terminated, the decoding order of the target channel is determined after the decoding process of the respective channels including the forced termination of decoding (step S1102), and the state of the decoding circuit of the channel to be decoded is restored (step S1103), followed by the decoding process (step S1104). At this time, the allowable maximum time (e.g., the maximum frame period) can be spent for the decoding process (step S1105), whereby decoding can be resumed for coded data which have not been normally decoded. On the other hand, when the decoding process is completed before reaching the allowable maximum time, the state of the decoding circuit is saved, and the target channel to be decoded is changed (step S1106). By repeating the processes in steps S1103 to S1106, decoding can be performed on all of the channels (step S1107). Further, when forced termination of decoding has been performed on plural pictures, the determination of the order of channels for which decoding should be resumed is performed according to the original decoding order, or according to the priority order which is determined by judging the possibility of decoding by considering factors such as the remaining buffer capacity. However, when forced termination of decoding process has been performed, the same process as the detection and change of decoding resumption position, which will be described later, should be carried out.

On the other hand, when state saving/restoration for a picture that is currently decoded is not supported (step S1101), or when decoding has not been normally ended even through re-decoding was performed, the target picture is discarded. In this case, resumption of decoding is necessary (step S1108). The position where the decoding process is to be resumed is changed according to whether or not the discarded picture will be referred to in decoding of subsequent pictures. When there is no picture to be referred to in decoding, appropriate decoding cannot be carried out, and therefore, disordered pictures might be output. When there is no possibility that the discarded picture might be referred to in the decoding of subsequent pictures, the decoding process can be resumed from the immediately following picture. However, when there is a possibility that the discarded picture might be referred to in decoding of subsequent pictures, the decoding process is resumed from the position of an intra-frame coded picture or a position indicating the beginning of a video sequence. Although, in the above-mentioned method, the position where decoding is to be resumed is changed according to the type of the discarded picture, it is preferable that the position should be changed as desired. For example, when intra-frame coded pictures or the beginnings of video sequences are inserted at frequent intervals, decoding may be resumed from the position of an intra-frame coded picture or the beginning of a video sequence even though decoding can be resumed at the immediately following picture, because this difference in time does not matter much for the viewer. In this way, regardless of the type of the discarded picture, the decoding process may be resumed from the position of an intra-coded picture or the beginning of a video sequence to simplify the processing.

Figure 46:
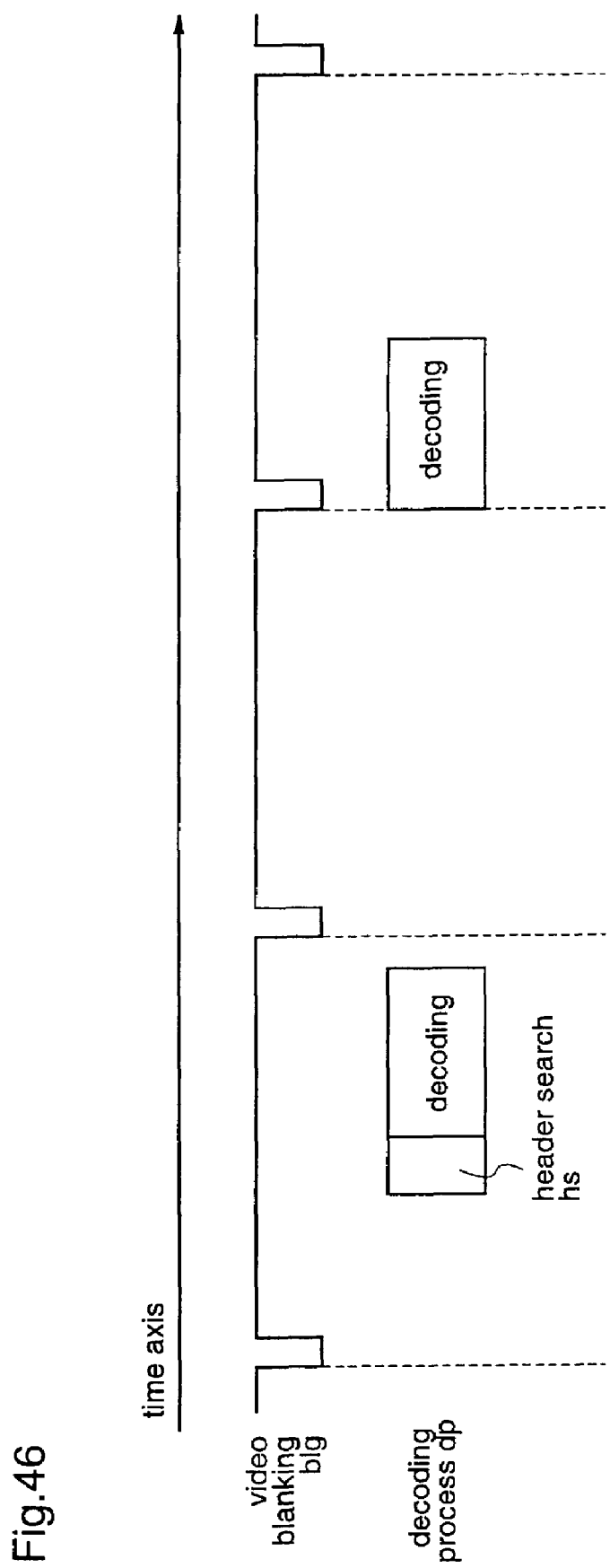
FIG. 46 is a diagram illustrating a process of performing decoding after a header search.
Figure 47:
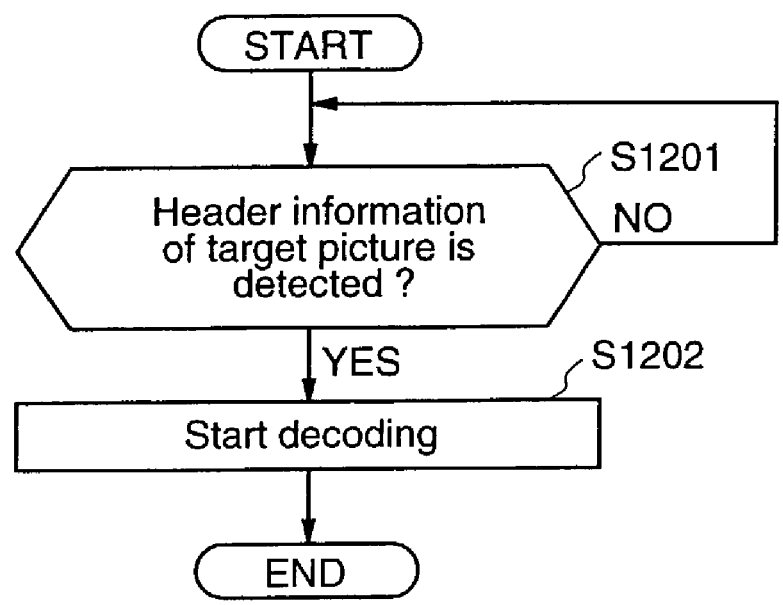
FIG. 47 is a flowchart for explaining detection of a decoding start position.
Figure 48:
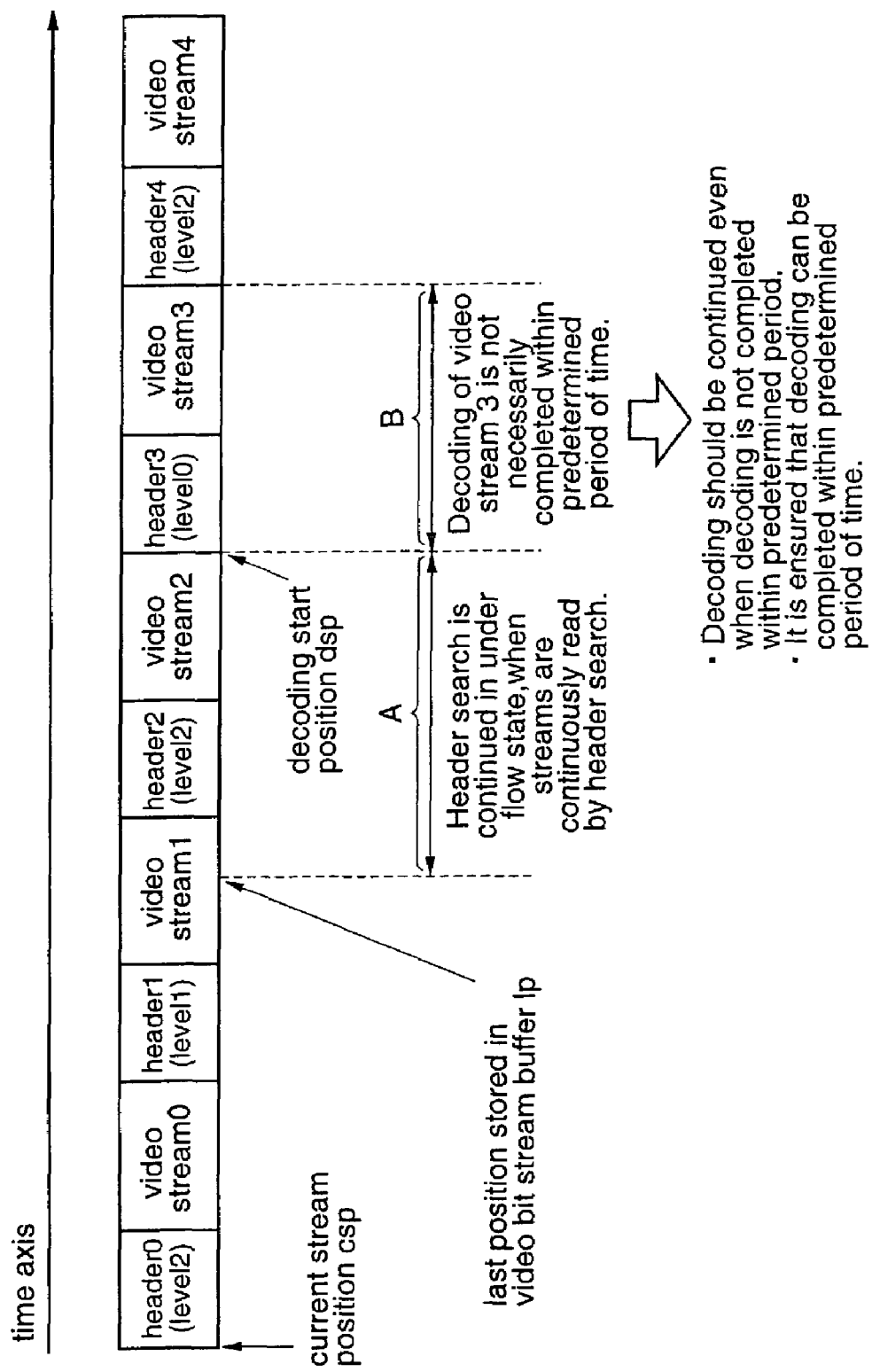
FIG. 48 is a diagram illustrating the detail of the process of performing decoding after a header search.
Figure 49:
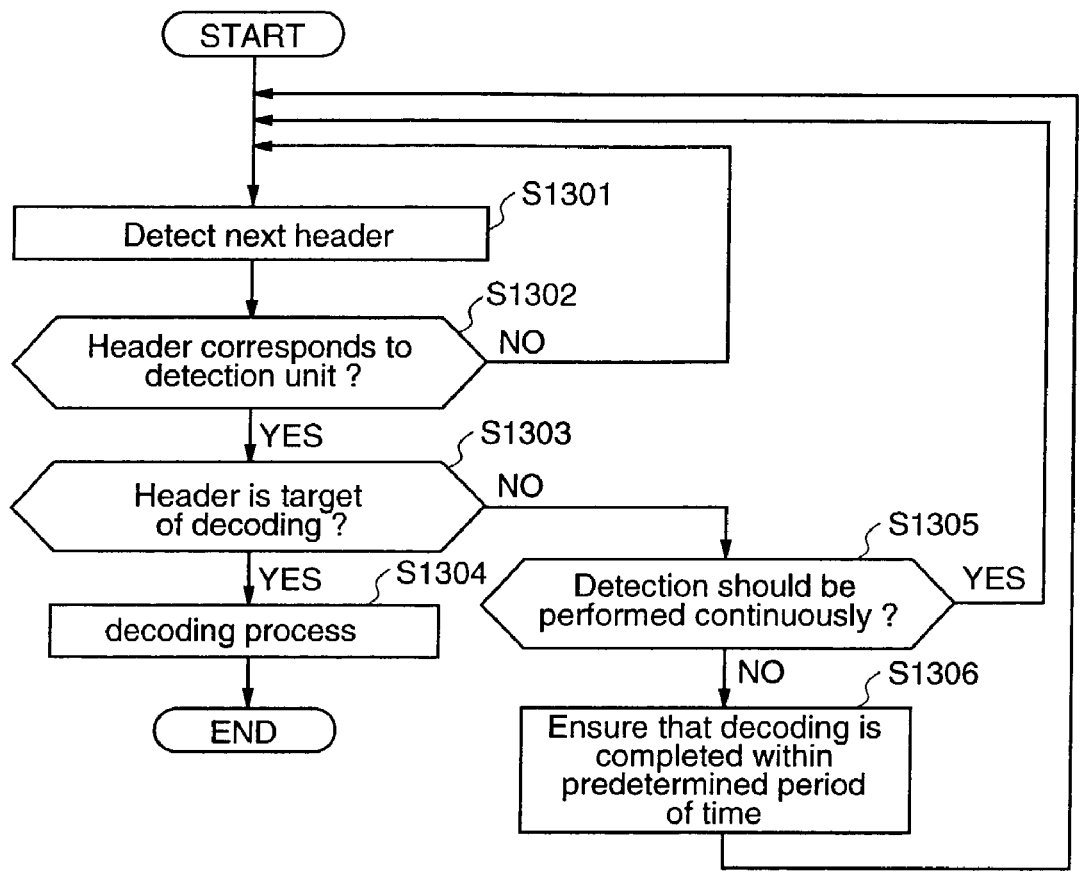
FIG. 49 is a flowchart illustrating the detection of a decoding start position in more detail.

Next, a description will be given of a search for a decoding start position when starting/resuming decoding. FIG. 46 shows an example of a typical decoding start. Initially, as shown in FIG. 47, a picture for which decoding should be started is determined, and a header search (hs) is carried out to search for header information corresponding to this picture (step S1201). When the header information of the target picture is detected, decoding is started (step S1202). The above-mentioned process is the fundamental principle and, hereinafter, the process will be described more specifically with reference to FIG. 48. It is assumed that there are levels 0, 1, and 2 as the types of headers to be targeted for the start of decoding, a position csp to be read by the decoder at present is the header 0, and data up to some midpoint in a video stream 1 are stored in the video bit stream buffer. When the target position at which decoding is to be resumed is the header of level 0, decoding is started from the beginning dsp of header 3 which appears first as the header of level 0. The operation at this time is shown in FIG. 49. Initially, a next header is detected (step S1301), and it is judged whether or not the detected header is a header corresponding to the detection unit (step S1302). When the result of this judgment is negative, the process returns to step S1301. On the other hand, when the detected header is a header corresponding to the detection unit, it is judged whether or not this header is a target header to be decoded (step S1303). When the header is a target header, decoding is carried out (step S1304). Otherwise, it is judged whether or not the detection process should be continuously carried out (step S1305). When the detection process should be continuously carried out, the process returns to step S1301.

Figure 50:
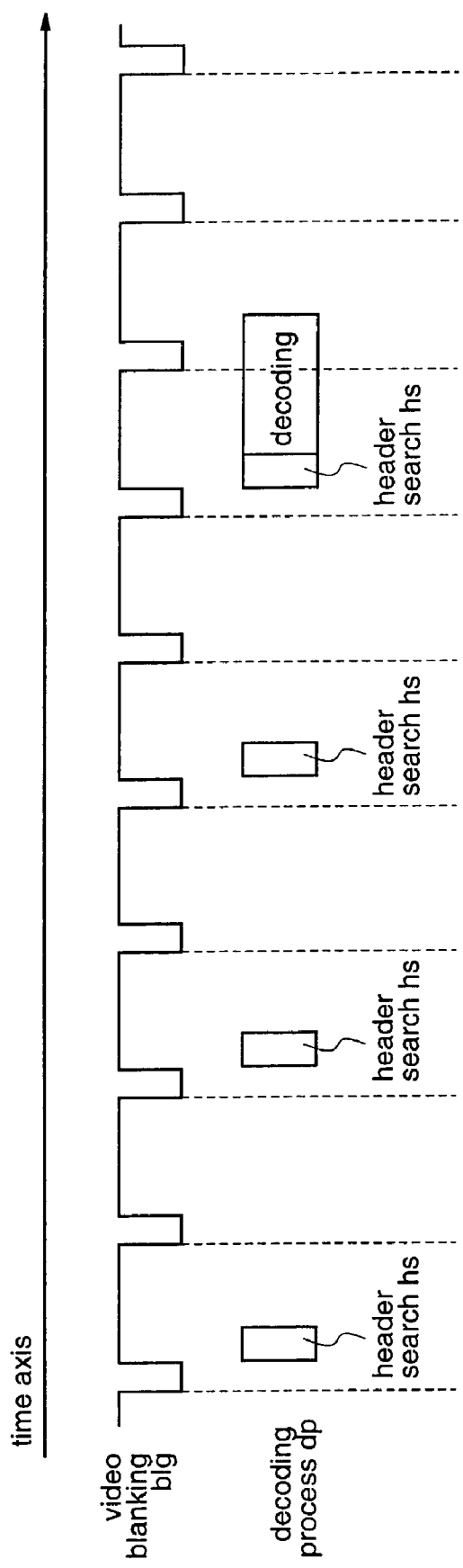
FIG. 50 is a diagram illustrating the case where a header search is carried out in units of pictures.
Figure 51:
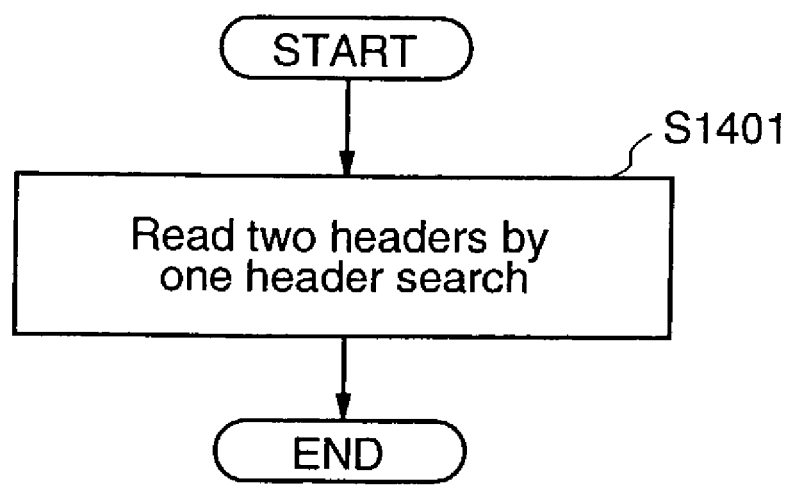
FIG. 51 is a flowchart illustrating a method for ensuring that decoding can be completed within a scheduled period of time.

By the way, assuming that the last position lp stored in the video stream buffer is some midpoint in the video stream 1, when a header search is continued until the header 3 is detected, even data which have not yet been stored in the video bit stream buffer are successively subjected to a header search. To be specific, since data consumption in the search process by the decoding circuit is usually faster than data supply from the bit stream output circuit, the search process for most of the data which are not stored in the video bit stream buffer should wait for data supply. That is, during this period A, when the stream is continuously read by header search, the search is continued in the state of underflow. Accordingly, when a header search is performed to detect a target header and then the decoding process is carried out, it is not ensured that the decoding process is completed within a predetermined period of time. That is, in period B, decoding of video stream 3 is not necessarily completed within a predetermined period of time. As a solution to this problem, decoding is continued even when the decoding process is not completed within the predetermined period of time, or header detection is not performed continuously (as long as no problem occurs) to ensure that the decoding process can be completed within the predetermined period of time (step S1306). Further, the normal decoding operation takes place after the target header to be decoded has been detected and one coding unit has been decoded. However, in the method of continuing decoding even when the decoding process is not completed within the predetermined period of time, when plural pictures are to be decoded, matching of functions cannot be achieved because the allowable maximum time is set for decoding. As an example of the method of ensuring that the decoding process can be completed within the predetermined period of time (step S1306), there is a method of performing a header search not continuously but in picture units (refer to FIG. 50). When pictures are to be processed in frame units, a header search is performed once for every frame period. When two headers exist in one frame, the two headers are read by one header search. Although the timing for executing a header search is determined on the basis of the time for decoding or the like, simplification is possible under specific conditions, such that header search is limited to once every frame period. At this time, if the picture units are frames and the coding units are fields, as shown in FIG. 51, two headers are skipped in one header search for a picture that is not the target of the header search (step S1401). Further, when an instruction for displaying decoded pictures repeatedly exists in the video bit stream, the header search execution interval is controlled, considering that picture display is repeated in the picture output order. Furthermore, when the coded pictures are assigned not only with time indexes for picture output but also with time indexes for decoding timing, the header search timing may be synchronized with these time indexes, whereby decoding can be started at an appropriate timing. Moreover, when information relating to the buffer is appropriately added into the video bit stream, decoding may be resumed with the timing at which the video bit stream equivalent to the remaining buffer capacity, which is calculated on the basis of the information relating to the buffer, is inputted into the video bit stream buffer. In this case, a search for a decoding start position can be carried out by the conventional method.

[Optimization of Decoding Process]

Figure 52:
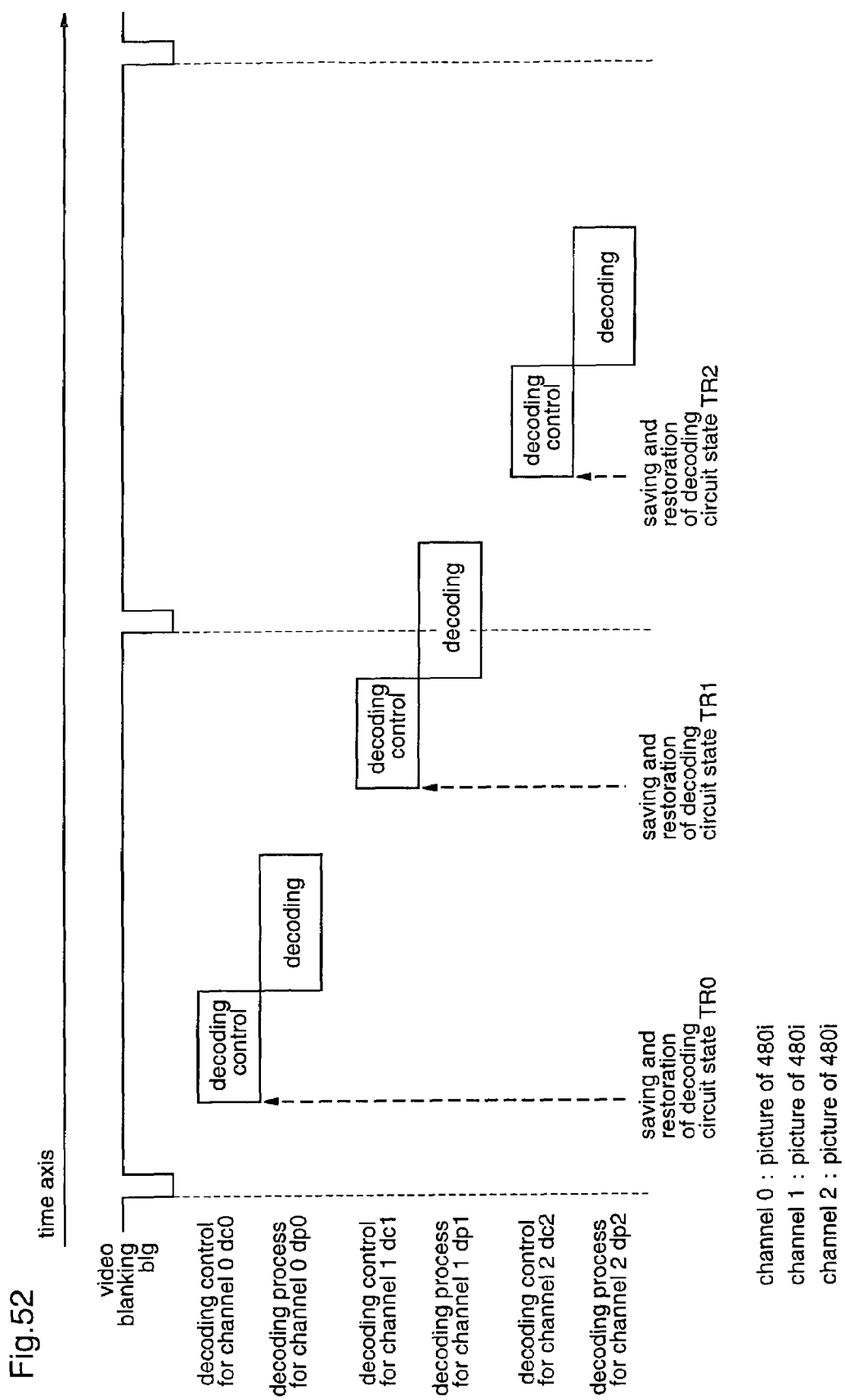
FIG. 52 is a diagram specifically illustrating decoding control when decoding plural pictures.
Figure 53:
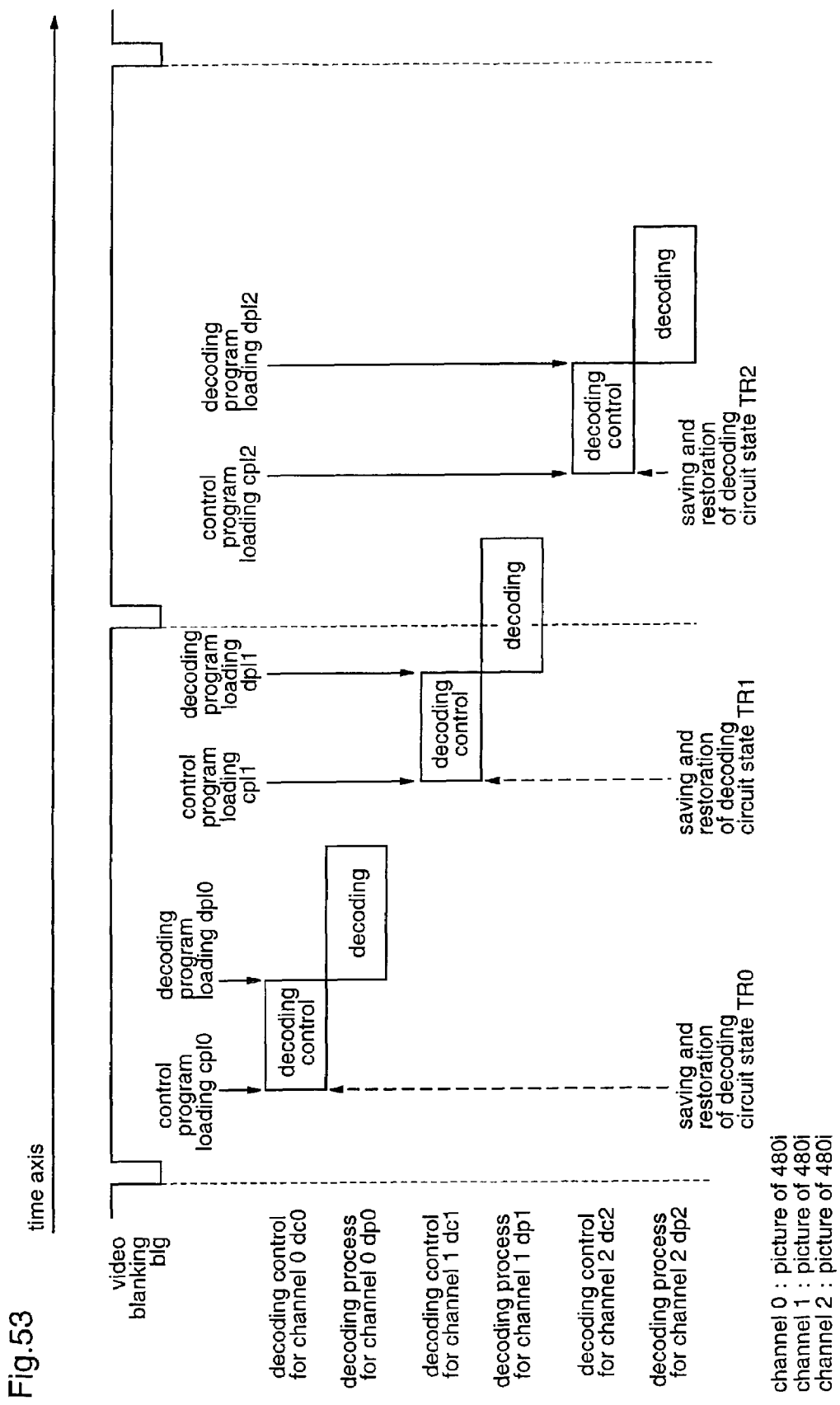
FIG. 53 is a diagram in which decoding of plural pictures is viewed from program loading.
Figure 54:
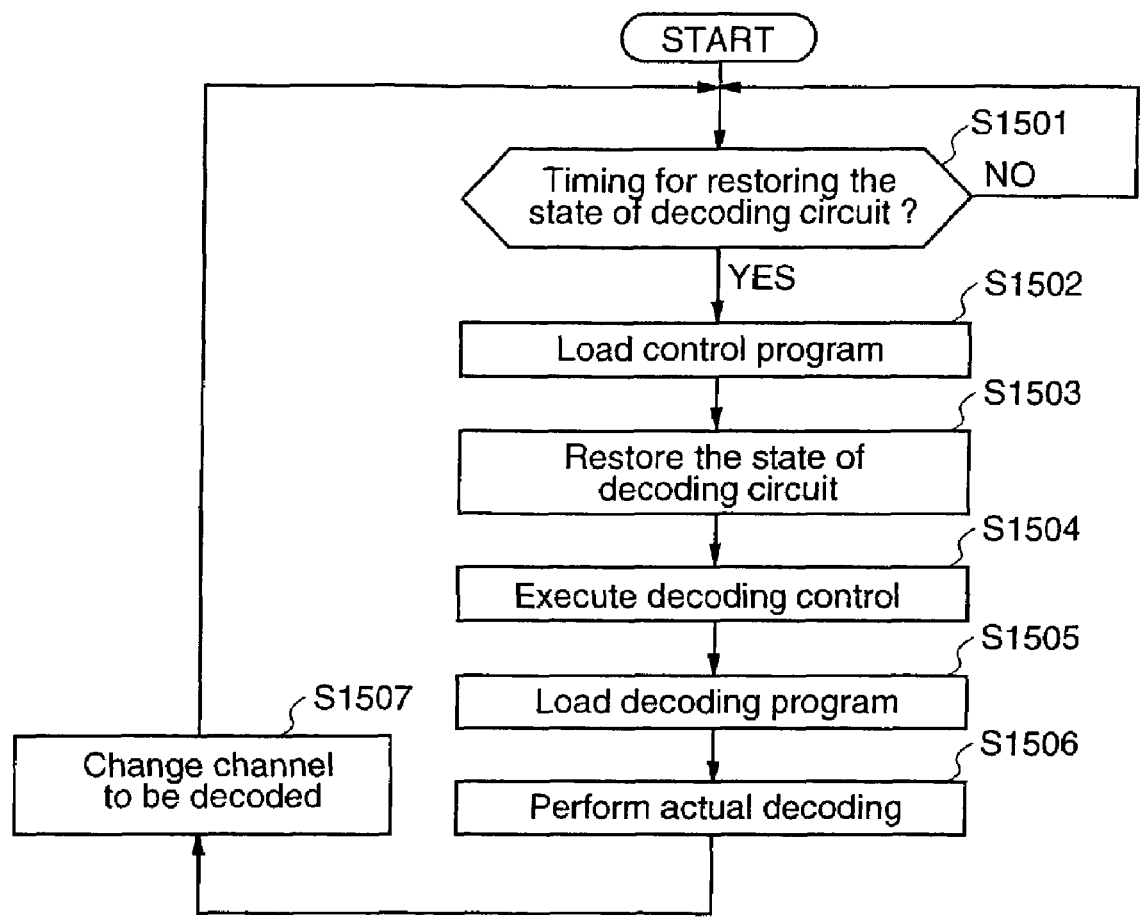
FIG. 54 is a flowchart illustrating software installation for recovering state saving of a decoding circuit.

Next, a description will be given of the order of decoding processes from the viewpoints of saving/restoration of the state of the decoding circuit as well as program loading at software installation. FIG. 52 is a diagram in which processes dc for controlling decoding of plural pictures are added to the conventional decoding processes for the respective pictures. FIG. 53 is a diagram in which program loading at software installation is further added to FIG. 52. The procedure is shown in FIG. 54. Initially, it is judged whether or not now (the present time) is the time for restoring the saved state of the decoding circuit (step S1501). When it is the timing TR for restoration, a control program is loaded by a loading operation cpl (step S1502), thereby performing restoration of the state of the decoding circuit (step S1503). Next, decoding control is executed (step S1504), a decoding program is loaded by a loading operation dpl (step S1505), the decoding process is actually carried out (step S1506), and then the channel to be decoded is changed (step S1507). Thereby, from the viewpoint of saving/restoring the state of the decoding circuit, the amount of processing can be reduced by successively performing decoding control and actual decoding as the order of decoding processes. However, from the viewpoint of program loading at software installation, this order of decoding processes is not preferable. Next, a description will be given of software installation.

Figure 55:
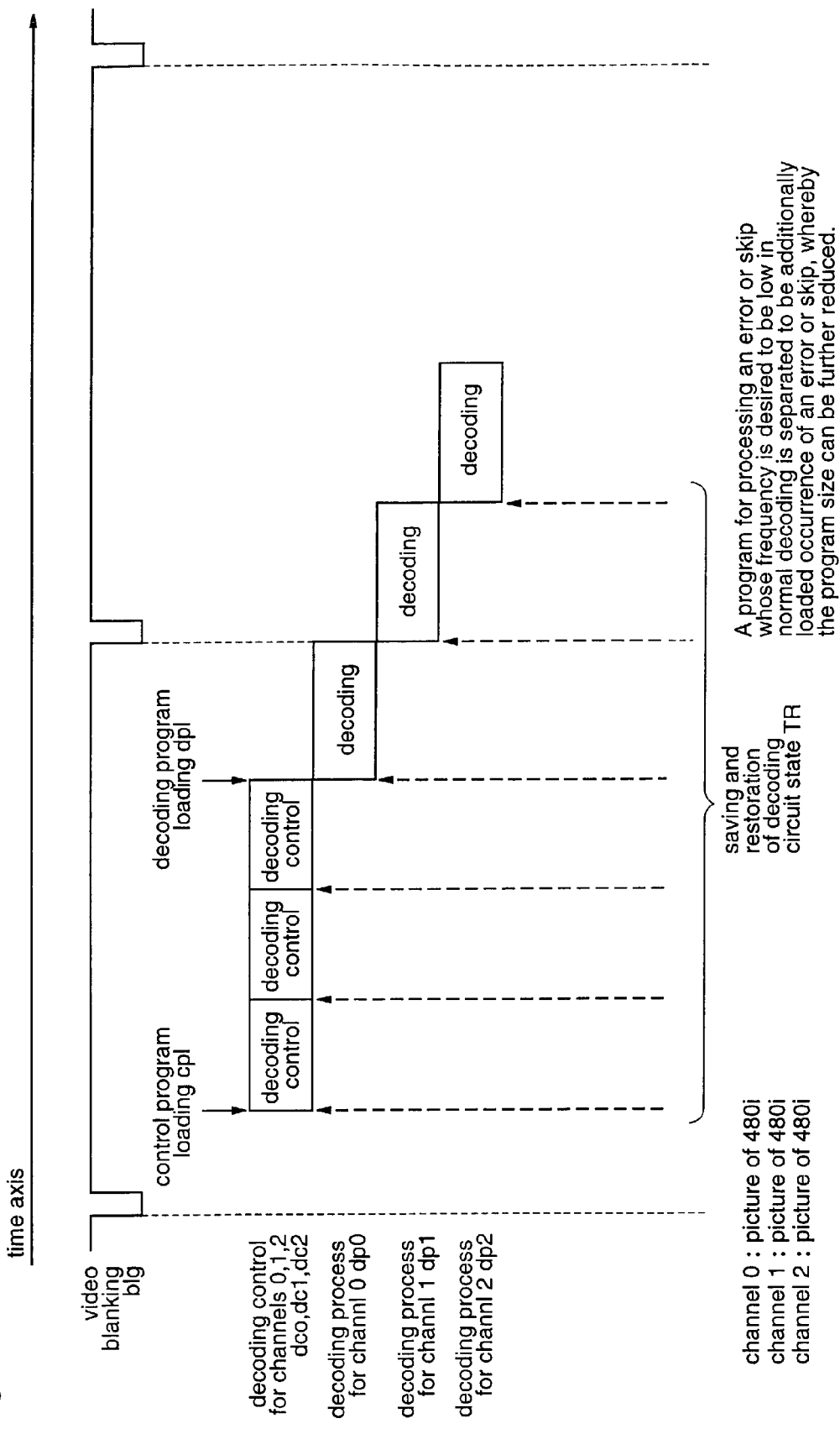
FIG. 55 is a diagram illustrating the case where the process of program loading is reduced in the process of decoding plural pictures.
Figure 56:
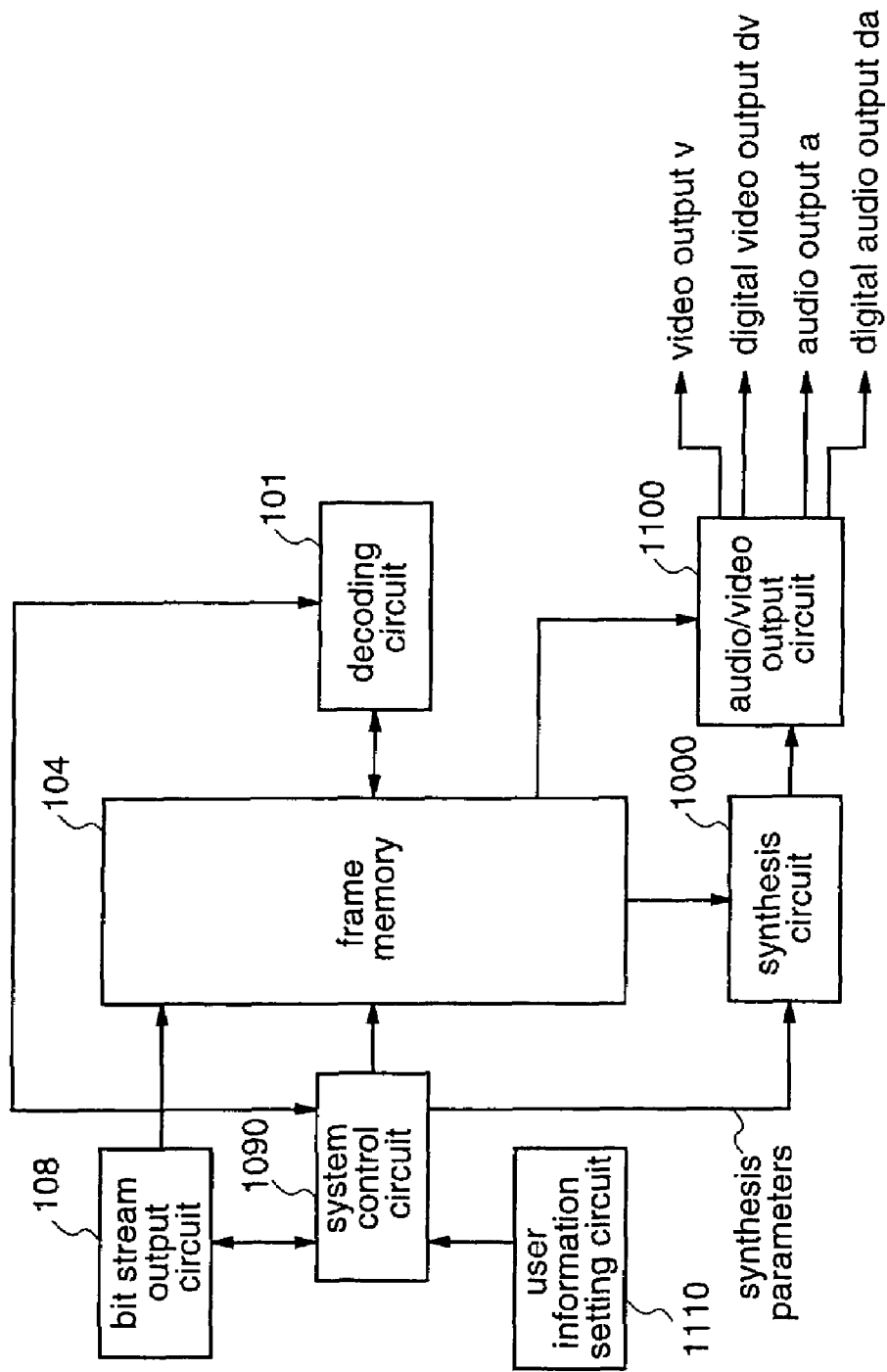
FIG. 56 is a block diagram illustrating the construction of the conventional decoding apparatus.
Figure 57:
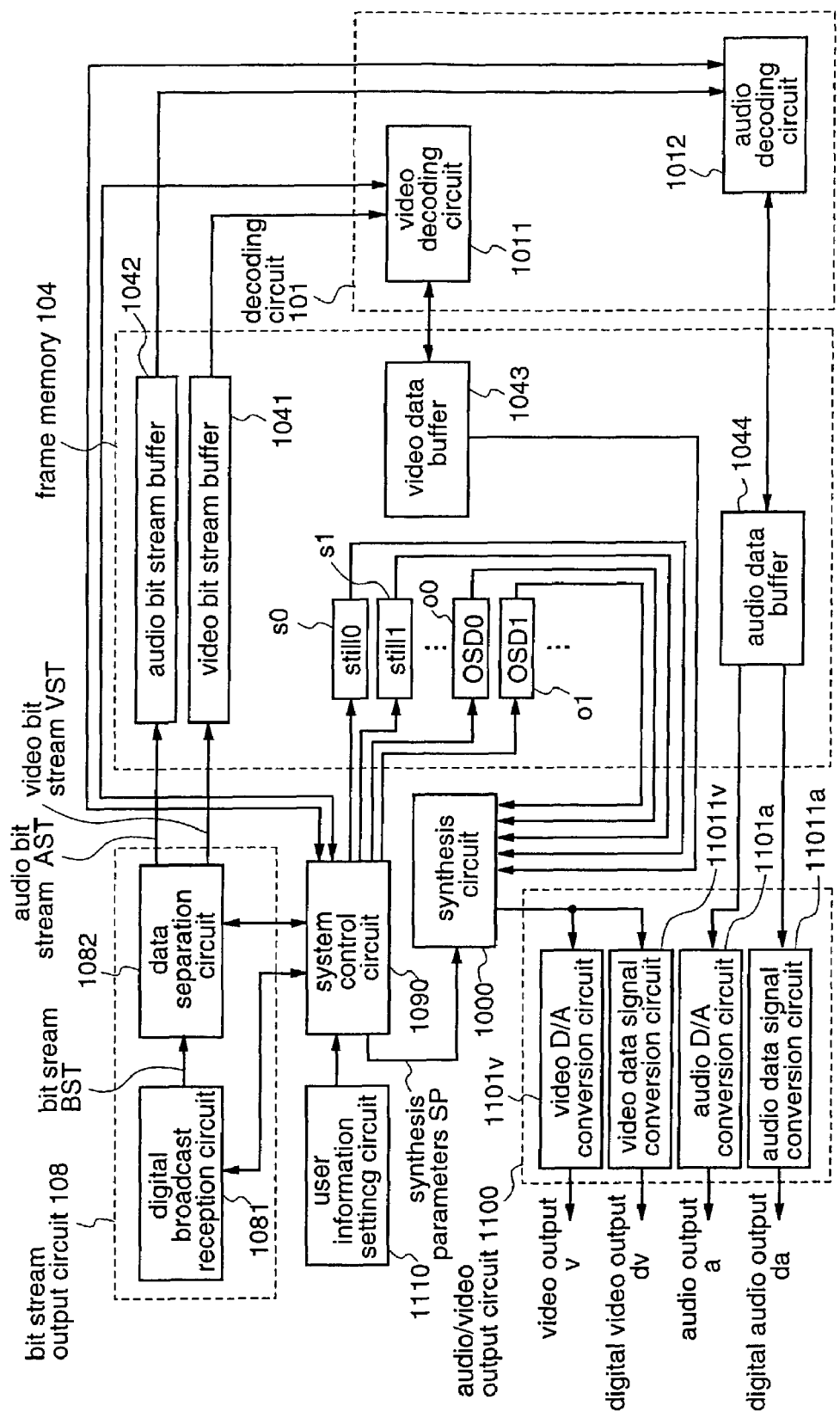
FIG. 57 is a block diagram illustrating the specific construction of the conventional decoding apparatus.
Figure 58:
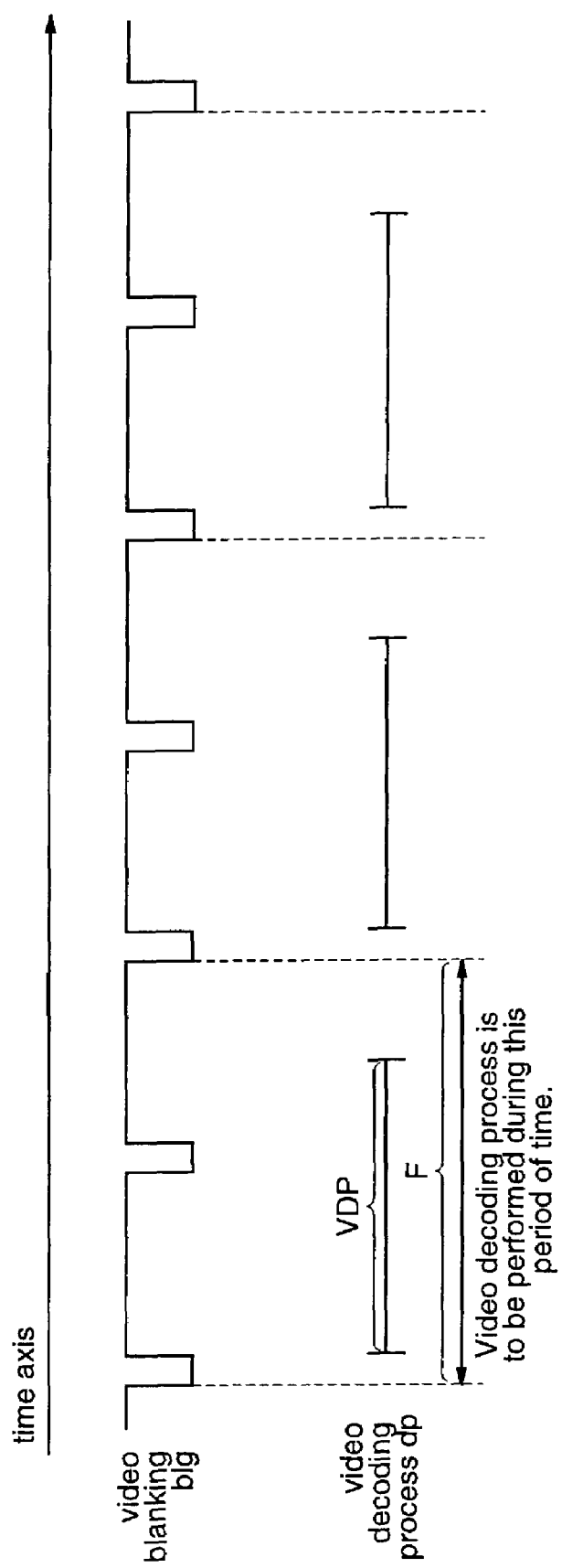
FIG. 58 is a diagram for explaining the case where one channel decoding is completed within a normal processing time.
Figure 59:
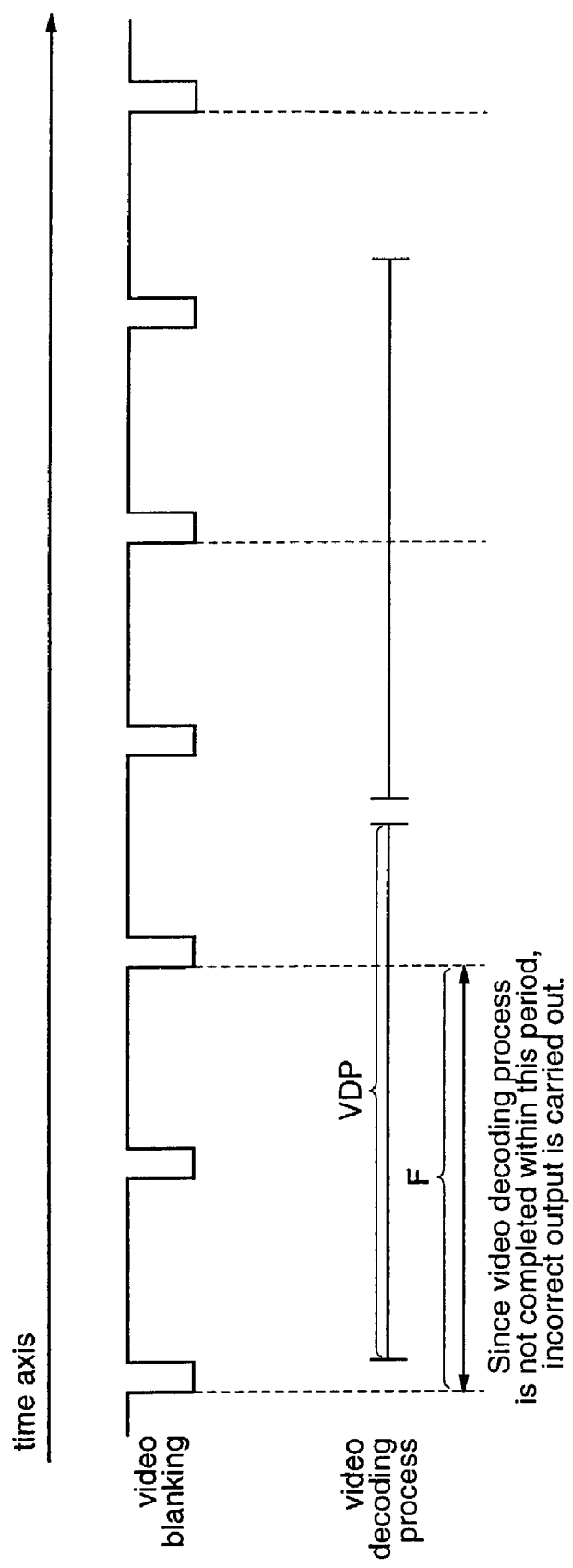
FIG. 59 is a diagram for explaining the case where one channel decoding cannot be completed within a normal processing time.

When implementing the decoding circuit by a DSP or the like, the decoding process is implemented by a program, and it is desired to reduce the internal memory capacity for holding the program. When video decoding is implemented by a program, it is possible to separate the program, according to the types of decoding processes, into a program for performing actual decoding, a program for controlling the decoding process, and the like. Accordingly, the memory capacity can be reduced by loading each of the separated programs as required. The order of decoding processes which is improved from the viewpoint of program loading is shown in FIG. 55 (corresponding to claims 10, 21, 32, and 43). In this case, although the amount of processing is reduced from the viewpoint of program loading, the amount of processing is increased from the viewpoint of saving/restoration of the state of the decoding circuit.

As described above, the amount of processing relating to state saving/restoration and the amount of processing relating to program loading are in a trade-off relationship, and it is desirable to determine which one of these processes is given first priority, according to the performances that are required for the respective processes. When designing a DSP performing the decoding process, the capacity of a memory for state saving/restoration and the capacity of a memory for a program, which memories are contained in the DSP, can be optimized from the viewpoint of performance. While in the above description the program is separated into two programs, one for decoding control and the other for actual decoding, the program may be separated in any way, e.g., a program for initialization at starting, a program for error processing, and the like, as long as the program is separable. For example, a program for processing an error or skip whose frequency is desired to be low in normal decoding may be separated to be additionally loaded at the occurrence of an error or the like.

What is claimed is:

1. A decoding apparatus comprising:
   a single decoder for receiving plural coded data, and decoding the respective coded data to output decoded data; and
   a decoding state holder for holding plural states of said decoder;
   wherein said decoder is operable to perform processes of selecting coded data to be a target of decoding, from among the plural coded data to be decoded, cyclically decoding divided portions of a predetermined unit of the selected coded data, saving its own state in said decoding state holder at a timing when decoding of a respective one of the divided coded data portions of the predetermined unit is completed, restoring its own latest state from said decoding state holder at a timing when decoding of a respective one of the divided coded data portions of the predetermined unit is started, outputting plural decoding results to the corresponding destinations, and completing a series of the processes within a predetermined period of time corresponding to each coded data.

2. A decoding apparatus as defined in claim 1, wherein said decoder is operable to decode the plural coded data while changing the input of coded data at a boundary of coding units, from coded data being currently decoded to another coded data.

3. A decoding apparatus as defined in claim 1, wherein said decoder is operable to determine an order in which the decoding results are output, according to information described in each coded data, and select and decode the coded data according to the determined order.

4. A decoding apparatus as defined in claim 1, wherein, when said decoder cannot perform normal decoding for a coding unit of arbitrary coded data, said decoder is operable to determine a position where the decoding should be resumed, based on a type of coding of the coding unit.

5. A decoding apparatus as defined in claim 1, wherein said decoder is operable to search for a position where decoding of each coded data should be started, and when said decoder searches for the position where decoding of each coded data should be started, said decoder is operable to perform the search for each coding unit, at a timing that is obtained from information described in the coded data.

6. A decoding apparatus as defined in claim 1, wherein said decoder is operable to change the decoding process for each coded data with a type of a decoding process as a unit.

7. A decoding apparatus as defined in claim 1, wherein said decoder is operable to determine a timing for starting decoding, based on information described in each coded data.

8. A decoding apparatus as defined in claim 1, wherein the plural coded data is decoded simultaneously in appearance.

9. A decoding apparatus comprising:
   a single decoder for receiving plural coded data, and decoding the respective coded data to output decoded data; and
   a decoding state holder for saving and restoring plural states of said decoder;
   wherein said decoder is operable to:
      perform processes of selecting coded data to be a target of decoding, from among the plural coded data to be decoded, decoding the selected coded data, performing saving and restoration of a state of said decoder into/from said decoding state holder, outputting plural decoding results to the corresponding destinations, and completing a series of the processes within a predetermined period of time corresponding to each coded data;
      obtain a maximum decoding time to be used when decoding each coded data, based on a period of time that is allowed for decoding a coding unit which is obtained from information described in each coded data, and the number of coded data to be decoded; and
      when the maximum decoding time is reached in decoding each coded data, terminate decoding of the coding unit of the coded data.

* * * * *